US012549290B2

(12) United States Patent
Sengupta et al.

(10) Patent No.: US 12,549,290 B2
(45) Date of Patent: Feb. 10, 2026

(54) SYSTEMS AND TECHNIQUES FOR SCHEDULING FEEDBACK-LESS HYBRID AUTOMATIC REPEAT RESOURCE REQUEST

(71) Applicant: QUALCOMM Incorporated, San Diego, CA (US)

(72) Inventors: Ayan Sengupta, San Diego, CA (US); Alberto Rico Alvarino, San Diego, CA (US); Bharat Shrestha, San Diego, CA (US); Le Liu, San Jose, CA (US); Xiao Feng Wang, San Diego, CA (US); Liangping Ma, San Diego, CA (US); Umesh Phuyal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 431 days.

(21) Appl. No.: 18/305,263

(22) Filed: Apr. 21, 2023

(65) Prior Publication Data

US 2024/0121033 A1   Apr. 11, 2024

Related U.S. Application Data

(60) Provisional application No. 63/336,936, filed on Apr. 29, 2022.

(51) Int. Cl.
*H04L 1/1812* (2023.01)
*H04L 1/1867* (2023.01)
(Continued)

(52) U.S. Cl.
CPC .......... *H04L 1/1812* (2013.01); *H04L 1/1874* (2013.01); *H04W 72/1273* (2013.01); *H04W 72/232* (2023.01)

(58) Field of Classification Search
CPC ... H04L 1/1812; H04L 1/1874; H04L 1/1835; H04L 1/1854; H04L 1/1896;
(Continued)

(56) References Cited

U.S. PATENT DOCUMENTS

2019/0173611 A1*   6/2019  Liu .................. H04L 1/0013
2021/0014883 A1*   1/2021  Khoshnevisan ...... H04L 1/1896
(Continued)

FOREIGN PATENT DOCUMENTS

WO   2021159974 A1   8/2021
WO   2021172899 A1   9/2021

OTHER PUBLICATIONS

Partial International Search Report—PCT/US2023/066118—ISA/EPO—Jul. 13, 2023.
(Continued)

*Primary Examiner* — Kiet Tang
(74) *Attorney, Agent, or Firm* — Polsinelli LLP

(57) ABSTRACT

Systems and techniques are provided for wireless communications. For example, an apparatus (e.g., a user equipment (UE)) may receive a plurality of downlink communications, wherein each downlink communication is associated with a Hybrid Automatic Repeat Request (HARQ) process. The apparatus may determine one or more uplink communications, wherein each uplink communication includes feedback associated with at least one downlink communication of the plurality of downlink communications. The apparatus may transmit the one or more uplink communications based on an uplink communication transmission configuration, wherein the uplink communication transmission configuration is determined based on a type of each downlink communication of the plurality of downlink communications.

29 Claims, 15 Drawing Sheets

(51) Int. Cl.
*H04W 72/1273* (2023.01)
*H04W 72/232* (2023.01)

(58) Field of Classification Search
CPC ... H04L 1/1822; H04L 1/1825; H04L 5/0055; H04L 5/0053; H04W 72/1273; H04W 72/232
See application file for complete search history.

(56) References Cited

U.S. PATENT DOCUMENTS

| | | | |
|---|---|---|---|
| 2022/0232525 A1* | 7/2022 | Lee | H04L 5/0053 |
| 2022/0393803 A1* | 12/2022 | Chen | H04L 1/1812 |
| 2023/0120684 A1 | 4/2023 | Gha et al. | |

OTHER PUBLICATIONS

Qualcomm Incorporated: "Scheduling of Multiple DL/UL Transport Blocks", 3GPP TSG RAN WG1 #100-bis, R1-2002174, 3rd Generation Partnership Project (3GPP), Mobile Competence Centre, 650, Route Des Lucioles, F-06921, Sophia-Antipolis Cedex, France, vol. RAN WG1, No. e-Meeting, Apr. 20, 2020-Apr. 30, 2020, Apr. 11, 2020, pp. 1-13, XP052342251, pp. 1-4.

Sony: "Discussion on Delay-Tolerant HARQ for NTN", 3GPP TSG RAN WG1 Meeting #99, R1-1912349, 3rd Generation Partnership Project (3GPP), Mobile Competence Centre, 650, Route Des Lucioles, F-06921, Sophia-Antipolis Cedex, France, vol. RAN WG1, No. Reno, USA, Nov. 18, 2019-Nov. 22, 2019, Nov. 9, 2019, pp. 1-6, XP051823366, pp. 2-3, 5.

International Search Report and Written Opinion—PCT/US2023/066118—ISA/EPO—Sep. 4, 2023.

* cited by examiner

SYSTEMS AND TECHNIQUES FOR SCHEDULING FEEDBACK-LESS HYBRID AUTOMATIC REPEAT RESOURCE REQUEST

CROSS-REFERENCE TO RELATED APPLICATIONS

This application claims benefit of U.S. Provisional Application No. 63/336,936, filed Apr. 29, 2022, the disclosure of which is incorporated by reference herein in its entirety for all purposes.

FIELD

Aspects of the present disclosure generally relate to wireless communication. In some implementations, examples are described for performing multi-Transport Block (multi-TB) scheduling with Hybrid Automatic Repeat Request (HARQ)-enabled processes and HARQ-disabled processes.

BACKGROUND

Wireless communications systems are deployed to provide various telecommunication services, including telephony, video, data, messaging, broadcasts, among others. Wireless communications systems have developed through various generations, including a first-generation analog wireless phone service (1G), a second-generation (2G) digital wireless phone service (including interim 2.5G networks), a third-generation (3G) high speed data, Internet-capable wireless service, a fourth-generation (4G) service (e.g., Long-Term Evolution (LTE), WiMax), and a fifth-generation (5G) service (e.g., New Radio (NR)). There are presently many different types of wireless communications systems in use, including cellular and personal communications service (PCS) systems. Examples of known cellular systems include the cellular Analog Advanced Mobile Phone System (AMPS), and digital cellular systems based on code division multiple access (CDMA), frequency division multiple access (FDMA), time division multiple access (TDMA), the Global System for Mobile communication (GSM), etc.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

Disclosed are systems, methods, apparatuses, and computer-readable media for performing wireless communication. NB-IoT and eMTC are both low-power wide-area network (LPWAN) wireless communications standards developed by 3GPP. For example, eMTC is a type of LTE-M network that can be used to support IoT devices (e.g., among others) through lower device complexity and extended coverage based on existing LTE base stations. eMTC can be implemented as a sub-type of LTE-M network operating within an existing LTE deployment and/or operating in a standalone deployment. NB-IoT is another low-power wide-area network (LPWAN) wireless communications standard developed by 3GPP. NB-IoT networks can be designed to provide improved indoor coverage, low cost, long battery life, and high connection density. NB-IoT networks may be implemented using a subset of LTE, with bandwidth limited to a single narrow-band of 200 kilohertz (kHz).

In eMTC and NB-IoT, a UE can receive one or more downlink communications from a base station. The downlink communications can include one or more Transport Blocks (TBs) (e.g., a payload passed between the MAC and PHY layers for the shared data channel, such as the Physical Downlink Shared Channel (PDSCH) and/or the Physical Uplink Shared Channel (PUSCH)). A UE may generate feedback for some, or all, of the TBs that are received or otherwise decoded by the UE. The feedback can include an acknowledgement (ACK) or a negative acknowledgement (NACK) for one or more TBs that are received or decoded by the UE. In some examples, a UE can generate and transmit Hybrid Automatic Repeat Request (HARQ) feedback to a base station from which the UE received one or more TBs.

TBs can be scheduled using one or more HARQ processes. A HARQ process can include a series of wireless communications between the UE and the base station, wherein the base station does not transmit the next TB on the HARQ process until the base station has received a HARQ ACK (e.g., from the UE) for the most recent TB on the HARQ process. When multiple HARQ processes are utilized, the HARQ processes may run in parallel. In some examples, in eMTC, up to eight TBs (e.g., HARQ processes) can be scheduled by a single Downlink Control Information (DCI), in what may also be referred to as "multi-TB scheduling." In NB-IoT, a UE may use up to two HARQ processes for wireless communications with a base station. In some cases, some eMTC and NB-IoT implementations may treat all HARQ processes associated with a UE as feedback-enabled HARQ processes. A feedback-enabled HARQ process can be a HARQ process for which subsequent TBs are not transmitted to the UE until the base station receives HARQ feedback for the most recent TB (e.g., as described above).

In some examples, feedback-enabled HARQ processes can contribute to "HARQ stalling" in eMTC and/or NB-IoT implementations with a relatively long Round Trip Time (RTT) between the UE and the base station. HARQ stalling can occur when a base station idles (e.g., does not transmit) on a given feedback-enabled HARQ process while waiting (e.g., for the RTT) to receive a HARQ ACK/NACK for the most recent TB transmitted on the feedback-enabled HARQ process. eMTC and/or NB-IoT can be implemented using one or more terrestrial networks, one or more Non-Terrestrial Networks (NTNs), or a combination of the two. When eMTC and/or NB-IoT are implemented using an NTN, wireless communications may be exchanged between a UE and an NTN node or entity that may include a gateway, a base station or portion thereof, and/or one or more satellites or other high-altitude platforms. Based on the relatively large distance between the UE and the NTN node, wireless communications between the UE and the NTN node can experience relatively large propagation time delays or round-trip times (RTTs). HARQ stalling can increase when the RTT between a UE and a base station is relatively high. For example, in eMTC over NTN and/or NB-IoT over NTN, the RTT between a UE and a base station can be tens or hundreds of milliseconds (ms), and HARQ stalling may be more likely to occur for feedback-enabled HARQ processes implemented in eMTC over NTN or NB-IoT over NTN.

In some examples, eMTC and/or NB-IoT may include one or more feedback-disabled HARQ processes that can be used to reduce HARQ stalling. In a feedback-disabled HARQ process, the UE may not generate or transmit feedback for TBs received on the feedback-disabled HARQ processes, and a base station can transmit or schedule subsequent TBs to the UE on the feedback-disabled HARQ process without waiting to receive a HARQ ACK/NACK from the UE. In some examples of eMTC over NTN and/or NB-IoT over NTN, a UE might communicate with a base station using a combination of feedback-enabled HARQ processes and feedback-disabled HARQ processes. For example, the UE and base station may use multi-TB scheduling, in which one or more feedback-enabled HARQ processes and one or more feedback-disabled HARQ processes are scheduling using a single DCI. There is a need for systems and techniques that can be used to perform multi-TB scheduling for co-existing feedback-enabled HARQ processes and feedback-disabled HARQ processes. For example, there is a need for systems and techniques that can be used to perform multi-TB scheduling for co-existing feedback-enabled and feedback-disabled HARQ processes in eMTC over NTN and NB-IoT over NTN.

Systems and techniques are described herein for multi-TB scheduling of feedback-enabled HARQ processes and feedback-disabled HARQ processes. For example, the systems and techniques can be used to perform multi-TB scheduling of feedback-enabled HARQ processes and feedback-disabled HARQ processes in eMTC, eMTC over NTN, NB-IoT, NB-IoT over NTN, etc. In some examples, the systems and techniques can be used to perform multi-TB scheduling of feedback-enabled HARQ processes and feedback-disabled HARQ processes in NB-IoT and/or NB-IoT over NTN. In some aspects, a UE can receive a plurality of TBs using a combination of feedback-disabled HARQ processes and feedback-enabled HARQ processes, which may be scheduled by a single Downlink Control Information (DCI) (e.g., multi-TB scheduled). HARQ ACK bits (e.g., 0 or 1 for ACK or NACK, respectively) can be determined for the TBs received over a feedback-enabled HARQ process included in the multi-TB scheduled block. In some cases, one or more "dummy" (e.g., placeholder) bits can be determined for the TBs received over a feedback-disabled HARQ process included in the multi-TB scheduled block. In some aspects, dummy bits, other feedback, and/or an uplink communication can be omitted for some, or all, of the TBs received over a feedback-disabled HARQ process included in the multi-TB scheduled block.

In some aspects, the systems and techniques can be used to perform multi-TB scheduling for one or more combinations (e.g., heterogeneous sets) of feedback-enabled HARQ processes and feedback-disabled HARQ processes. For example, each TB of a multi-TB scheduled block may be received in a different downlink time slot or sub-frame at the UE. The UE can generate or schedule a multi-HARQ scheduled block in response to receiving the TBs of the multi-TB scheduled block. In some aspects, the multi-HARQ scheduled block can include a HARQ-ACK bit (e.g., HARQ ACK/NACK) determined for each TB received over a feedback-enabled HARQ process, wherein the HARQ-ACK bit's relative position in the multi-HARQ scheduled block is the same as, or otherwise based on, the corresponding TB's relative position in the multi-TB scheduled block. In some aspects, the multi-HARQ scheduled block can include a "hole" or empty uplink slot/sub-frame for each TB received over a feedback-disabled HARQ process. The position of the empty uplink slots or sub-frames in the multi-HARQ scheduled block can be the same as, or otherwise based on, the corresponding position(s) of the feedback-disabled TBs in the multi-TB scheduled block. In some cases, the multi-HARQ scheduled block can be generated to omit any empty uplink slots or subframes associated with the feedback-disabled TBs of the multi-TB scheduled block. In some aspects, the systems and techniques can be used to perform multi-TB scheduling for one or more combinations (e.g., heterogeneous sets) of feedback-enabled HARQ processes and feedback-disabled HARQ processes by scheduling the feedback-enabled HARQ processes consecutively (e.g., in the multi-TB scheduled block received by the UE and in the multi-HARQ-ACK scheduled block generated by the UE as feedback based on the multi-TB scheduled block). In some cases, the feedback-disabled HARQ processes can additionally be scheduled consecutively, either before or after the consecutively scheduled feedback-enabled HARQ processes.

In some aspects, the multi-TB scheduled block can include one or more feedback-enabled HARQ processes and one or more feedback-disabled HARQ processes, wherein the multi-TB scheduled block is divided into multiple TB bundles. Each TB bundle may include a unique subset of the HARQ processes and TBs included in or otherwise associated with the multi-TB scheduled block. In some examples, the systems and techniques can perform multi-TB scheduling by generating a "dummy" (e.g., placeholder) HARQ-ACK bit or value for any feedback-disabled TB in the one or more TB bundles. In some cases, a dummy or placeholder HARQ-ACK is not generated for feedback-disabled TBs that are included in a bundle that includes only feedback-disabled TBs (e.g., if the bundle does not include at least one feedback-enabled TB, no dummy HARQ-ACK is generated for any of the TBs within the bundle). In some aspects, if a bundle includes at least one feedback-enabled TB, a dummy HARQ-ACK bit can be generated for each feedback-disabled TB included in the bundle and a HARQ-ACK bit can be generated for each feedback-enabled TB included in the bundle.

According to at least one example a method is provided for wireless communications at a user equipment (UE). The method may include: receiving a plurality of downlink communications, wherein each downlink communication of the plurality of downlink communications is associated with a Hybrid Automatic Repeat Request (HARQ) process; determining one or more uplink communications, wherein each uplink communication of the one or more uplink communications includes feedback associated with at least one downlink communication of the plurality of downlink communications; and transmitting the one or more uplink communications based on an uplink communication transmission configuration, wherein the uplink communication transmission configuration is determined based on a type of each downlink communication of the plurality of downlink communications.

In another example, a method is provided for wireless communications at a user equipment (UE). The method may include: receiving a first Physical Downlink Shared Channel (PDSCH) communication including at least a first downlink communication of a plurality of downlink communications, wherein the first downlink communication includes a Transport Block (TB) associated with a first feedback-disabled Hybrid Automatic Repeat Request (HARQ) process; and receiving a second PDSCH communication including at least an additional downlink communication, wherein the additional downlink communication includes an additional TB associated with the first feedback-disabled HARQ process; wherein the first PDSCH communication and the second PDSCH communication are separated by a pre-defined time interval.

In another example, a method is provided for wireless communications at a Narrowband-Internet of Things (NB-IoT) UE. The method may include: receiving, at the NB-IoT UE, a plurality of downlink communications, wherein the plurality of downlink communications are associated with up to four HARQ processes, wherein: the up to four HARQ processes include a subset of up to two feedback-enabled HARQ processes; and one or more HARQ processes, of the up to four HARQ processes, not included in the subset are feedback-disabled HARQ processes.

In another example, an apparatus for wireless communications is provided that includes at least one memory and at least one processor coupled to the at least one memory. The at least one processor is configured to and can: receive a plurality of downlink communications, wherein each downlink communication of the plurality of downlink communications is associated with a Hybrid Automatic Repeat Request (HARQ) process; determine one or more uplink communications, wherein each uplink communication of the one or more uplink communications includes feedback associated with at least one downlink communication of the plurality of downlink communications; and transmit the one or more uplink communications based on an uplink communication transmission configuration, wherein the uplink communication transmission configuration is determined based on a type of each downlink communication of the plurality of downlink communications.

In another example, an apparatus for wireless communications is provided that includes at least one memory and at least one processor coupled to the at least one memory. The at least one processor is configured to and can: receive a first Physical Downlink Shared Channel (PDSCH) communication including at least a first downlink communication of a plurality of downlink communications, wherein the first downlink communication includes a Transport Block (TB) associated with a first feedback-disabled Hybrid Automatic Repeat Request (HARQ) process; and receive a second PDSCH communication including at least an additional downlink communication, wherein the additional downlink communication includes an additional TB associated with the first feedback-disabled HARQ process; wherein the first PDSCH communication and the second PDSCH communication are separated by a pre-defined time interval.

In another example, an apparatus (e.g., Narrowband-Internet of Things (NB-IoT) UE or component thereof) for wireless communications is provided that includes at least one memory and at least one processor coupled to the at least one memory. The at least one processor is configured to and can: receive a plurality of downlink communications, wherein the plurality of downlink communications are associated with up to four HARQ processes, wherein: the up to four HARQ processes include a subset of up to two feedback-enabled HARQ processes; and one or more HARQ processes, of the up to four HARQ processes, not included in the subset are feedback-disabled HARQ processes.

In another example, a non-transitory computer-readable medium of an apparatus is provided that has stored thereon instructions that, when executed by one or more processors, cause the one or more processors to: receive a plurality of downlink communications, wherein each downlink communication of the plurality of downlink communications is associated with a Hybrid Automatic Repeat Request (HARQ) process; determine one or more uplink communications, wherein each uplink communication of the one or more uplink communications includes feedback associated with at least one downlink communication of the plurality of downlink communications; and transmit the one or more uplink communications based on an uplink communication transmission configuration, wherein the uplink communication transmission configuration is determined based on a type of each downlink communication of the plurality of downlink communications.

In another example, a non-transitory computer-readable medium of an apparatus is provided that has stored thereon instructions that, when executed by one or more processors, cause the one or more processors to: receive a first Physical Downlink Shared Channel (PDSCH) communication including at least a first downlink communication of a plurality of downlink communications, wherein the first downlink communication includes a Transport Block (TB) associated with a first feedback-disabled Hybrid Automatic Repeat Request (HARQ) process; and receive a second PDSCH communication including at least an additional downlink communication, wherein the additional downlink communication includes an additional TB associated with the first feedback-disabled HARQ process; wherein the first PDSCH communication and the second PDSCH communication are separated by a pre-defined time interval.

In another example, a non-transitory computer-readable medium of a Narrowband-Internet of Things (NB-IoT) user equipment (UE) is provided that has stored thereon instructions that, when executed by one or more processors, cause the one or more processors to: receive a plurality of downlink communications, wherein the plurality of downlink communications are associated with up to four HARQ processes, wherein: the up to four HARQ processes include a subset of up to two feedback-enabled HARQ processes; and one or more HARQ processes, of the up to four HARQ processes, not included in the subset are feedback-disabled HARQ processes.

In another example, an apparatus for wireless communications is provided. The apparatus includes: means for receiving a plurality of downlink communications, wherein each downlink communication of the plurality of downlink communications is associated with a Hybrid Automatic Repeat Request (HARQ) process; means for determining one or more uplink communications, wherein each uplink communication of the one or more uplink communications includes feedback associated with at least one downlink communication of the plurality of downlink communications; and means for transmitting the one or more uplink communications based on an uplink communication transmission configuration, wherein the uplink communication transmission configuration is determined based on a type of each downlink communication of the plurality of downlink communications.

In another example, an apparatus for wireless communications is provided. The apparatus includes: means for receiving a first Physical Downlink Shared Channel (PDSCH) communication including at least a first downlink communication of a plurality of downlink communications, wherein the first downlink communication includes a Transport Block (TB) associated with a first feedback-disabled Hybrid Automatic Repeat Request (HARQ) process; and means for receiving a second PDSCH communication including at least an additional downlink communication, wherein the additional downlink communication includes an additional TB associated with the first feedback-disabled HARQ process; wherein the first PDSCH communication and the second PDSCH communication are separated by a pre-defined time interval.

In another example, an apparatus (e.g., an a Narrowband-Internet of Things (NB-IoT) UE) for wireless communications is provided. The apparatus includes: means for receiving a plurality of downlink communications, wherein the plurality of downlink communications are associated with up to four HARQ processes, wherein: the up to four HARQ processes include a subset of up to two feedback-enabled HARQ processes; and one or more HARQ processes, of the up to four HARQ processes, not included in the subset are feedback-disabled HARQ processes.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip implementations or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
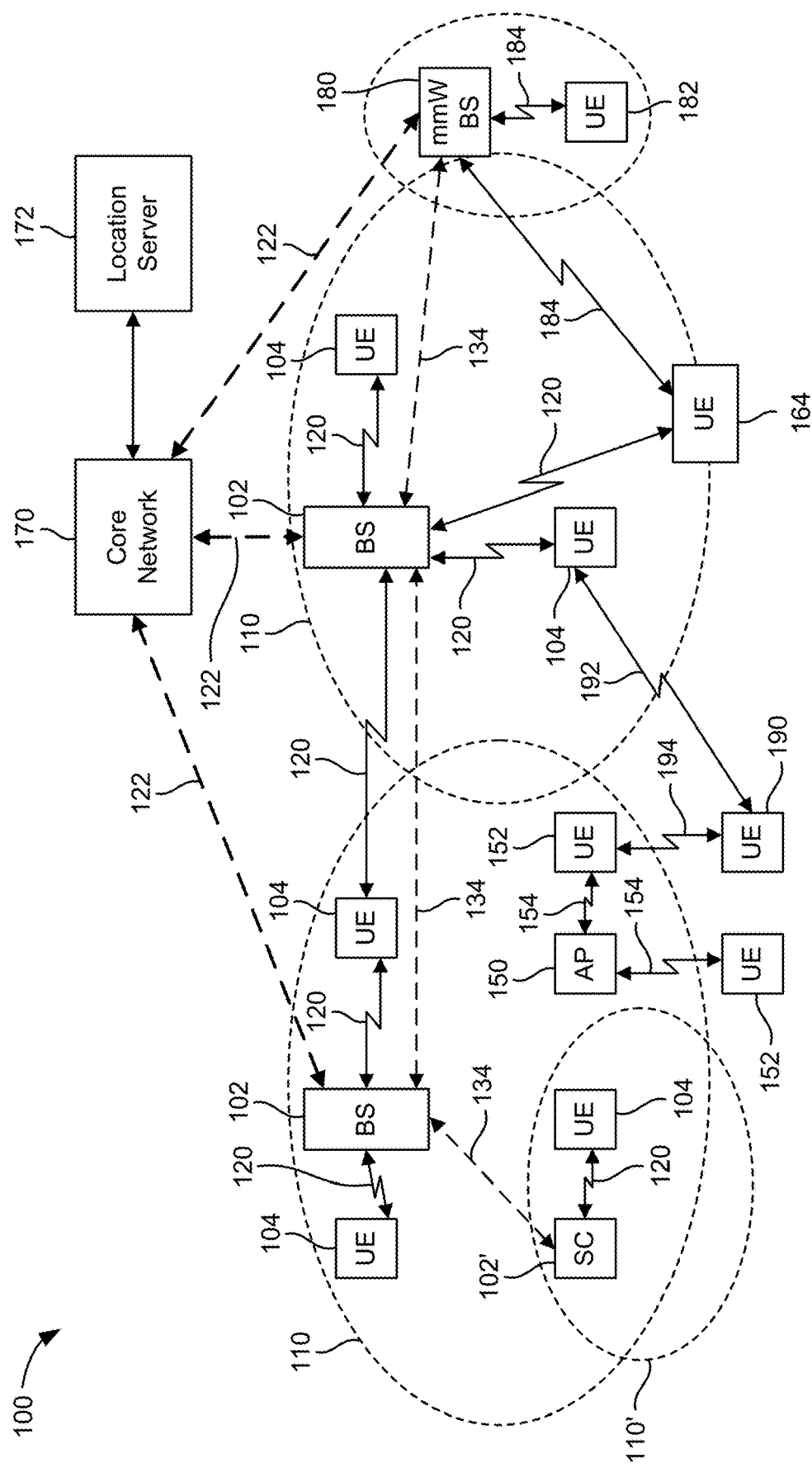
FIG. 1 is a block diagram illustrating an example of a wireless communication network, in accordance with some examples.

Certain aspects of this disclosure are provided below for illustration purposes. Alternate aspects may be devised without departing from the scope of the disclosure. Additionally, well-known elements of the disclosure will not be described in detail or will be omitted so as not to obscure the relevant details of the disclosure. Some of the aspects described herein may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the scope of the application as set forth in the appended claims.

Wireless communication networks are deployed to provide various communication services, such as voice, video, packet data, messaging, broadcast, any combination thereof, or other communication services. A wireless communication network may support both access links and sidelinks for communication between wireless devices. An access link may refer to any communication link between a client device (e.g., a user equipment (UE), a station (STA), or other client device) and a base station (e.g., a 3GPP gNB for 5G/NR, a 3GPP eNB for 4G/LTE, a Wi-Fi access point (AP), or other base station). For example, an access link may support uplink signaling, downlink signaling, connection procedures, etc. An example of an access link is a Uu link or interface (e.g., also referred to as an NR-Uu) between a 3GPP gNB and a UE.

The 3rd Generation Partnership Project (3GPP) has defined specifications that provide support for machine-type communication (MTC). MTC can be used to provide wireless communications to and from Internet-of-Things (IoT) devices. Large scale deployments of IoT devices may involve tens of thousands, hundreds of thousands, or more IoT devices. MTC wireless communications be used to provide improved coverage, latency, power consumption, and/or connection density, etc., for large scale deployments of IoT devices (e.g., among other devices). Large scale deployments of devices communicating over MTC can also be referred to as massive machine-type communication (mMTC). In some cases, mMTC can be implemented using enhanced machine-type communication (eMTC) and/or Narrowband-IoT (NB-IoT).

NB-IoT and eMTC are both low-power wide-area network (LPWAN) wireless communications standards developed by 3GPP. For example, eMTC is a type of LTE-M network that can be used to support IoT devices (e.g., among others) through lower device complexity and extended coverage based on existing LTE base stations. In some cases, eMTC can be used to provide a relatively high data rate to connected devices. eMTC can be implemented as a sub-type of LTE-M network. For example, an eMTC Cat-M1 network may have a 1.08 MHz channel width (e.g., bandwidth) operating within an existing LTE deployment and 1.4 MHz channel width operating in a standalone deployment. In some cases, an eMTC network can include a power saving mode (PSM) and/or other optimizations that may be used to provide improved battery life for devices that are connected to or communicate over the eMTC network.

NB-IoT is another low-power wide-area network (LPWAN) wireless communications standard developed by 3GPP. The NB-IoT is a Radio Access Type (RAT), supported by the evolved UMTS Terrestrial Radio Access Network (E-UTRAN), that was added by 3GPP in specifications for 3GPP Release 13 to provide 180 kHz UL/DL (Uplink/Downlink) bandwidth. NB-IoT networks can be designed to provide improved indoor coverage, low cost, long battery life, and high connection density. NB-IoT networks may be implemented using a subset of LTE, with bandwidth limited to a single narrow-band of 200 kilohertz (kHz). Orthogonal frequency-division multiplexing (OFDM) modulation is used for downlink (DL) communications and single-carrier frequency-division multiple access (SC-FDMA) is used for uplink (UL) communications.

In eMTC and NB-IoT, a UE can receive one or more downlink communications from a base station. The downlink communications can include one or more Transport Blocks (TBs), medium access control (MAC) packet data units (PDUs), etc. For example, a TB may be a payload passed between the MAC and PHY layers for the shared data channel, such as the Physical Downlink Shared Channel (PDSCH) and/or the Physical Uplink Shared Channel (PUSCH). In some cases, a UE may generate feedback for some, or all, of the TBs that are received or otherwise decoded by the UE. For example, the feedback can include an acknowledgement (ACK) or a negative acknowledgement (NACK) for one or more TBs that are received or decoded by the UE. The UE can transmit the generated feedback (e.g., ACK/NACK) back to the base station from which the UE received the TBs corresponding to each generated ACK or NACK. In some examples, the UE can generate and transmit Hybrid Automatic Repeat Request (HARQ) feedback to the base station according to the output of the decoding procedure applied at the UE for the received TBs. For example, the UE can generate and transmit a HARQ ACK to indicate to the base station that the UE has successfully received and decoded a given TB, and the UE can generate and transmit a HARQ NACK to indicate to the base station that the UE has not successfully decoded a given TB.

TBs can be scheduled using one or more HARQ processes associated with the UE and/or the base station. Each HARQ process can include a series of wireless communications between the UE and the base station, wherein the base station does not transmit the next TB for a given HARQ process until the base station has received a HARQ ACK (e.g., from the UE) for the current or most recently scheduled TB on the given HARQ process. When multiple HARQ processes are utilized, the HARQ processes may run in parallel. For example, if a total of four HARQ processes are used to schedule TBs from a base station to a UE, a HARQ NACK or other transmission error on a HARQ process #2 would not prevent the UE from continuing to receive new TBs on HARQ processes #1, #3, and #4 (e.g., so long as the UE continues to transmit HARQ ACKs for the TBs scheduled on HARQ processes #1, #3, and #4). In some examples, in eMTC, a UE may use up to eight HARQ processes for wireless communications with a base station. For example, in eMTC, up to eight TBs (e.g., HARQ processes) can be scheduled by a single Downlink Control Information (DCI), in what may also be referred to as "multi-TB scheduling." In NB-IoT, a UE may use up to two HARQ processes for wireless communications with a base station.

In some cases, some eMTC and NB-IoT implementations may operate under an assumption that all HARQ processes associated with a UE (e.g., used by the UE to receive TBs from a base station) are feedback-enabled HARQ processes. For example, a feedback-enabled HARQ process can be a HARQ process for which subsequent TBs are not scheduled or transmitted to the UE until the base station receives HARQ feedback (e.g., ACK/NACK) for the previous TB (e.g., as described above).

In some examples, feedback-enabled HARQ processes can contribute to "HARQ stalling" in eMTC and/or NB-IoT implementations with a relatively long RTT or RTD between the UE and the base station. HARQ stalling can occur when a base station is forced to idle (e.g., not transmit) on a given feedback-enabled HARQ process while waiting to receive a HARQ ACK/NACK for the most recent TB that the base station transmitted on the given feedback-enabled HARQ process. For example, when a base station transmits a TB on a feedback-enabled HARQ process, the base station then spends at least one full RTT waiting (e.g., stalled or idle) to receive the HARQ ACK/NACK that will be used to determine the base station's next transmission (e.g., transmit the next TB in response to an ACK, retransmit the current TB in response to a NACK).

In some cases, the impact of HARQ stalling may be negligible or relatively minor, such as in terrestrial networks with relatively low RTTs. For example, HARQ stalling may be less likely to occur in a terrestrial eMTC or NB-IoT network with an RTT<10 ms). However, eMTC and/or NB-IoT can be implemented using one or more terrestrial networks, one or more Non-Terrestrial Networks (NTNs), or a combination of the two. When eMTC and/or NB-IoT are implemented using an NTN, wireless communications may be exchanged between a UE and an NTN node or entity. For example, the NTN entity may include a gateway, a base station or portion thereof (e.g., a central unit (CU), a distributed unit (DU), a radio unit (RU), a Near-Real Time (Near-RT) RAN Intelligent Controller (RIC), or a Non-Real Time (Non-RT) RIC, or other NTN node/entity), or one or more satellites or other high-altitude platforms. Based on the relatively large distance between the UE and the NTN node (e.g., a satellite or high-altitude platform or a base station or gateway communicating with the UE via a satellite or high-altitude platform), the wireless communications between the UE and the NTN node can experience relatively large propagation time delays. The propagation time delay can also be referred to as a round trip delay (RTD) and/or a round trip time (RTT). The RTD and/or RTT can be determined based on the physical distance that a wireless communication signal travels (e.g., propagates) between the UE and the NTN node. For example, when a UE communicates with a satellite or a gateway and/or base station via the satellite, the wireless communications between the UE and the satellite, gateway, or base station may travel hundreds, or thousands, of kilometers in distance.

As mentioned previously, HARQ stalling can increase when the RTT between a UE and a base station is relatively high. For example, in eMTC over NTN and/or NB-IoT over NTN, the RTT between a UE and a base station can be tens or hundreds of milliseconds (ms), and HARQ stalling may be more likely to occur for feedback-enabled HARQ processes implemented in eMTC over NTN or NB-IoT over NTN.

In some examples, eMTC and/or NB-IoT may include one or more feedback-disabled HARQ processes. In some cases, feedback-disabled HARQ processes may be used to reduce the impact and/or likelihood of HARQ stalling occurring in a network with a relatively high RTT between a UE and a base station. For example, TBs may be scheduled to a feedback-disabled HARQ process in the same or similar manner as described above with respect to feedback-enabled HARQ processes. However, in a feedback-disabled HARQ process, the UE may not generate or transmit feedback for TBs received on the feedback-disabled HARQ processes. Additionally, or alternatively, a base station can transmit or schedule subsequent TBs to the UE on the feedback-disabled HARQ process without waiting to receive a HARQ ACK/NACK from the UE (e.g., for the previously scheduled TBs).

Feedback-disabled HARQ processes can be used to reduce or prevent HARQ stalling, but in some cases, cannot be used to entirely replace feedback-enabled HARQ processes (e.g., because some TBs and/or HARQ processes may still depend on the exchange of HARQ ACKs/NACKs between the UE and the base station). For example, a UE that communicates with a base station using eMTC/NB-IoT over NTN might be associated with one or more HARQ processes that are used to transmit TBs with important or sensitive data for which HARQ ACKs/NACKs should be used to handle missing or erroneous TBs.

In some examples of eMTC over NTN and/or NB-IoT over NTN, a UE might communicate with a base station using a combination of feedback-enabled HARQ processes and feedback-disabled HARQ processes. For example, the UE and base station may use multi-TB scheduling, in which one or more feedback-enabled HARQ processes and one or more feedback-disabled HARQ processes are scheduling using a single DCI. As mentioned previously, existing approaches for eMTC and NB-IoT may assume that all of the TBs scheduled by a single DCI have HARQ feedback enabled. In some cases, existing specifications for multi-TB scheduling in eMTC and/or NB-IoT may assume that each TB included in the multi-TB scheduling has HARQ feedback enabled. There is a need for systems and techniques that can be used to perform multi-TB scheduling for co-existing feedback-enabled HARQ processes and feedback-disabled HARQ processes. For example, there is a need for systems and techniques that can be used to perform multi-TB scheduling for co-existing feedback-enabled and feedback-disabled HARQ processes in eMTC over NTN and NB-IoT over NTN.

Systems, apparatuses, processes (also referred to as methods), and computer-readable media (collectively referred to as "systems and techniques") are described herein for multi-TB scheduling of feedback-enabled HARQ processes and feedback-disabled HARQ processes. For example, the systems and techniques can be used to perform multi-TB scheduling of feedback-enabled HARQ processes and feedback-disabled HARQ processes in eMTC and/or eMTC over NTN. In some examples, the systems and techniques can be used to perform multi-TB scheduling of feedback-enabled HARQ processes and feedback-disabled HARQ processes in NB-IoT and/or NB-IoT over NTN. For example, in eMTC or NB-IoT, a UE may receive a plurality of downlink communications (e.g., TBs) from a base station over multiple HARQ processes. One or more of the HARQ processes may have HARQ feedback disabled (e.g., a feedback-disabled HARQ process). For example, a HARQ process can have HARQ feedback disabled to prevent or reduce throughput loss associated with HARQ stalling and/or the RTT between the UE and the base station. Additionally, one or more of the HARQ processes may have HARQ feedback enabled (e.g., a feedback-enabled HARQ process).

In some aspects, a UE can receive a plurality of TBs using a combination of feedback-disabled HARQ processes and feedback-enabled HARQ processes, which may be scheduled by a single Downlink Control Information (DCI) (e.g., multi-TB scheduled). In some examples, the systems and techniques can be used to determine one or more uplink communications in response to some, or all, of the multi-scheduled TBs associated with the single DCI. For example, HARQ ACK bits (e.g., 0 or 1 for ACK or NACK, respectively) can be determined for the TBs received over a feedback-enabled HARQ process included in the multi-TB scheduled block. In some cases, one or more dummy bits can be determined for the TBs received over a feedback-disabled HARQ process included in the multi-TB scheduled block. In some examples, dummy bits, other feedback, and/or an uplink communication can be omitted for some, or all, of the TBs received over a feedback-disabled HARQ process included in the multi-TB scheduled block.

In some examples, multi-TB scheduling can be performed for HARQ processes that have HARQ feedback enabled (e.g., feedback-enabled HARQ processes). Feedback-disabled HARQ processes can be transmitted without multi-TB scheduling. In some examples, multi-TB scheduling can be performed for only feedback-disabled HARQ processes, and feedback-enabled HARQ processes can be transmitted without multi-TB scheduling. In some aspects, multi-TB scheduling can be performed separately for sets of feedback-enabled HARQ processes and for sets of feedback-disabled HARQ processes, without performing multi-TB scheduling for heterogeneous sets of feedback-enabled and feedback-disabled HARQ processes.

In some examples, the systems and techniques can be used to perform multi-TB scheduling for one or more combinations (e.g., heterogeneous sets) of feedback-enabled HARQ processes and feedback-disabled HARQ processes. For example, the systems and techniques can determine a HARQ-ACK transmission timeline (also referred to herein as a "transmission schedule" or a "transmission configuration") for uplink transmission of the determined uplink communications (e.g., the determined HARQ-ACK bits). For example, each TB of the multi-TB scheduled block may be received in a different downlink time slot or sub-frame at the UE. The UE can generate or schedule a multi-HARQ scheduled block in response to receiving the TBs of the multi-TB scheduled block. In some aspects, the multi-HARQ scheduled block can include a HARQ-ACK bit (e.g., HARQ ACK/NACK) determined for each TB received over a feedback-enabled HARQ process, wherein the HARQ-ACK bit's relative position in the multi-HARQ scheduled block is the same as, or otherwise based on, the corresponding TB's relative position in the multi-TB scheduled block. In some examples, the multi-HARQ scheduled block can include a "hole" or empty uplink slot/sub-frame for each TB received over a feedback-disabled HARQ process. The position of the empty uplink slots or sub-frames in the multi-HARQ scheduled block can be the same as, or otherwise based on, the corresponding position(s) of the feedback-disabled TBs in the multi-TB scheduled block. In some cases, the multi-HARQ scheduled block can be generated to omit any empty uplink slots or subframes associated with the feedback-disabled TBs of the multi-TB scheduled block. For example, the multi-HARQ scheduled block can include only the HARQ-ACK bits generated for the feedback-enabled TBs of the multi-TB scheduled block, in the same relative order as the feedback-enabled TBs were received in the multi-TB scheduled block.

In some examples, the systems and techniques can be used to perform multi-TB scheduling for one or more combinations (e.g., heterogeneous sets) of feedback-enabled HARQ processes and feedback-disabled HARQ processes by scheduling the feedback-enabled HARQ processes consecutively (e.g., in the multi-TB scheduled block received by the UE and in the multi-HARQ-ACK scheduled block generated by the UE as feedback based on the multi-TB scheduled block). In some cases, the feedback-disabled HARQ processes can additionally be scheduled consecutively, either before or after the consecutively scheduled feedback-enabled HARQ processes.

In some aspects, the multi-TB scheduled block can include one or more feedback-enabled HARQ processes and one or more feedback-disabled HARQ processes, wherein the multi-TB scheduled block is divided into multiple TB bundles. Each TB bundle may include a unique subset of the HARQ processes and TBs included in or otherwise associated with the multi-TB scheduled block. In some examples, the systems and techniques can perform multi-TB scheduling by generating a "dummy" (e.g., placeholder) HARQ-ACK bit or value for any feedback-disabled TB in the one or more TB bundles. In some cases, a dummy or placeholder HARQ-ACK is not generated for feedback-disabled TBs that are included in a bundle that includes only feedback-disabled TBs (e.g., if the bundle does not include at least one feedback-enabled TB, no dummy HARQ-ACK is generated for any of the TBs within the bundle). In some aspects, if a bundle includes at least one feedback-enabled TB, a dummy HARQ-ACK bit can be generated for each feedback-disabled TB included in the bundle and a HARQ-ACK bit can be generated for each feedback-enabled TB included in the bundle.

Various aspects of the present disclosure will be described below with respect to the figures.

As used herein, the terms "user equipment" (UE) and "network entity" are not intended to be specific or otherwise limited to any particular radio access technology (RAT), unless otherwise noted. In general, a UE may be any wireless communication device (e.g., a mobile phone, router, tablet computer, laptop computer, and/or tracking device, etc.), wearable (e.g., smartwatch, smart-glasses, wearable ring, and/or an extended reality (XR) device such as a virtual reality (VR) headset, an augmented reality (AR) headset or glasses, or a mixed reality (MR) headset), vehicle (e.g., automobile, motorcycle, bicycle, etc.), aircraft (e.g., an airplane, jet, unmanned aerial vehicle (UAE) or drone, helicopter, airship, glider, etc.), and/or Internet of Things (IoT) device, etc., used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11 communication standards, etc.) and so on.

A network entity can be implemented in an aggregated or monolithic base station architecture, or alternatively, in a disaggregated base station architecture, and may include one or more of a central unit (CU), a distributed unit (DU), a radio unit (RU), a Near-Real Time (Near-RT) RAN Intelligent Controller (RIC), or a Non-Real Time (Non-RT) RIC. A base station (e.g., with an aggregated/monolithic base station architecture or disaggregated base station architecture) may operate according to one of several RATs in communication with UEs depending on the network in which it is deployed, and may be alternatively referred to as an access point (AP), a network node, a NodeB (NB), an evolved NodeB (eNB), a next generation eNB (ng-eNB), a New Radio (NR) Node B (e.g., also referred to as a gNB or gNodeB), etc. A base station may be used primarily to support wireless access by UEs, including supporting data, voice, and/or signaling connections for the supported UEs. In some systems, a base station may provide edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, or a forward traffic channel, etc.). The term traffic channel (TCH), as used herein, can refer to either an uplink, reverse or downlink, and/or a forward traffic channel.

The term "network entity" or "base station" (e.g., with an aggregated/monolithic base station architecture or disaggregated base station architecture) may refer to a single physical transmit receive point (TRP) or to multiple physical TRPs that may or may not be co-located. For example, where the term "network entity" or "base station" refers to a single physical TRP, the physical TRP may be an antenna of the base station corresponding to a cell (e.g., or several cell sectors) of the base station. Where the term "network entity" or "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (e.g., a network of spatially separated antennas connected to a common source via a transport medium) or a remote radio head (RRH) (e.g., a remote base station connected to a serving base station). Alternatively, the non-co-located physical TRPs may be the serving base station receiving the measurement report from the UE and a neighbor base station whose reference radio frequency (RF) signals (e.g., or simply "reference signals") the UE is measuring. Because a TRP is the point from which a base station transmits and receives wireless signals, as used herein, references to transmission from or reception at a base station are to be understood as referring to a particular TRP of the base station.

In some implementations that support positioning of UEs, a network entity or base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An RF signal comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

Various aspects of the systems and techniques described herein will be discussed below with respect to the figures. According to various aspects, FIG. 1 illustrates an example of a wireless communications system 100. The wireless communications system 100 (e.g., which may also be referred to as a wireless wide area network (WWAN)) can include various base stations 102 and various UEs 104. In some aspects, the base stations 102 may also be referred to as "network entities" or "network nodes." One or more of the base stations 102 can be implemented in an aggregated or monolithic base station architecture. Additionally, or alternatively, one or more of the base stations 102 can be implemented in a disaggregated base station architecture, and may include one or more of a central unit (CU), a distributed unit (DU), a radio unit (RU), a Near-Real Time (Near-RT) RAN Intelligent Controller (RIC), or a Non-Real Time (Non-RT) RIC. The base stations 102 can include macro cell base stations (high power cellular base stations) and/or small cell base stations (low power cellular base stations). In an aspect, the macro cell base station may include eNBs and/or ng-eNBs where the wireless communications system 100 corresponds to a long term evolution (LTE) network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (e.g., which may be part of core network 170 or may be external to core network 170). In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC or 5GC) over backhaul links 134, which may be wired and/or wireless.

The base stations 102 may wirelessly communicate with the UEs 104. Each of the base stations 102 may provide communication coverage for a respective geographic coverage area 110. In an aspect, one or more cells may be supported by a base station 102 in each coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (e.g., also referred to as reverse link) transmissions from a UE 104 to a base station 102 and/or downlink (e.g., also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a WLAN AP 150 in communication with WLAN stations (STAs) 152 via communication links 154 in an unlicensed frequency spectrum (e.g., 5 Gigahertz (GHz)). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available. In some examples, the wireless communications system 100 can include devices (e.g., UEs, etc.) that communicate with one or more UEs 104, base stations 102, APs 150, etc. utilizing the ultra-wideband (UWB) spectrum. The UWB spectrum can range from 3.1 to 10.5 GHz.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE and/or 5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. The mmW base station 180 may be implemented in an aggregated or monolithic base station architecture, or alternatively, in a disaggregated base station architecture (e.g., including one or more of a CU, a DU, a RU, a Near-RT RIC, or a Non-RT RIC). Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW and/or near mmW radio frequency band have high path loss and a relatively short range. The mmW base station 180 and the UE 182 may utilize beamforming (e.g., transmit and/or receive) over an mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

In some aspects relating to 5G, the frequency spectrum in which wireless network nodes or entities (e.g., base stations 102/180, UEs 104/182) operate is divided into multiple frequency ranges, FR1 (e.g., from 450 to 6000 Megahertz (MHz)), FR2 (e.g., from 24250 to 52600 MHz), FR3 (e.g., above 52600 MHz), and FR4 (e.g., between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (e.g., whether a PCell or an SCell) corresponds to a carrier frequency and/or component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). In carrier aggregation, the base stations 102 and/or the UEs 104 may use spectrum up to Y MHz (e.g., 5, 10, 15, 20, 100 MHz) bandwidth per carrier up to a total of Yx MHz (e.g., x component carriers) for transmission in each direction. The component carriers may or may not be adjacent to each other on the frequency spectrum. Allocation of carriers may be asymmetric with respect to the downlink and uplink (e.g., more or less carriers may be allocated for downlink than for uplink). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (e.g., 40 MHz), compared to that attained by a single 20 MHz carrier.

In order to operate on multiple carrier frequencies, a base station 102 and/or a UE 104 can be equipped with multiple receivers and/or transmitters. For example, a UE 104 may have two receivers, "Receiver 1" and "Receiver 2," where "Receiver 1" is a multi-band receiver that can be tuned to band (e.g., carrier frequency) 'X' or band 'Y,' and "Receiver 2" is a one-band receiver tunable to band 'Z' only. In this example, if the UE 104 is being served in band 'X,' band 'X' would be referred to as the PCell or the active carrier frequency, and "Receiver 1" would need to tune from band 'X' to band 'Y' (e.g., an SCell) in order to measure band 'Y' (and vice versa). In contrast, whether the UE 104 is being served in band 'X' or band 'Y,' because of the separate "Receiver 2," the UE 104 can measure band 'Z' without interrupting the service on band 'X' or band 'Y.'

The wireless communications system 100 may further include a UE 164 that may communicate with a macro cell base station 102 over a communication link 120 and/or the mmW base station 180 over an mmW communication link 184. For example, the macro cell base station 102 may support a PCell and one or more SCells for the UE 164 and the mmW base station 180 may support one or more SCells for the UE 164.

The wireless communications system 100 may further include one or more UEs, such as UE 190, that connects indirectly to one or more communication networks via one or more device-to-device (D2D) peer-to-peer (P2P) links (e.g., also referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (e.g., through which UE 190 may indirectly obtain WLAN-based Internet connectivity). In an example, the D2D P2P links 192 and 194 may be supported with any well-known D2D RAT, such as LTE Direct (LTE-D), Wi-Fi Direct (Wi-Fi-D), Bluetooth®, and so on.

Figure 2:
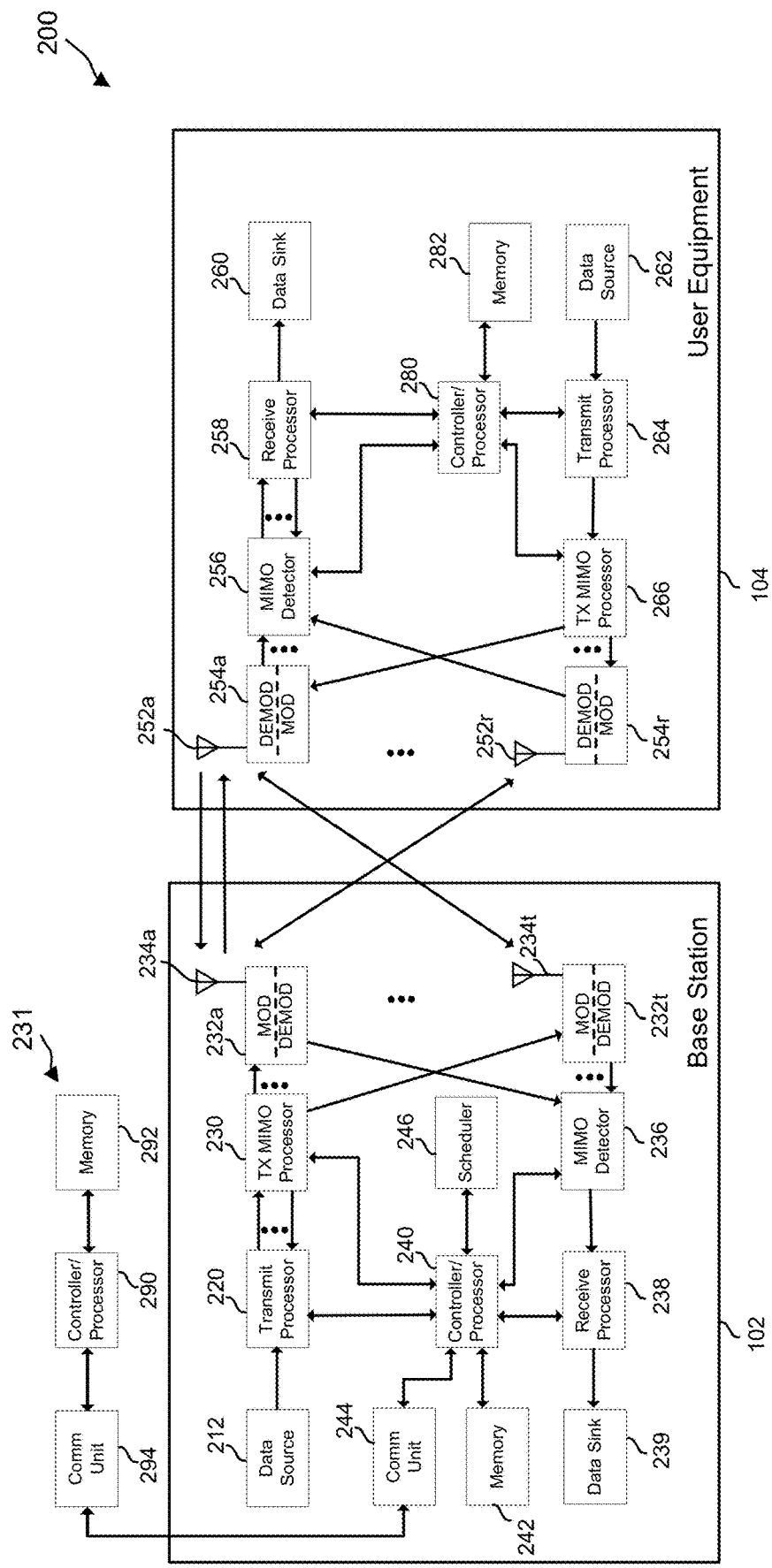
FIG. 2 is a diagram illustrating a design of a base station and a User Equipment (UE) device that enable transmission and processing of signals exchanged between the UE and the base station, in accordance with some examples.

FIG. 2 shows a block diagram of a design of a base station 102 and a UE 104 that enable transmission and processing of signals exchanged between the UE and the base station, in accordance with some aspects of the present disclosure. Design 200 includes components of a base station 102 and a UE 104, which may be one of the base stations 102 and one of the UEs 104 in FIG. 1. Base station 102 may be equipped with T antennas 234a through 234t, and UE 104 may be equipped with R antennas 252a through 252r, where in general T≥1 and R≥1.

At base station 102, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS))). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. The modulators 232a through 232t are shown as a combined modulator-demodulator (MOD-DEMOD). In some cases, the modulators and demodulators can be separate components. Each modulator of the modulators 232a to 232t may process a respective output symbol stream, e.g., for an orthogonal frequency-division multiplexing (OFDM) scheme and/or the like, to obtain an output sample stream. Each modulator of the modulators 232a to 232t may further process (e.g., convert to analog, amplify, filter, and upconvert) the output sample stream to obtain a downlink signal. T downlink signals may be transmitted from modulators 232a to 232t via T antennas 234a through 234t, respectively. According to certain aspects described in more detail below, the synchronization signals can be generated with location encoding to convey additional information.

At UE 104, antennas 252a through 252r may receive the downlink signals from base station 102 and/or other base stations and may provide received signals to demodulators (DEMODs) 254a through 254r, respectively. The demodulators 254a through 254r are shown as a combined modulator-demodulator (MOD-DEMOD). In some cases, the modulators and demodulators can be separate components. Each demodulator of the demodulators 254a through 254r may condition (e.g., filter, amplify, downconvert, and digitize) a received signal to obtain input samples. Each demodulator of the demodulators 254a through 254r may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 104 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 104, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals (e.g., based at least in part on a beta value or a set of beta values associated with the one or more reference signals). The symbols from transmit processor 264 may be precoded by a TX-MIMO processor 266 if application, further processed by modulators 254a through 254r (e.g., for DFT-s-OFDM, CP-OFDM, and/or the like), and transmitted to base station 102. At base station 102, the uplink signals from UE 104 and other UEs may be received by antennas 234a through 234t, processed by demodulators 232a through 232t, detected by a MIMO detector 236 if applicable, and further processed by a receive processor 238 to obtain decoded data and control information sent by UE 104. Receive processor 238 may provide the decoded data to a data sink 239 and the decoded control information to controller (e.g., processor) 240. Base station 102 may include communication unit 244 and communicate to a network controller 231 via communication unit 244. Network controller 231 may include communication unit 294, controller/processor 290, and memory 292.

In some aspects, one or more components of UE 104 may be included in a housing. Controller 240 of base station 102, controller/processor 280 of UE 104, and/or any other component(s) of FIG. 2 may perform one or more techniques associated with implicit UCI beta value determination for NR.

Memories 242 and 282 may store data and program codes for the base station 102 and the UE 104, respectively. A scheduler 246 may schedule UEs for data transmission on the downlink, uplink, and/or sidelink.

In some aspects, deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (e.g., such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (e.g., such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units (e.g., a virtual central unit (VCU), a virtual distributed unit (VDU), or a virtual radio unit (VRU)).

Base station-type operation or network design may consider aggregation characteristics of base station functionality. For example, disaggregated base stations may be utilized in an integrated access backhaul (IAB) network, an open radio access network (O-RAN (e.g., such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 3:
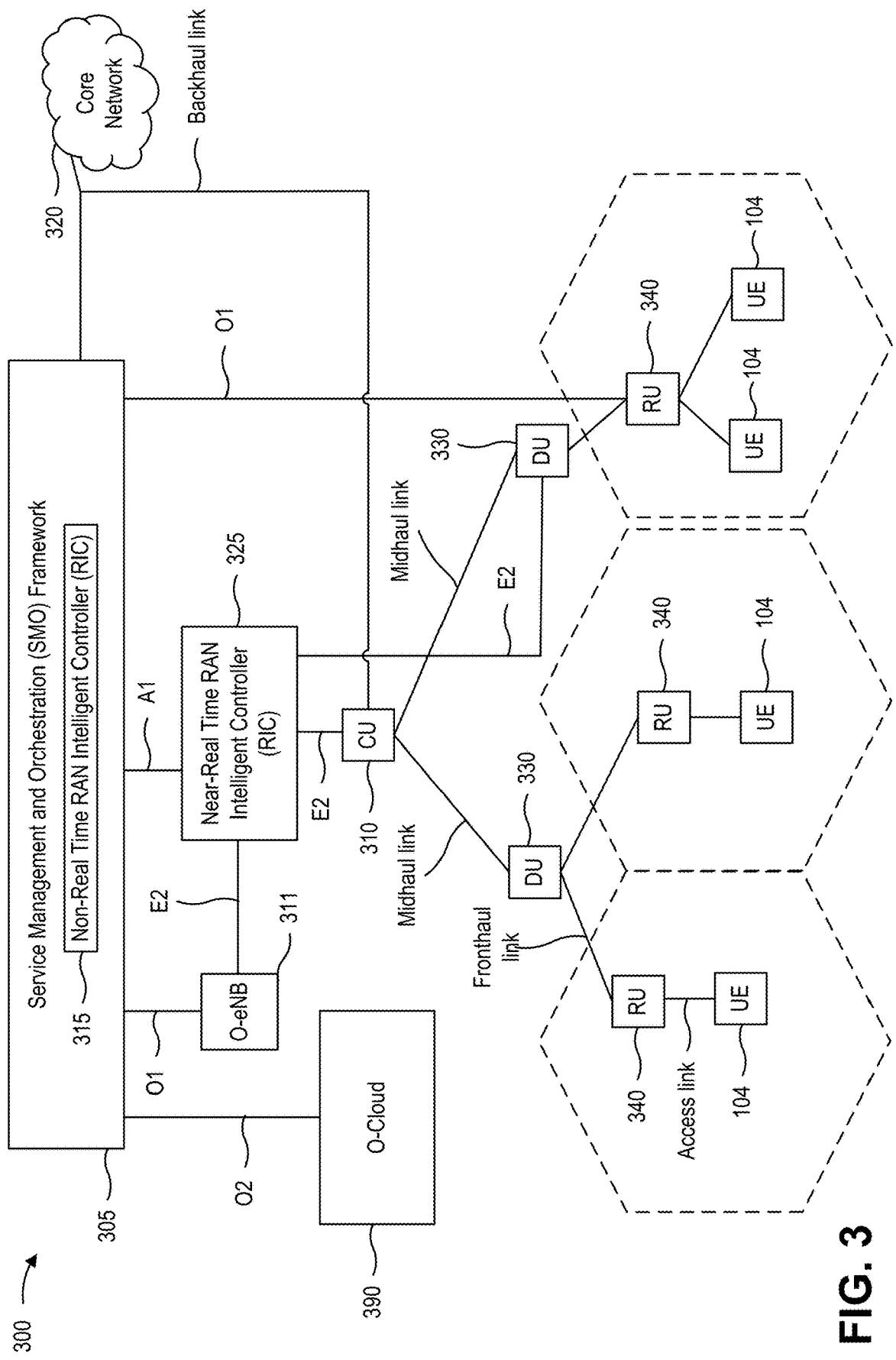
FIG. 3 is a diagram illustrating an example of a disaggregated base station, in accordance with some examples.

FIG. 3 shows a diagram illustrating an example disaggregated base station 300 architecture. The disaggregated base station 300 architecture may include one or more central units (CUs) 310 that can communicate directly with a core network 320 via a backhaul link, or indirectly with the core network 320 through one or more disaggregated base station units (e.g., such as a Near-Real Time (Near-RT) RAN Intelligent Controller (RIC) 325 via an E2 link, or a Non-Real Time (Non-RT) RIC 315 associated with a Service Management and Orchestration (SMO) Framework 305, or both). A CU 310 may communicate with one or more distributed units (DUs) 330 via respective midhaul links, such as an F1 interface. The DUs 330 may communicate with one or more radio units (RUs) 340 via respective fronthaul links. The RUs 340 may communicate with respective UEs 104 via one or more radio frequency (RF) access links. In some implementations, the UE 104 may be simultaneously served by multiple RUs 340.

Each of the units, e.g., the CUs 310, the DUs 330, the RUs 340, as well as the Near-RT RICs 325, the Non-RT RICs 315 and the SMO Framework 305, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (e.g., such as a radio frequency (RF) transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (e.g., Central Unit—User Plane (CU-UP)), control plane functionality (e.g., Central Unit—Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (e.g., such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (e.g., such as performing fast Fourier transform (FFT), inverse FFT (iFFT), digital beamforming, physical random-access channel (PRACH) extraction and filtering, or the like), or both, based at least in part on the functional split, such as a lower layer functional split. In such an architecture, the RU(s) 340 can be implemented to handle over the air (OTA) communication with one or more UEs 104. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (e.g., such as an O1 interface). For virtualized network elements, the SMO Framework 305 may be configured to interact with a cloud computing platform (e.g., such as an open cloud (O-Cloud) 390) to perform network element life cycle management (e.g., such as to instantiate virtualized network elements) via a cloud computing platform interface (e.g., such as an O2 interface). Such virtualized network elements can include, but are not limited to, CUs 310, DUs 330, RUs 340 and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (e.g., such as via an A1 interface) the Near-RT RIC 325. The Near-RT RIC 325 may be configured to include a logical function that enables near-real-time control and optimization of RAN elements and resources via data collection and actions over an interface (e.g., such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (e.g., such as reconfiguration via O1) or via creation of RAN management policies (e.g., such as A1 policies).

Figure 4:
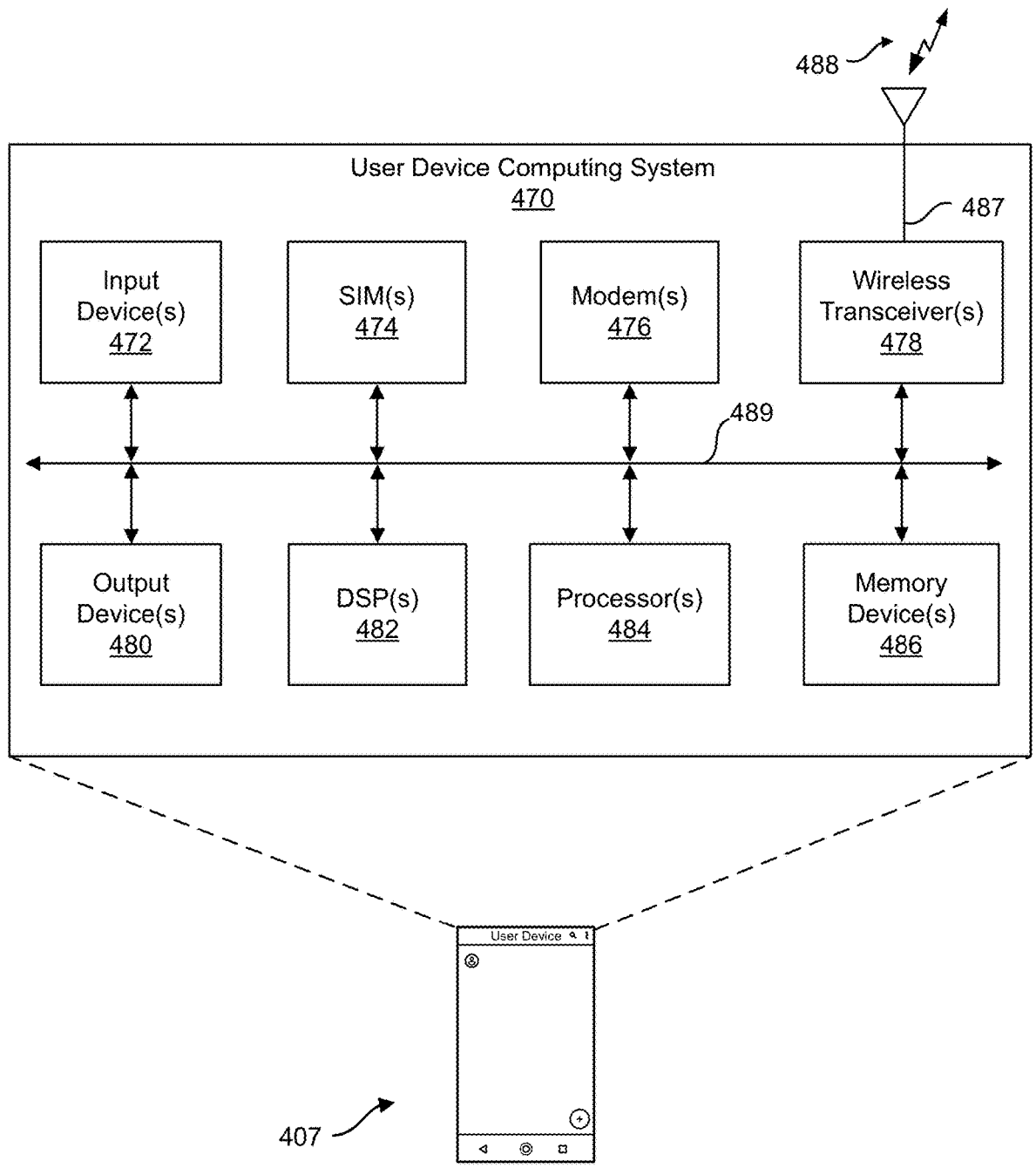
FIG. 4 is a block diagram illustrating components of a user equipment, in accordance with some examples.

FIG. 4 illustrates an example of a computing system 470 of a wireless device 407. The wireless device 407 may include a client device such as a UE (e.g., UE 104, UE 152, UE 190) or other type of device (e.g., a station (STA) configured to communication using a Wi-Fi interface) that may be used by an end-user. For example, the wireless device 407 may include a mobile phone, router, tablet computer, laptop computer, tracking device, wearable device (e.g., a smart watch, glasses, an extended reality (XR) device such as a virtual reality (VR), augmented reality (AR) or mixed reality (MR) device, etc.), Internet of Things (IoT) device, a vehicle, an aircraft, and/or another device that is configured to communicate over a wireless communications network. The computing system 470 includes software and hardware components that may be electrically or communicatively coupled via a bus 489 (or may otherwise be in communication, as appropriate). For example, the computing system 470 includes one or more processors 484. The one or more processors 484 may include one or more CPUs, ASICs, FPGAs, APs, GPUs, VPUs, NSPs, microcontrollers, dedicated hardware, any combination thereof, and/or other processing device or system. The bus 489 may be used by the one or more processors 484 to communicate between cores and/or with the one or more memory devices 486.

The computing system 470 may also include one or more memory devices 486, one or more digital signal processors (DSPs) 482, one or more SIMs 474, one or more modems 476, one or more wireless transceivers 478, an antenna 487, one or more input devices 472 (e.g., a camera, a mouse, a keyboard, a touch sensitive screen, a touch pad, a keypad, a microphone, and/or the like), and one or more output devices 480 (e.g., a display, a speaker, a printer, and/or the like).

In some aspects, computing system 470 may include one or more radio frequency (RF) interfaces configured to transmit and/or receive RF signals. In some examples, an RF interface may include components such as modem(s) 476, wireless transceiver(s) 478, and/or antennas 487. The one or more wireless transceivers 478 may transmit and receive wireless signals (e.g., signal 488) via antenna 487 from one or more other devices, such as other wireless devices, network devices (e.g., base stations such as eNBs and/or gNBs, Wi-Fi access points (APs) such as routers, range extenders or the like, etc.), cloud networks, and/or the like. In some examples, the computing system 470 may include multiple antennas or an antenna array that may facilitate simultaneous transmit and receive functionality. Antenna 487 may be an omnidirectional antenna such that radio frequency (RF) signals may be received from and transmitted in all directions. The wireless signal 488 may be transmitted via a wireless network. The wireless network may be any wireless network, such as a cellular or telecommunications network (e.g., 3G, 4G, 5G, etc.), wireless local area network (e.g., a Wi-Fi network), a Bluetooth™ network, and/or other network.

In some examples, the wireless signal 488 may be transmitted directly to other wireless devices using sidelink communications (e.g., using a PC5 interface, using a DSRC interface, etc.). Wireless transceivers 478 may be configured to transmit RF signals for performing sidelink communications via antenna 487 in accordance with one or more transmit power parameters that may be associated with one or more regulation modes. Wireless transceivers 478 may also be configured to receive sidelink communication signals having different signal parameters from other wireless devices.

In some examples, the one or more wireless transceivers 478 may include an RF front end including one or more components, such as an amplifier, a mixer (also referred to as a signal multiplier) for signal down conversion, a frequency synthesizer (also referred to as an oscillator) that provides signals to the mixer, a baseband filter, an analog-to-digital converter (ADC), one or more power amplifiers, among other components. The RF front-end may generally handle selection and conversion of the wireless signals 488 into a baseband or intermediate frequency and may convert the RF signals to the digital domain.

In some cases, the computing system 470 may include a coding-decoding device (or CODEC) configured to encode and/or decode data transmitted and/or received using the one or more wireless transceivers 478. In some cases, the computing system 470 may include an encryption-decryption device or component configured to encrypt and/or decrypt data (e.g., according to the AES and/or DES standard) transmitted and/or received by the one or more wireless transceivers 478.

The one or more SIMs 474 may each securely store an international mobile subscriber identity (IMSI) number and related key assigned to the user of the wireless device 407. The IMSI and key may be used to identify and authenticate the subscriber when accessing a network provided by a network service provider or operator associated with the one or more SIMs 474. The one or more modems 476 may modulate one or more signals to encode information for transmission using the one or more wireless transceivers 478. The one or more modems 476 may also demodulate signals received by the one or more wireless transceivers 478 in order to decode the transmitted information. In some examples, the one or more modems 476 may include a Wi-Fi modem, a 4G (or LTE) modem, a 5G (or NR) modem, and/or other types of modems. The one or more modems 476 and the one or more wireless transceivers 478 may be used for communicating data for the one or more SIMs 474.

The computing system 470 may also include (and/or be in communication with) one or more non-transitory machine-readable storage media or storage devices (e.g., one or more memory devices 486), which may include, without limitation, local and/or network accessible storage, a disk drive, a drive array, an optical storage device, a solid-state storage device such as a RAM and/or a ROM, which may be programmable, flash-updateable and/or the like. Such storage devices may be configured to implement any appropriate data storage, including without limitation, various file systems, database structures, and/or the like.

In various aspects, functions may be stored as one or more computer-program products (e.g., instructions or code) in memory device(s) 486 and executed by the one or more processor(s) 484 and/or the one or more DSPs 482. The computing system 470 may also include software elements (e.g., located within the one or more memory devices 486), including, for example, an operating system, device drivers, executable libraries, and/or other code, such as one or more application programs, which may comprise computer programs implementing the functions provided by various aspects, and/or may be designed to implement methods and/or configure systems, as described herein.

In some aspects, the wireless device 407 (e.g., a UE) can include means for performing operations described herein. The means can include one or more of the components of the computing system 470. For example, the means for performing operations described herein may include one or more of input device(s) 472, SIM(s) 474, modems(s) 476, wireless transceiver(s) 478, output device(s) (480), DSP(s) 482, processors (484), memory device(s) 486, and/or antenna(s) 487.

In some aspects, the UE 407 can include means for receiving a downlink transmission in a first downlink time slot and means for receiving an update to a scheduling offset (e.g., $K_{offset}$) associated with a propagation time delay of communications between the UE and a network entity. For example, the update indicates an updated scheduling offset (e.g., an updated $K_{offset}$) different than the scheduling offset. In some aspects, the UE 407 may further include means for transmitting, using a second uplink time slot, an uplink transmission associated with the downlink transmission, wherein the second uplink time slot is determined based on a first uplink time slot and the selected scheduling offset. In some aspects, the UE 407 may further include means for determining a selected scheduling offset as one of the scheduling offset or the updated scheduling offset.

In some examples, the means for receiving can include the one or more wireless transceivers 478, the one or more modems 476, the one or more SIMs 474, the one or more processors 484, the one or more DSPs 482, the one or more memory devices 486, any combination thereof, or other component(s) of the client device. In some examples, the means for determining can include the one or more processors 484, the one or more DSPs 482, the one or more memory devices 486, any combination thereof, or other component(s) of the client device. In some examples, the means for transmitting can include the one or more wireless transceivers 478, the one or more modems 476, the one or more SIMs 474, the one or more processors 484, the one or more DSPs 482, the one or more memory devices 486, any combination thereof, or other component(s) of the client device.

Figure 5A:
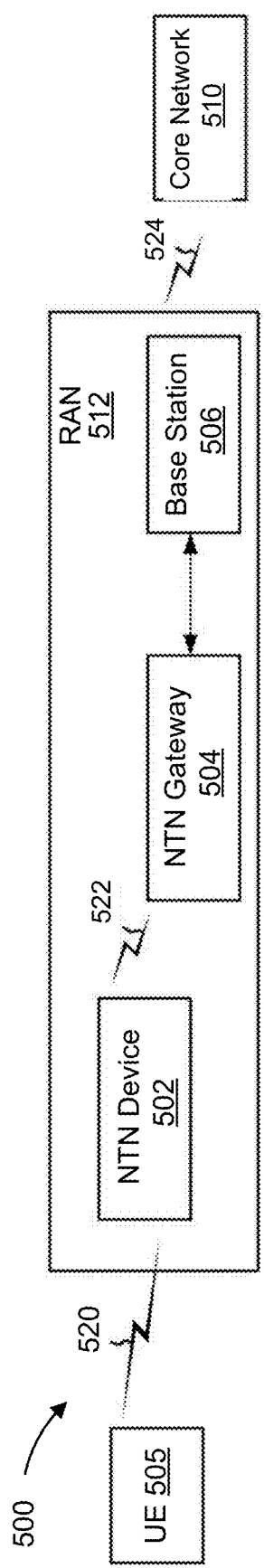
FIGS. 5A, 5B, and 5C are diagrams illustrating examples of a network architecture that supports communication via a Non-Terrestrial Network (NTN) device, in accordance with some examples.

FIG. 5A provides a generalized illustration of various components, any or all of which may be utilized as appropriate, and each of which may be duplicated or omitted, as necessary. The example of FIG. 5A includes one UE 505, although it should be understood that many UEs (e.g., hundreds, thousands, millions, etc.) may utilize the network architecture 500. Similarly, the network architecture 500 may include a larger (or smaller) number of Non-Terrestrial Network (NTN) devices, NTN gateways, base stations, RAN, core networks, and/or other components. The illustrated connections that connect the various components in the network architecture 500 include data and signaling connections which may include additional (intermediary) components, direct or indirect physical and/or wireless connections, and/or additional networks. Furthermore, components may be rearranged, combined, separated, substituted, and/or omitted, depending on desired functionality.

The UE 505 may be configured to communicate with the core network 510 via the NTN device 502, the NTN gateway 504, and the base station 506. As illustrated by the RAN 512, one or more RANs associated with the core network 510 may include one or more base stations. Access to the network may be provided to the UE 505 via wireless communication between the UE 505 and the base station 506 (e.g., a serving base station), via the NTN device 502 and the NTN gateway 504. The base station 506 may provide wireless communications access to the core network 510 on behalf of the UE 505, e.g., using 5G NR.

The base station 506 may be referred to by other names such as a network entity, a gNB, a base station, a network node, a "satellite node", a satellite NodeB (sNB), "satellite access node", etc. The base station 506 may not be the same as terrestrial network gNB s, but may be based on a terrestrial network gNB with additional capability. For example, the base station 506 may terminate the radio interface and associated radio interface protocols to the UE 505 and may transmit DL signals to the UE 505 and receive UL signals from the UE 505 via the NTN device 502 and the NTN gateway 504. The base station 506 may also support signaling connections and voice and data bearers to the UE 505 and may support handover of the UE 505 between different radio cells for the NTN device 502, between different NTN devices and/or between different base stations. The base station 506 may be configured to manage moving radio beams (e.g., for airborne vehicles and/or non-geostationary (non-GEO) devices) and associated mobility of the UE 505. The base station 506 may assist in the handover (or transfer) of the NTN device 502 between different NTN gateways or different base stations. In some examples, the base station 506 may be separate from the NTN gateway 504, e.g., as illustrated in the example of FIG. 5A. In other examples, the base station 506 may include or may be combined with one or more NTN gateways, e.g., using a split architecture. For example, with a split architecture, the base station 506 may include a Central Unit (CU) and the NTN gateway 504 may include or act as Distributed Unit (DU). The base station 506 may be fixed on the ground with transparent payload operation. In one implementation, the base station 506 may be physically combined with, or physically connected to, the NTN gateway 504 to reduce complexity and cost.

The NTN gateway 504 may be shared by more than one base station and may communicate with the UE 505 via the NTN device 502. The NTN gateway 504 may be dedicated to one associated constellation of NTN devices. The NTN gateway 504 may be included within the base station 506, e.g., as a base station-DU within the base station 506. The NTN gateway 504 may communicate with the NTN device 502 using control and user plane protocols. The control and user plane protocols between the NTN gateway 504 and the NTN device 502 may: (i) establish and release the NTN gateway 504 to the NTN device 502 communication links, including authentication and ciphering; (ii) update NTN device software and firmware; (iii) perform NTN device Operations and Maintenance (O&M); (iv) control radio beams (e.g., direction, power, on/off status) and mapping between radio beams and NTN gateway UL and DL payload; and/or (v) assist with handoff of the NTN device 502 or radio cell to another NTN gateway.

Support of transparent payloads with the network architecture 500 shown in FIG. 5A may impact the communication system as follows. The core network 510 may treat a satellite RAT as a new type of RAT with longer delay, reduced bandwidth and/or higher error rate. Consequently, there may be some impact to PDU session establishment and mobility management (MM) and connection management (CM) procedures. The NTN device 502 may be shared with other services (e.g., satellite television, fixed Internet access) with 5G NR mobile access for UEs added in a transparent manner. This may enable legacy NTN devices to be used and may avoid the need to deploy a new type of NTN device. The base station 506 may assist assignment and transfer of the NTN device 502 and radio cells between the base station 506 and the NTN gateway 504 and support handover of the UE 505 between radio cells, NTN devices, and other base stations. Thus, the base station 506 may differ from a terrestrial network gNB. Additionally, a coverage area of the base station 506 may be much larger than the coverage area of a terrestrial network base station.

In the illustrated example of FIG. 5A, a service link 520 may facilitate communication between the UE 505 and the NTN device 502, a feeder link 522 may facilitate communication between the NTN device 502 and the NTN gateway 504, and an interface 524 may facilitate communication between the base station 506 and the core network 510. The service link 520 and the feeder link 522 may be implemented by a same radio interface (e.g., the NR-Uu interface). The interface 524 may be implemented by the NG interface.

Figure 5B:
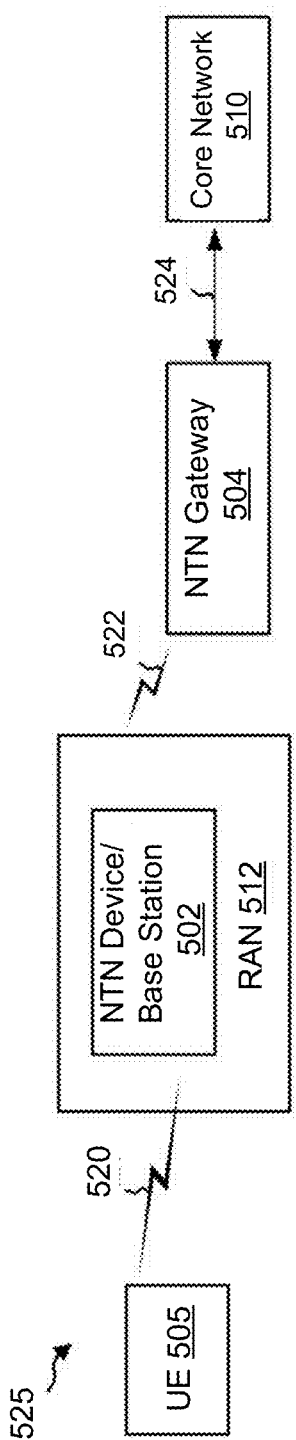

FIG. 5B shows a diagram of a network architecture 525 capable of supporting NTN access (e.g., using 5G NR). The network architecture 525 shown in FIG. 5B is similar to that shown in FIG. 5A, with like designated elements being similar or the same. FIG. 5B, however, illustrates a network architecture with regenerative payloads, as opposed to transparent payloads shown in FIG. 5A. A regenerative payload, unlike a transparent payload, includes an on-board base station (e.g., includes the functional capability of a base station), and is referred to herein as an NTN device 502/base station. The RAN 512 is illustrated as including the NTN device 502/base station. Reference to the NTN device 502/base station may refer to functions related to communication with the UE 505 and the core network 510 and/or to functions related to communication with the NTN gateway 504 and with the UE 505 at a physical radio frequency level.

An on-board base station may perform many of the same functions as the base station 506 as described previously. For example, the NTN device 502/base station may terminate the radio interface and associated radio interface protocols to the UE 505 and may transmit DL signals to the UE 505 and receive UL signals from the UE 505, which may include encoding and modulation of transmitted signals and demodulation and decoding of received signals. The NTN device 502/base station may also support signaling connections and voice and data bearers to the UE 505 and may support handover of the UE 505 between different radio cells for the NTN device 502/base station and between or among different NTN device/base stations. The NTN device 502/base station may assist in the handover (or transfer) of the UE 505 between different NTN gateways and different control networks. The NTN device 502/base station may hide or obscure specific aspects of the NTN device 502/base station from the core network 510 (e.g., by interfacing to the core network 510 in the same way or in a similar way to a terrestrial network base station). The NTN device 502/base station may further assist in sharing of the NTN device 502/base station. The NTN device 502/base station may communicate with one or more NTN gateways and with one or more core networks via the NTN gateway 504. In some aspects, the NTN device 502/base station may communicate directly with other NTN device/base stations using Inter-Satellite Links (ISLs), which may support an Xn interface between any pair of NTN device/base stations.

With low Earth orbit (LEO) devices, the NTN device 502/base station may manage moving radio cells with coverage at different times. The NTN gateway 504 may be connected directly to the core network 510, as illustrated. The NTN gateway 504 may be shared by multiple core networks, for example, if NTN gateways are limited. In some examples the core network 510 may need to be aware of coverage area(s) of the NTN device 502/base station in order to page the UE 505 and to manage handover. Thus, as can be seen, the network architecture 525 with regenerative payloads may have more impact and complexity with respect to both the NTN device 502/base station and the core network 510 than the network architecture 500 including transparent payloads, as shown in FIG. 5A.

Support of regenerative payloads with the network architecture 525 shown in FIG. 5B may impact the network architecture 525 as follows. The core network 510 may be impacted if fixed tracking areas and fixed cells are not supported, because core components of mobility management and regulatory services, which are based on fixed cells and fixed tracking areas for terrestrial PLMNs, may be replaced by a new system (e.g., based on a location of the UE 505). If fixed tracking areas and fixed cells are supported, the core network 510 may map any fixed tracking area to one or more NTN device/base stations with current radio coverage of the fixed tracking area when performing paging of the UE 505 that is located in this fixed tracking area. This could include configuration in the core network 510 of long term orbital data for the NTN device 502/base station (e.g., obtained from an operator of the NTN device 502/base station) and could add significant new impact to core network 510.

In the illustrated example of FIG. 5B, a service link 520 may facilitate communication between the UE 505 and the NTN device 502/base station, a feeder link 522 may facilitate communication between the NTN device 502/base station and the NTN gateway 504, and an interface 524 may facilitate communication between the NTN gateway 504 and the core network 510. The service link 520 may be implemented by the NR-Uu interface. The feeder link 522 may be implemented by the NG interface over SRI. The interface 524 may be implemented by the NG interface.

Figure 5C:
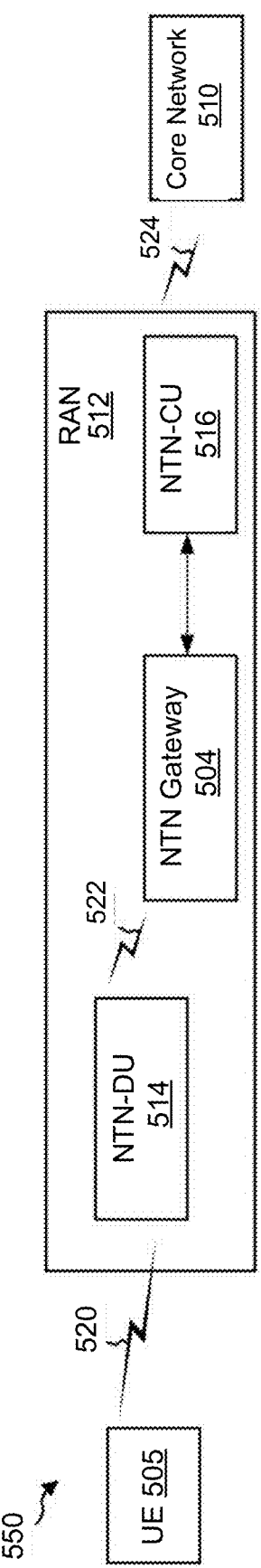

FIG. 5C is a diagram of a network architecture 550 capable of supporting NTN access (e.g., using 5G NR). The network architecture shown in FIG. 5C is similar to that shown in FIGS. 5A and 5B, with like designated elements being similar or the same. FIG. 5C, however, illustrates a network architecture with regenerative payloads, as opposed to transparent payloads, as shown in FIG. 5A, and with a split architecture for the base station. For example, the base station may be split between a Central Unit (CU) and a Distributed Unit (DU). In the illustrated example of FIG. 5C, the network architecture 550 includes an NTN-CU 516, which may be a ground-based base station or a terrestrial base station. The regenerative payloads include an on-board base station DU, and is referred to herein as an NTN-DU 514. The NTN-CU 516 and the NTN-DU 514, collectively or individually, may correspond to the network node associated with the base station 310 in FIG. 3.

The NTN-DU 514 communicates with the NTN-CU 516 via the NTN gateway 504. The NTN-CU 516 together with the NTN-DU 514 perform functions, and may use internal communication protocols, which are similar to or the same as a gNB with a split architecture. In the example, the NTN-DU 514 may correspond to and perform functions similar to or the same as a gNB Distributed Unit (gNB-DU), while the NTN-CU 516 may correspond to and perform functions similar to or the same as a gNB Central Unit (gNB-CU). However, the NTN-CU 516 and the NTN-DU 514 may each include additional capability to support the UE 505 access using NTN devices.

The NTN-DU 514 and the NTN-CU 516 may communicate with one another using an F1 Application Protocol (FLAP), and together may perform some or all of the same functions as the base station 506 or the NTN device 502/base station as described in connection with FIGS. 5B and 5C, respectively. The NTN-DU 514 may terminate the radio interface and associated lower-level radio interface protocols to the UE 505 and may transmit DL signals to the UE 505 and receive UL signals from the UE 505, which may include encoding and modulation of transmitted signals and demodulation and decoding of received signals. The operation of the NTN-DU 514 may be partly controlled by the NTN-CU 516. The NTN-DU 514 may support one or more NR radio cells for the UE 505. The NTN-CU 516 may also be split into separate control plane (CP) (NTN-CU-CP) and user plane (UP) (NTN-CU-UP) portions. The NTN-DU 514 and the NTN-CU 516 may communicate over an F1 interface to (a) support control plane signaling for the UE 505 using IP, Stream Control Transmission Protocol (SCTP) and F1 Application Protocol (FLAP) protocols, and (b) to support user plane data transfer for a UE using IP, User Datagram Protocol (UDP), PDCP, SDAP, GTP-U and NR User Plane Protocol (NRUPP) protocols.

The NTN-CU 516 may communicate with one or more other NTN-CUs and/or with one more other terrestrial base stations using terrestrial links to support an Xn interface between any pair of NTN-CUs and/or between the NTN-CU 516 and any terrestrial base station. The NTN-DU 514 together with the NTN-CU 516 may: (i) support signaling connections and voice and data bearers to the UE 505; (ii) support handover of the UE 505 between different radio cells for the NTN-DU 514 and between different NTN-DUs; and (iii) assist in the handover (or transfer) of NTN devices between different NTN gateways or different core networks. The NTN-CU 516 may hide or obscure specific aspects of the NTN devices from the core network 510 (e.g., by interfacing to the core network 510 in the same way or in a similar way to a terrestrial network base station).

In the network architecture 550 of FIG. 5C, the NTN-DU 514 that communicates with and is accessible from an NTN-CU may change over time with LEO devices. With the split base station architecture, the core network 510 may connect to NTN-CUs that are fixed and that do not change over time, which may reduce difficulty with paging of the UE 505. For example, the core network 510 may not need to know which NTN-DU is needed for paging the UE 505. The network architecture with regenerative payloads with a split base station architecture may thereby reduce the core network 510 impact at the expense of additional impact to the NTN-CU 516.

Support of regenerative payloads with a split base station architecture, as shown in FIG. 5C, may impact the network architecture 550 as follows. The impact to the core network 510 may be limited as for the transparent payloads (e.g., the NTN device 502) discussed above. For example, the core network 510 may treat a satellite RAT in the network architecture 550 as a new type of RAT with longer delay, reduced bandwidth and/or higher error rate. The impact on the NTN-DU 514 may be less than the impact on NTN device/base stations (e.g., the NTN device 502/base station with a non-split architecture), as discussed above in reference to FIG. 5B. The NTN-DU 514 may manage changing association with different (fixed) NTN-CUs. Further, the NTN-DU 514 may manage radio beams and radio cells. The NTN-CU 516 impacts may be similar to the impact of the base station 506 for a network architecture with transparent payloads, as discussed above, except for extra impacts to manage changing associations with different NTN-DUs and reduced impacts to support radio cells and radio beams, which may be transferred to the NTN-DU 514. In some aspects, the NTN device may correspond to a high altitude platform system (HAPS) that serves one or more UEs on the ground.

One or more satellites may be integrated with the terrestrial infrastructure of a wireless communication system. Satellites may refer to Low Earth Orbit (LEO) devices, Medium Earth Orbit (MEO) devices, Geostationary Earth Orbit (GEO) devices, and/or Highly Elliptical Orbit (HEO) devices. A non-terrestrial network (NTN) may refer to a network, or a segment of a network, that uses an airborne or spaceborne vehicle for transmission. An airborne vehicle may refer to High Altitude Platforms (HAPs) including Unmanned Aircraft Systems (UAS).

An NTN may be configured to help to provide wireless communication in un-served or underserved areas to upgrade the performance of terrestrial networks. For example, a communication satellite may provide coverage to a larger geographic region than a TN base station. The NTN may also reinforce service reliability by providing service continuity for UEs or for moving platforms (e.g., passenger vehicles-aircraft, ships, high speed trains, buses). The NTN may also increase service availability, including critical communications. The NTN may also enable network scalability through the provision of efficient multicast/broadcast resources for data delivery towards the network edges or even directly to the user equipment.

Figure 6:
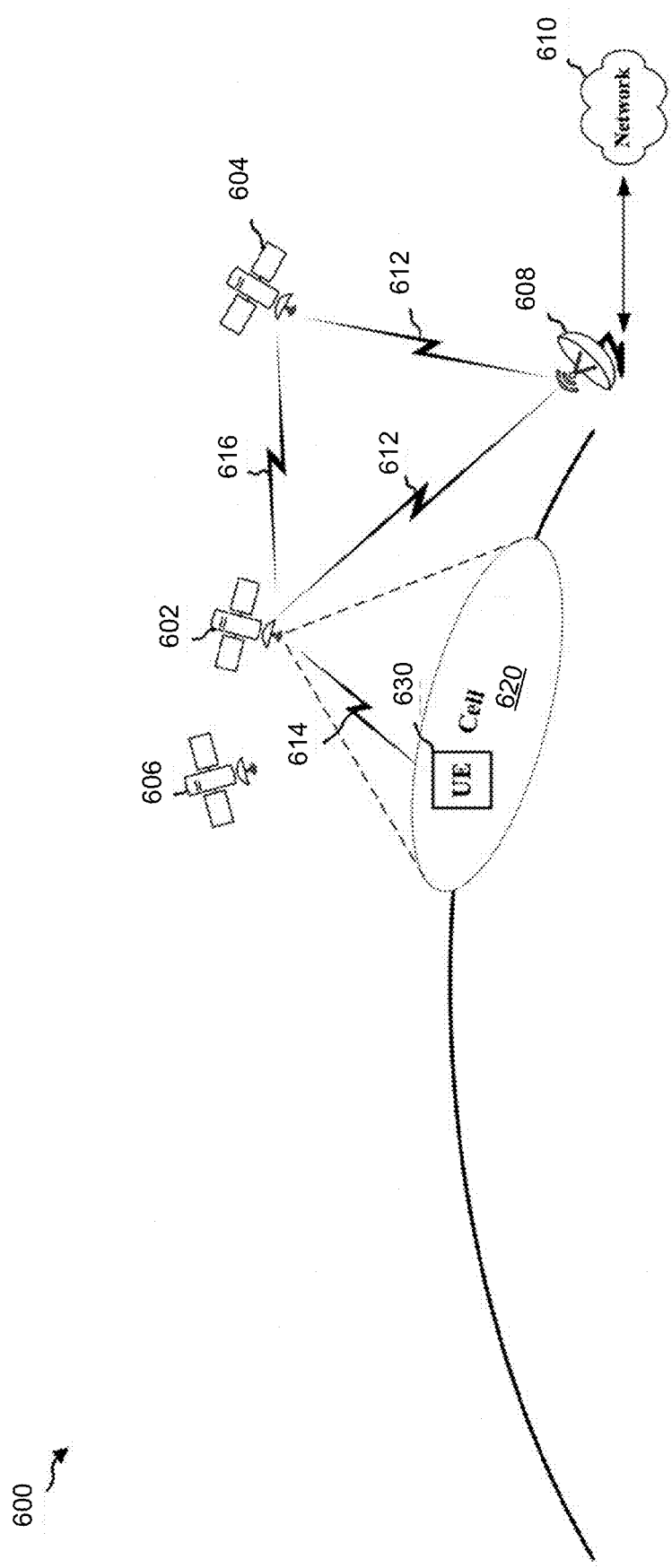
FIG. 6 is a diagram illustrating an example of an NTN configuration, in accordance with some examples.

FIG. 6 illustrates an example of an NTN 600 configuration. An NTN may refer to a network, or a segment of a network, that uses RF resources on-board an NTN platform. The NTN platform may refer to a spaceborne vehicle or an airborne vehicle. Spaceborne vehicles include communication satellites that may be classified based on their orbits. For example, a communication satellite may include a GEO device that appears stationary with respect to the Earth. As such, a single GEO device may provide coverage to a geographic coverage area. In other examples, a communication satellite may include a non-GEO device, such as an LEO device, an MEO device, or an HEO device. Non-GEO devices do not appear stationary with respect to the Earth. As such, a satellite constellation (e.g., one or more satellites) may be configured to provide coverage to the geographic coverage area. An airborne vehicle may refer to a system encompassing Tethered UAS (TUA), Lighter Than Air UAS (LTA), Heavier Than Air UAS (HTA) (e.g., in altitudes typically between 8 and 50 km including High Altitude Platforms (HAPs)).

In some aspects, the NTN 600 may include an NR-NTN. The example of FIG. 6 provides that the NTN 600 may include a first NTN device 602, a second NTN device 604, a third NTN device 606, an NTN gateway 608, a data network 610, and a UE 630 within a cell coverage of the first NTN device 602. In some aspects, the UE 630 may include IoT devices, and the UE may be connected to the NTN 600 for wireless communication.

The NTN gateway 608 may be one of one or more NTN gateways that may connect the NTN 600 to a public data network. In some examples, the NTN gateway 608 may support functions to forward a signal from the NTN device to a Uu interface, such as an NR-Uu interface. In other examples, the NTN gateway 608 may provide a transport network layer node, and may support transport protocols, such as acting as an IP router. A satellite radio interface (SRI) may provide IP trunk connections between the NTN gateway 608 and the NTN device to transport NG or F1 interfaces, respectively. One or more geosynchronous equatorial orbit (GEO) devices (e.g., which may be referred to herein as the first NTN device 602, the second NTN device 604, or the third NTN device 606) may be fed by the NTN gateway 608, and the one or more NTN devices may be deployed across the satellite targeted coverage, which may correspond to regional coverage or even continental coverage. A non-GEO device may be served successively by one or more NTN gateways at a time, and the NTN 600 may be configured to provide service and feeder link continuity between the successive serving NTN gateways with time duration to perform mobility anchoring and handover.

The first NTN device 602, including spaceborne vehicles or airborne vehicles, may communicate with the data network 610 through a feeder link 612 established between the first NTN device 602 and the NTN gateway 608 in order to provide service to the UE 630 within the cell coverage, or a field-of-view of an NTN cell 620, of the first NTN device 602 via a service link 614. The feeder link 612 may include a wireless link between an NTN gateway and an NTN device. The service link 614 may refer to a radio link between an NTN device (e.g., the first NTN device 602) and the UE 630. In some examples, the first NTN device 602 may use one or more directional beams (e.g., beamforming) to exchange communication with the UE 630. A beam may refer to a wireless communication beam generated by an antenna on-board an NTN device.

In some examples, the UE 630 may communicate with the first NTN device 602 via the service link 614. The second NTN device 604 may relay the communication for the first NTN device 602 through an inter-satellite link (ISL) 616, and the second NTN device 604 may communicate with the data network 610 through the feeder link 612 established between the second NTN device 604 and the NTN gateway 608. The ISL links may be provided between a constellation of satellites and may involve the use of transparent payloads on-board the NTN devices. The ISL may operate in an RF frequency or an optical band.

In the illustrated example of FIG. 6, the first NTN device 602 may provide the NTN cell 620 with a first physical cell ID (PCI) ("PCI1"). In some examples, a constellation of satellites may provide coverage to the NTN cell 620. For example, the first NTN device 602 may include a non-GEO device that does not appear stationary with respect to the Earth. As such, a satellite constellation (e.g., one or more satellites) may be configured to provide coverage to the NTN cell 620. For example, the first NTN device 602 and the third NTN device 606 may be part of a satellite constellation that provides coverage to the NTN cell 620.

In some examples, an NTN deployment may provide different services based on the type of payload on-board the NTN device. The type of payload may determine whether the NTN device acts as a relay node or a base station. For example, a transport payload may implement frequency conversion and a radio frequency (RF) amplifier in both uplink (UL) and downlink (DL) directions and may correspond to an analog RF repeater. A transparent payload, for example, may receive UL signals from all served UEs and may redirect the combined signals DL to an earth station without demodulating or decoding the signals. Similarly, a transparent payload may receive an UL signal from an earth station and redirect the signal DL to served UEs without demodulating or decoding the signal. However, the transparent payload may frequency convert received signals and may amplify and/or filter received signals before transmitting the signals.

As mentioned previously, in some examples one or more of eMTC and/or NB-IoT can be implemented using an NTN network (e.g., also referred to as "eMTC over NTN" and "NB-IoT over NTN," respectively). In some cases, when an eMTC or NB-IoT over NTN implementation includes one or more feedback-enabled HARQ processes, HARQ stalling may occur (e.g., based on the relatively long RTT between a UE and a base station associated with the eMTC over NTN and/or the NB-IoT over NTN network). The systems and techniques described herein can be used to perform multi-TB scheduling of feedback-enabled HARQ processes and feedback-disabled HARQ processes. For example, the systems and techniques can be used to perform multi-TB scheduling of feedback-enabled HARQ processes and feedback-disabled HARQ processes in eMTC over NTN and/or in NB-IoT over NTN, as will be described in greater depth below.

Figure 7A:
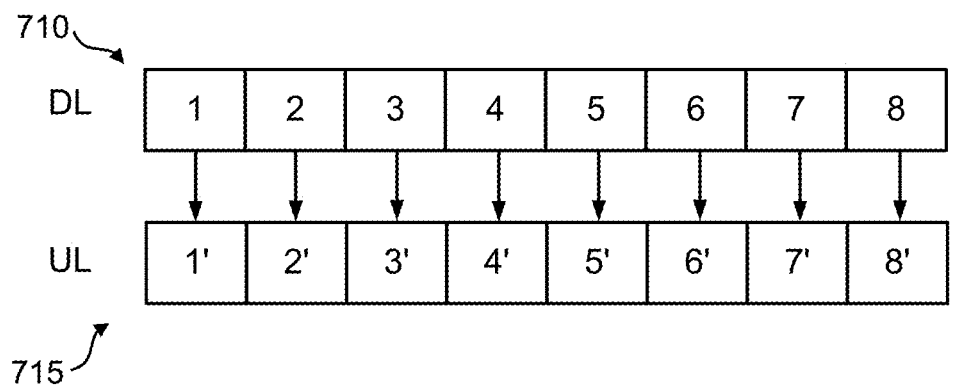
FIGS. 7A and 7B are diagrams illustrating examples of multi-Transport Block (multi-TB) scheduling, in accordance with some examples.
Figure 7B:
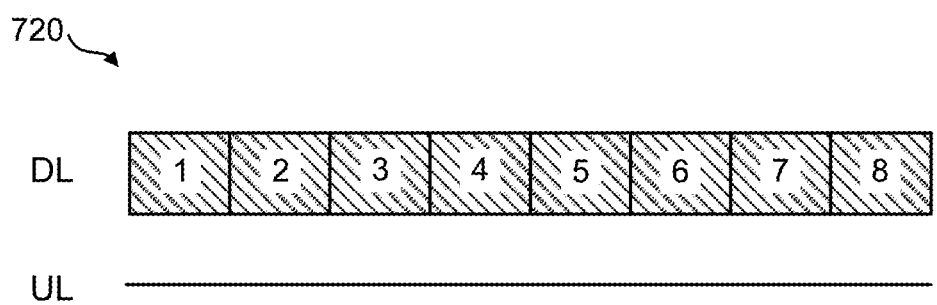

FIGS. 7A and 7B are diagrams illustrating examples of multi-TB scheduling. For example, FIG. 7A depicts an example multi-TB scheduled block 710 that includes only feedback-enabled HARQ processes 1-8 (e.g., depicted as non-shaded squares). FIG. 7B depicts an example multi-TB scheduled block 720 that includes only feedback-disabled HARQ processes 1-8 (e.g., depicted as shaded squares). As illustrated, the multi-TB scheduled blocks 710 and 720 each include a total of eight HARQ processes. Each HARQ process can be used to transmit (e.g., from a base station or NTN node to a UE) and/or receive (e.g., by a UE) a Transport Block (TB). In some cases, the example multi-TB scheduled blocks 710 and 720 can include a greater or lesser number of HARQ processes (e.g., and can be associated with a greater or lesser number of TBs carried on or associated with the HARQ processes). For example, in an NB-IoT over NTN network, the multi-TB scheduled blocks 710 and 720 may include up to two HARQ processes, up to four HARQ processes, etc. In one illustrative example, the multi-TB scheduled blocks 710 and 720 may be associated with an eMTC over NTN network, in which up to eight TBs (e.g., up to eight HARQ processes) may be scheduled in a multi-TB scheduled block. In one illustrative example, a multi-TB scheduled block can be scheduled or otherwise based on a Downlink Control Information (DCI). In some cases, a multi-TB scheduled block can be scheduled based on or using a single DCI. In some aspects, a multi-TB scheduled block can be scheduled by a DCI transmitted using PDCCH and the TBs associated with the multi-TB scheduled block can be transmitted using PDSCH (e.g., the eight TBs 1-8 included in the example multi-TB scheduled blocks 710 and 720 can be transmitted using PDSCH).

In some aspects, an example multi-TB scheduled block (e.g., 710, 720) can be received using a downlink interface associated with a UE. For example, the multi-TB scheduled blocks 710 and 720 can be transmitted from a base station or NTN node and received using the downlink interface associated with the UE. In some cases, each individual TB included in a multi-TB scheduled block can be received in a different downlink time slot or downlink subframe at the UE. For example, the TBs 1-8 included in multi-TB scheduled block 710 can be received in eight different downlink time slots or subframes at the UE. The downlink time slots can be back-to-back or otherwise consecutive (e.g., no additional wireless communications data is received between TBs). In some cases, one or more downlink time slots can be used to receive additional wireless communications data that is interleaved with the TBs of a multi-TB scheduled block (e.g., the last TB 8 is received eight or more time slots after the first TB 1 is received).

As described previously, a UE can generate HARQ feedback based on, or otherwise in response to, receiving one or more TBs. For example, a UE can generate HARQ feedback (e.g., an ACK or NACK, collectively also referred to herein as a "HARQ-ACK," "HARQ bit," or "HARQ-ACK bit") for one or more TBs included in a multi-TB scheduled block. As also described previously, in some cases a UE generates a HARQ-ACK feedback for feedback-enabled TBs (e.g., TBs received on or associated with a feedback-enabled HARQ process, such as TBs 1-8 of the feedback-enabled multi-TB block 710). A UE may not generate a HARQ-ACK feedback for feedback-disabled TBs (e.g., TBs received on or associated with a feedback-disabled HARQ process, such as TBs 1-8 of the feedback-disabled multi-TB block 710).

In one illustrative example, the HARQ-ACKs generated for the feedback-enabled multi-TB scheduled block 710 can be included in a combined uplink communication block 715. Combined uplink communication block 715 may also be referred to as multi-HARQ scheduled block 715. For example, a UE can receive multiple TBs in one TB scheduled block 710, determine a HARQ-ACK bit (e.g., zero or one) for each TB 1-8, and schedule or transmit the eight HARQ-ACKs 1'-8' in one multi-HARQ scheduled block 715. In some examples, the multi-HARQ scheduled block 715 can correspond to the multi-TB scheduled block 710. For example, the eight HARQ-ACKs 1'-8' can be included in multi-HARQ scheduled block 715 using the same relative order as the eight TBs (e.g., from which the eight HARQ-ACKs were determined) are included in the multi-TB scheduled block 710.

In some aspects, the multi-TB block 710 (e.g., received by a UE on a downlink (DL) interface) is fully received prior to the transmission of multi-HARQ block 715 beginning. For example, the UE may receive the final TB 8 of multi-TB block 710 before transmitting the first HARQ-ACK 1' of multi-HARQ block 715. In some examples, the UE may implement half-duplex wireless communications (e.g., downlink and uplink are not performed simultaneously). In some examples, the first HARQ-ACK 1' of multi-HARQ block 715 can be transmitted in an uplink time slot or sub-frame that is immediately after the downlink time slot or sub-frame in which the final TB 8 of multi-TB block 710 was received. In some cases, one or more time slots or sub-frames can separate the end of multi-TB block 710 and the beginning of multi-HARQ block 715 (e.g., one or more time slots or sub-frames can be located between TB 8 of multi-TB block 710 and HARQ-ACK 1' of multi-HARQ block 715), as will be described in greater depth below.

As illustrated in FIG. 7B, the determination of HARQ-ACK bits and/or a multi-HARQ scheduled block may be omitted when a UE receives a multi-TB scheduled block that includes only feedback-disabled HARQ processes (e.g., HARQ-ACK bits and a multi-HARQ scheduled block may not be generated for the feedback-disabled multi-TB scheduled block 720).

In some aspects, the systems and techniques can perform multi-TB scheduling by including only feedback-enabled TBs or only feedback-disabled TBs in a given multi-TB scheduled block. For example, the systems and techniques can perform multi-TB scheduling such that a given multi-TB scheduled block includes only feedback-enabled TBs (e.g., such as in feedback-enabled multi-TB block 710) or includes only feedback-disabled TBs (e.g., such as in feedback-disabled multi-TB block 720). In some aspects, the systems and techniques may perform multi-TB scheduling using only feedback-enabled multi-TB blocks (e.g., such as multi-TB block 710), and transmitting feedback-disabled TBs without using multi-TB scheduling. In some cases, the systems and techniques can perform multi-TB scheduling using only feedback-disabled multi-TB blocks (e.g., such as multi-TB block 720), and transmitting feedback-enabled TBs without using multi-TB scheduling.

In some aspects, the systems and techniques can perform multi-TB scheduling over homogenous groups of feedback-enabled HARQ processes and homogenous groups of feedback-disabled HARQ processes, while heterogeneous groups that include both feedback-enabled and feedback-disabled HARQ processes are transmitted without using multi-TB scheduling.

In one illustrative example, the systems and techniques can be used to perform multi-TB scheduling for one or more combinations (e.g., heterogeneous sets) of feedback-enabled HARQ processes and feedback-disabled HARQ processes. For example, a single DCI can be used to schedule a single multi-TB block that includes both feedback-enabled HARQ processes and feedback-disabled HARQ processes (e.g., a single multi-TB block that includes feedback-enabled TBs and feedback-disabled TBs).

Figure 8:
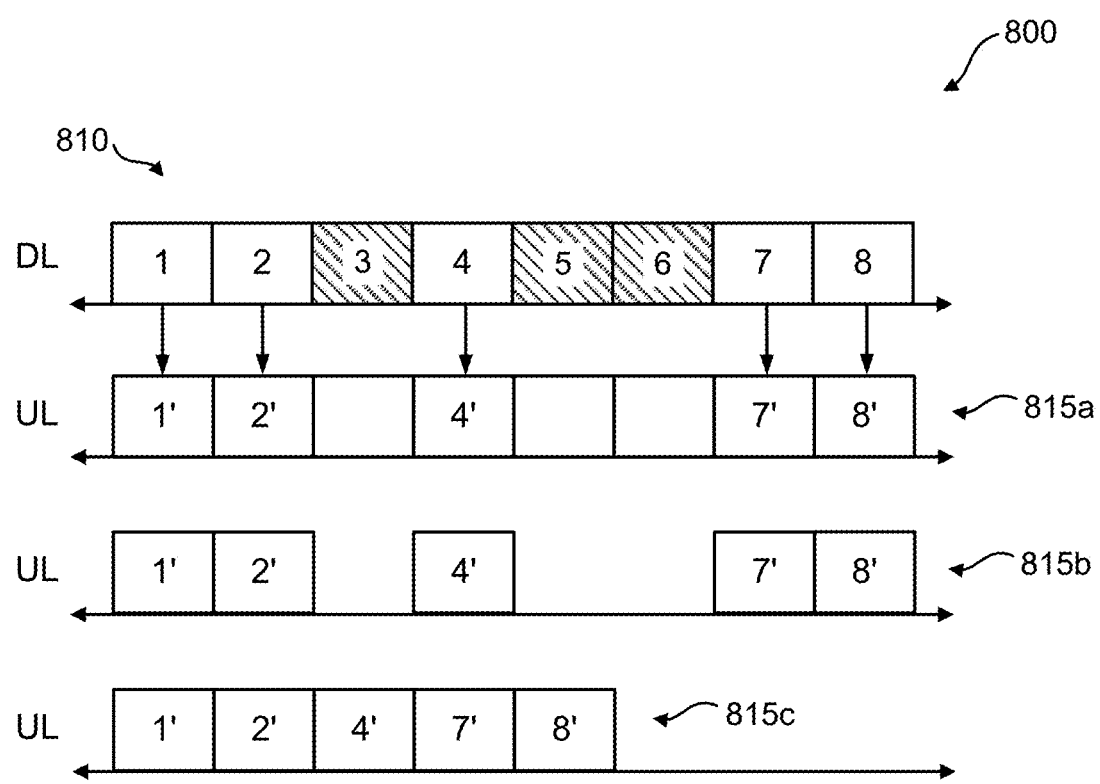
FIG. 8 is a diagram illustrating examples of multi-TB scheduling with feedback-enabled and feedback-disabled Hybrid Automatic Repeat Request (HARQ) processes included in the same multi-TB block, in accordance with some examples.

FIG. 8 is a diagram 800 illustrating examples of multi-TB scheduling with feedback-enabled HARQ processes and feedback-disabled HARQ processes (e.g., feedback-enabled TBs and feedback-disabled TBs) included in the same multi-TB block. As illustrated, a multi-TB scheduled block 810 can include multiple feedback-enabled HARQ processes (e.g., the five feedback-enabled HARQ processes 1, 2, 4, 7, and 8) and multiple feedback-disabled HARQ processes (e.g., the three feedback-disabled HARQ processes 3, 5, and 6). Multi-TB scheduled block 810 can be received by a UE, for example using a downlink (DL) interface associated with the UE. In some cases, multi-TB scheduled block 810 can be received from a base station or NTN node, which can be included in an eMTC over NTN and/or NB-IoT over NTN network. As illustrated, feedback-enabled HARQ processes are depicted as unshaded squares and feedback-disabled HARQ processes (e.g., 3, 5, and 6) are depicted as shaded squares. In some examples, the multi-TB block 810 can include a greater or lesser number of feedback-enabled HARQ processes than the five (e.g., 1, 2, 4, 7 and 8) that are depicted in FIG. 8. Additionally, or alternatively, the multi-TB block 810 can include a greater or lesser number of feedback-disabled HARQ processes than the three (e.g., 3, 5, and 6) that are depicted in FIG. 8.

In one illustrative example, a UE can generate and transmit a multi-HARQ scheduled feedback block in response to receiving one or more of the TBs 1-8 included in multi-TB block 810. For example, the multi-HARQ block can include one or more HARQ-ACK bits generated or determined for a corresponding one or more of the TBs 1-8 included in multi-TB block 810 (e.g., as described above with respect to FIG. 7A and FIG. 7B).

In some aspects, the UE can generate a multi-HARQ feedback block that includes a HARQ-ACK bit (e.g., ACK or NACK, 0 or 1, etc.) determined for each feedback-enabled TB and a placeholder feedback bit (e.g., a "dummy" ACK, NACK, 0, 1, etc.) determined for each feedback-disabled TB. For example, multi-HARQ feedback block 815a includes HARQ-ACK bits 1', 2', 4', 7', and 8', which can be determined for feedback-enabled TBs 1, 2, 4, 7, and 8, respectively. Multi-HARQ feedback block 815a further includes placeholder feedback bits for the feedback-disabled TBs 3, 5, and 6 (e.g., shown as the three empty slots in multi-HARQ feedback block 815a). The multi-HARQ feedback block 815a can be generated based on an uplink transmission configuration or uplink transmission schedule such that each HARQ-ACK bit (e.g., 1', 2', 4', 7', 8') has the same relative position in the multi-HARQ feedback block 815a as its corresponding feedback-enabled TB in the multi-TB block 810 (e.g., the same relative position as one of the feedback-enabled TBs 1, 2, 4, 7, 8). The uplink transmission configuration can further be used to schedule the placeholder feedback bits such that each placeholder feedback bit has the same relative position in multi-HARQ feedback block 815a as one of the feedback-disabled TBs in multi-TB block 810 (e.g., the same relative position as one of the feedback-disabled TBs 3, 5, 6). In some examples, a multi-HARQ feedback block that includes HARQ-ACK bits for each feedback-enabled TB and placeholder feedback bits for each feedback-disabled TB (e.g., multi-HARQ feedback block 815a) can be generated without any changes to the HARQ-ACK transmission timeline (e.g., without any changes to the HARQ-ACK transmission timeline associated with multi-TB block 810).

In some aspects, a UE can generate and transmit a multi-HARQ feedback block without generating or transmitting "dummy" (e.g., placeholder) feedback bits for the feedback-disabled TBs 3, 4, and 5. For example, the UE can generate and transmit HARQ-ACK bits for the feedback-enabled TBs 1, 2, 4, 7, and 8 of multi-TB block 810 and transmit nothing for the feedback-disabled TBs 3, 5, and 6 of multi-TB block 810.

In one illustrative example, the HARQ-ACK transmission timeline can remain unchanged, with the UE creating "holes" (e.g., an empty uplink time slot or subframe in which the UE transmits nothing) for each feedback-disabled TB. For example, the multi-HARQ feedback block 815b illustrated in FIG. 8 can be generated to include the HARQ-ACK bits 1', 2', 4', 7', 8' corresponding to the feedback-enabled TBs 1, 2, 4, 7, 8, respectively, and "holes" or empty slots corresponding to the feedback-disabled TBs 3, 5, 6. In the example of multi-HARQ block 815b, each HARQ-ACK bit (e.g., 1', 2', 4', 7', 8') is located in the same relative position within multi-HARQ block 815b as the feedback-enabled TBs (e.g., 1, 2, 4, 7, 8) are located within multi-TB block 810.

Additionally, each HARQ-ACK bit can be located in the same relative position in the example of multi-HARQ block 815a (e.g., in which HARQ-ACK bits are transmitted for feedback-enabled TBs and "dummy" feedback bits are transmitted for feedback-disabled TBs) and in the example of 815b (e.g., in which HARQ-ACK bits are transmitted for feedback-enabled TBs and "holes"/nothing is transmitted for feedback-disabled TBs). As mentioned previously, when a UE generates a multi-HARQ block with either "dummy" bits for feedback-disabled TBs (e.g., multi-HARQ block 815a) or "holes"/empty slots for feedback-disabled TBs (e.g., multi-HARQ block 815b), the multi-HARQ block can be transmitted using an unmodified HARQ-ACK transmission timeline. The unmodified HARQ-ACK transmission timeline can be determined as the order or time slots/subframes in which the TBs 1-8 are received in multi-TB block 810.

In another illustrative example, the HARQ-ACK transmission timeline can be modified to transmit only the HARQ-ACK bits 1', 2', 4', 7', 8' in a consecutive or back-to-back fashion. For example, as depicted in multi-HARQ block 815c, the UE can generate the multi-HARQ feedback block to include only HARQ-ACK bits for the feedback-enabled TBs. In this case, a multi-HARQ feedback block such as multi-HARQ block 815c does not include any dummy feedback bits (e.g., as in multi-HARQ block 815a) for feedback-disabled TBs and does not include any "holes"/empty slots for feedback-disabled TBs (e.g., as in multi-HARQ block 815b).

For example, the HARQ-ACK transmission timeline (e.g., the uplink transmission configuration for transmitting multi-HARQ block 815c) can be modified by shifting one or more of the HARQ-ACK bits generated for feedback-enabled TBs to an earlier uplink time slot/subframe that otherwise would have been associated with a feedback-disabled TB. For example, multi-HARQ block 815c can be generated by shifting one or more of the HARQ-ACK bits 1', 2', 4', 7', 8' to an earlier time slot/subframe that otherwise would have been used to transmit either a "dummy" placeholder feedback bit for a feedback-disabled TB (e.g., as in multi-HARQ block 815a) or "hole"/empty slot for a feedback-disabled TB (e.g., as in multi-HARQ block 815b). As illustrated in FIG. 8, multi-HARQ block 815c can be generated by shifting HARQ-ACK bit 4' one slot to the left and shifting HARQ-ACK bits 7' and 8' three slots to the left.

As illustrated, multi-HARQ block 815c can include a total of five uplink time slots (e.g., one uplink time slot for each of the five HARQ-ACK bits 1', 2', 4', 7', 8'). In some cases, because multi-HARQ feedback block 815c does not include any uplink time slots associated with feedback-disabled TBs 3, 5, 6, multi-HARQ feedback block 815c can be transmitted in a smaller amount of total time slots than either multi-HARQ block 815a or 815b. Additionally, multi-HARQ feedback block 815c can finish transmitting earlier than either multi-HARQ block 815a or 815b (e.g., all else equal, multi-HARQ feedback block 815c can finish transmitting before multi-HARQ feedback block 815a or 815b by a number of time slots equal to the number of feedback-disabled TBs included in the multi-TB block 810).

In another illustrative example, a UE can generate a multi-HARQ block based on a multi-TB block by scheduling all feedback-enabled HARQ process together and scheduling all feedback-disabled HARQ processes together. For example, if a "dummy" or placeholder feedback bit is generated for each feedback-disabled TB (e.g., as depicted in multi-HARQ block 815a), the UE can generate a multi-HARQ feedback block that schedules the HARQ-ACK bits consecutively (e.g., back-to-back) and schedules the "dummy" placeholder bits consecutively (e.g., back-to-back). In some examples, the multi-HARQ feedback block can be generated based on an uplink communication configuration wherein the HARQ-ACK bits determined for feedback-enabled TBs are scheduled earlier than the "dummy" placeholder bits determined for feedback-disabled TBs. In some cases, the multi-HARQ feedback block can be generated based on an uplink communication configuration wherein the HARQ-ACK bits determined for feedback-enabled TBs are scheduled later than the "dummy" placeholder bits determined for feedback-disabled TBs In some cases, when "dummy" placeholder bits are not generated for feedback-disabled TBs (e.g., only HARQ-ACK bits are determined for the feedback-disabled TBs), a UE can receive a multi-TB block (e.g., such as multi-TB block 810) and immediately begin transmitting HARQ-ACK bits after the end of the multi-TB block (e.g., using an uplink interface to the base station or NTN node). For example, after a PDSCH associated with the multi-TB block 810 ends, a UE can immediately begin transmitting the HARQ-ACK bits 1', 2', 4', 7', 8'. If the multi-HARQ block includes "holes" or empty uplink slots for feedback-disabled TBs, the "holes" or empty uplink slots can be transmitted after the last HARQ-ACK bit (e.g., 8') is transmitted.

Figure 9:
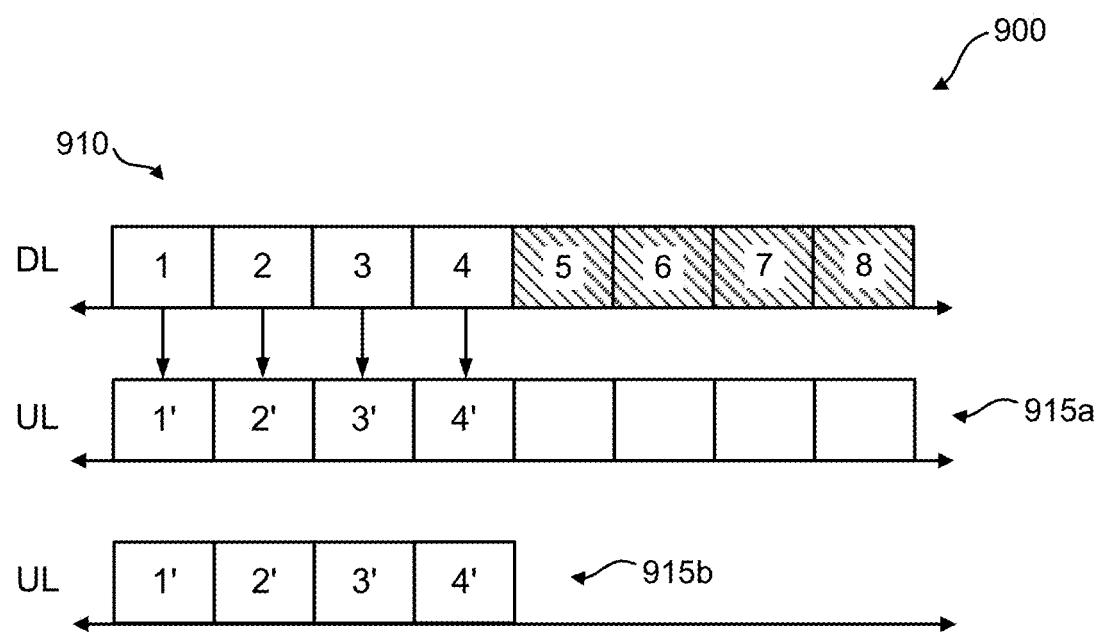
FIG. 9 is a diagram illustrating examples of multi-TB scheduling with feedback-enabled and feedback-disabled HARQ processes included in the same multi-TB block, in accordance with some examples.

In some examples, multi-TB scheduling can be performed based on scheduling all feedback-enabled HARQ process together and scheduling all feedback-disabled HARQ processes together for both a multi-TB block and a corresponding multi-HARQ feedback block generated based on the multi-TB block. For example, FIG. 9 is a diagram 900 illustrating examples of multi-TB scheduling wherein a single multi-TB block 910 includes feedback-enabled and feedback-disabled TBs (e.g., TBs 1-4 and 5-8, respectively) grouped consecutively and separately. In this example, a UE may receive a multi-TB block (e.g., multi-TB block 910) with a HARQ-ACK transmission timeline that is already sorted to group feedback-enabled TBs 1-4 and feedback-disabled TBs 5-8 separately. Based on the multi-TB block 910 already including a HARQ-ACK transmission timeline sorted based on the feedback-enabled/feedback-disabled status of the TBs 1-8, the UE may subsequently generate a multi-HARQ feedback block that uses the same HARQ-ACK timeline as the multi-TB block 910. For example, if "dummy" placeholder bits are generated for the feedback-disabled TBs 5-8, a multi-HARQ feedback block 915a can include the placeholder bits in the same relative order as the feedback-disabled TBs 5-8 within multi-TB block 910. Similarly, if "holes" or empty uplink transmission slots/subframes are utilized for the feedback-disabled TBs 5-8, a multi-HARQ feedback block 915b can include only the HARQ-ACK bits 1'-4' in a first group of uplink transmission slots/subframes, followed by a second group of uplink transmission slots/subframes for the feedback-disabled TB "holes."

In the examples described above with respect to FIGS. 7A-9, reference was made to a UE receiving multi-TB blocks (e.g., multi-TB blocks 710, 810, 910) without HARQ-ACK bundling enabled. Without HARQ-ACK bundling enabled, each multi-TB block includes the TBs 1-8 in a single set or group. In some aspects, HARQ-ACK bundling may be enabled and a multi-TB block can include one or more sub-sets or sub-groups that each include a unique portion of the TBs associated with the overall multi-TB block.

Figure 10A:
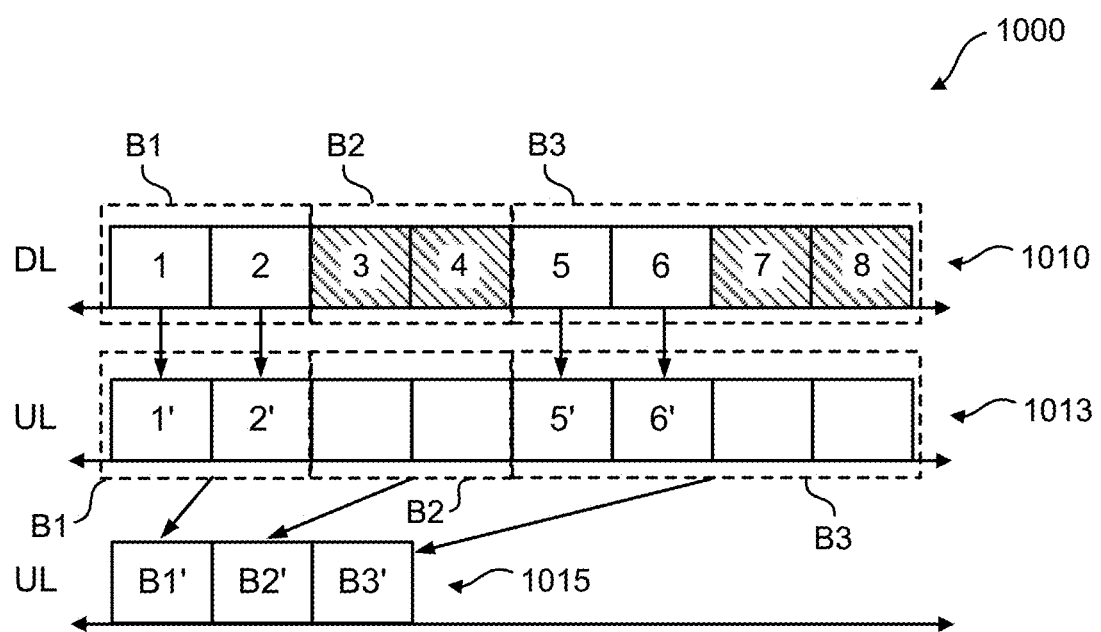
FIG. 10A is a diagram illustrating an example of multi-TB scheduling of a multi-TB block with TB bundling, in accordance with some examples.

For example, FIG. 10A is a diagram 1000 illustrating an example of multi-TB scheduling of a multi-TB block 1010 that includes feedback-enabled TBs (e.g., TBs 1, 2, 5, 6) and feedback-disabled TBs (e.g., 3, 4, 7, 8), wherein the TBs 1-8 of multi-TB block 1010 are divided into bundles B1, B2, and B3. In some examples, a greater or lesser number of bundles can be included in multi-TB block 1010. In some cases, each bundle can include an equal number of TBs (e.g., for a multi-TB block including eight TBs, HARQ-ACK bundling can be applied to create two bundles with four TBs each, four bundles with two TBs each, etc.) In some examples, the number of bundles and the number of TBs can be equal (e.g., multi-TB block 1010 could be bundled using eight bundles, each bundle including a single one of the TBs 1-8). In some examples, multi-TB block 1010 can be bundled using a first bundle that includes TBs 1-3, a second bundle that includes TBs 4-6, and a third bundle that includes TBs 7-8.

Figure 10B:
FIG. 10B is a diagram illustrating an example of a TB-bundling configuration, in accordance with some examples.

In some aspects, a multi-TB block can be bundled based on a TB-bundling configuration. For example, a TB-bundling configuration can include one or more pre-determined bundling approaches. In some cases, the TB-bundling configuration can include different pre-determined bundling approaches based on the multi-TB block size (e.g., the number of TBs included in the multi-TB block). An example TB-bundling configuration 1000b is depicted in FIG. 10B for multi-TB block sizes $N_{TB}$=1, 2, 4, 6, and 8. In some aspects, multiple different TB-bundling configurations can be utilized. For example, a multi-TB block can be bundled based on a TB-bundling configuration selected from a plurality of TB-bundling configurations. In one illustrative example, the use of multiple TB-bundling configurations may provide a base station or NTN node with increased flexibility in bundling feedback-enabled and feedback-disabled HARQ processes together (e.g., bundling feedback-enabled and feedback-disabled TBs together). In some aspects, Radio Resource Control (RRC) and/or Media Access Control (MAC) Control Element (MAC-CE) transmission can be used to indicate a selected TB-bundling configuration or selected TB-bundling configuration table that is to be used.

FIG. 10A depicts an example multi-TB block 1010 with TB-bundling applied. For example, multi-TB block 1010 includes the eight TBs 1-8 and the three bundles B1, B2, and B3. As illustrated, bundle B1 includes the feedback-enabled TBs 1 and 2; bundle B2 includes the feedback-disabled TBs 3 and 4; and bundle B3 includes the feedback-enabled TBs 5 and 6, and the feedback-disabled TBs 7 and 8.

In one illustrative example, bundling can be performed to reduce the total number of feedback bits included in a multi-HARQ feedback block generated by the UE based on receiving a bundled multi-TB block (e.g., such as bundled multi-TB block 1010). For example, a bundled multi-HARQ feedback block can be generated to include a single feedback bit for each bundle (e.g., rather than a feedback bit for each TB or for each feedback-enabled TB, both as described above). For example, a feedback bit can be generated for each bundle by calculating the logical AND over the feedback bits determined for each TB included in the bundle.

For example, a "dummy" placeholder bit can be generated for each feedback-disabled TB (e.g., TBs 3, 4, 7, 8) included in multi-TB block 1010. A HARQ-ACK bit can be generated for each feedback-enabled TB (e.g., TBs 1, 2, 5, 6), as described above. The resulting set of feedback bits 1013 is depicted in FIG. 10A. In one illustrative example, the set of feedback bits 1013 can be associated with the same bundles or bundling scheme as the multi-TB block 1010. For example, HARQ-ACK bits 1' and 2' can be included in a first bundle (e.g., corresponding to bundle B1 in multi-TB block 1010); two "dummy" placeholder bits can be included in a second bundle (e.g., corresponding to bundle B2 in multi-TB block 1010); and HARQ-ACK bits 5', 6' and two "dummy" placeholder bits can be included in a third bundle (e.g., corresponding to bundle B3 in multi-TB block 1010).

A multi-HARQ feedback block 1015 can be generated based on multi-TB block 1010 and/or the set of feedback bits 1013 by determining the logical AND between the feedback bits 1013 associated with each of the bundles B1, B2, and B3. In some cases, when a logical AND is used to calculate the feedback bits for the bundles, a default value of 1 (e.g., a dummy ACK) can be used as the placeholder feedback bit for each feedback-disabled TB. As illustrated, multi-HARQ feedback block 1015 can include a feedback bit B1' determined for bundle B1 and HARQ-ACK bits 1' and 2'; a feedback bit B2' determined for bundle B2 and the placeholder feedback bits associated with feedback-disabled TBs 3 and 4; and a feedback bit B3' determined for bundle B3 and the HARQ-ACK bits 5', 6' and the placeholder feedback bits associated with feedback-disabled TBs 7 and 8. In some examples, the HARQ-ACK transmission timeline can remain unchanged between the bundled multi-TB block 1010 and the bundled multi-HARQ block 1015.

Figure 11:
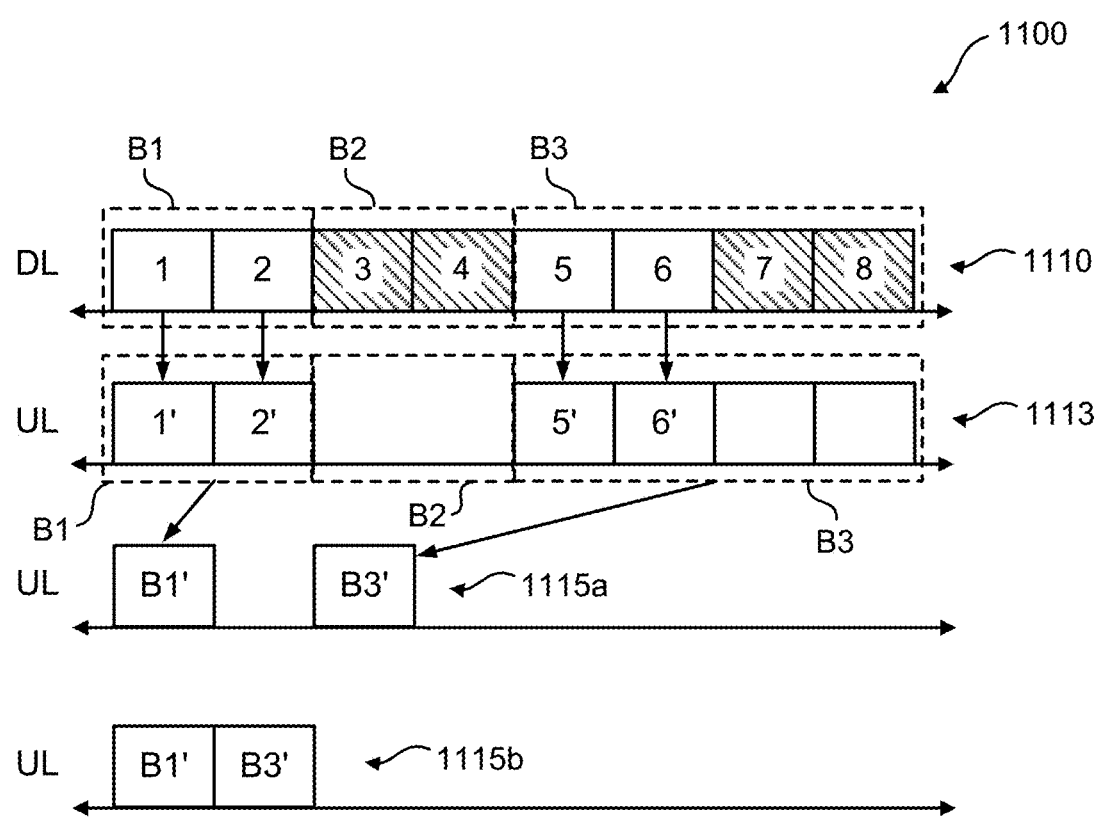
FIG. 11 is a diagram illustrating another example of multi-TB scheduling of a multi-TB block with TB bundling, in accordance with some examples.

FIG. 11 is a diagram 1100 illustrating another example multi-TB block 1110 with TB-bundling applied, wherein example multi-HARQ feedback blocks 1115a and 1115b can be generated without determining a "dummy" placeholder feedback bit for the feedback-disabled TBS (e.g., TBs 2, 4, 7, 8). As illustrated, multi-TB block 1110 includes eight TBs 1-8, where TBs 1, 2, 5, 6 are feedback-enabled TBs and TBs 3, 4, 7, 8 are feedback-disabled TBs. A TB-bundling configuration is applied to multi-TB block 1110. A first bundle B1 includes the feedback-enabled TBs 1 and 2; a second bundle B2 includes the feedback-disabled TBs 3 and 4; and a third bundle B3 includes the feedback-enabled TBs 5, 6 and the feedback-disabled TBs 7, 8. In one illustrative example, the multi-TB block 1110 and the multi-TB block 1010 illustrated in FIG. 10A can be the same.

In one illustrative example, bundling can be performed to generate a bundled multi-HARQ feedback block (e.g., such as bundled multi-HARQ feedback blocks 1115a and/or 1115b, described in greater depth below) based on the bundled multi-TB block 1110. For example, a HARQ-ACK bit can be generated for each feedback-enabled TB (e.g., TBs 1, 2, 5, 6). The HARQ-ACK bits 1', 2', 5', 6' can be included in a set of feedback bits 1113, as depicted in FIG. 11.

The set of feedback bits 1113 (e.g., which may subsequently be used to generate the bundled multi-HARQ feedback blocks 1115a and/or 1115b) can further include one or more "dummy" placeholder bits generated for one or more of the feedback-disabled TBs (e.g., TBs 3, 4, 7, 8). In the example described above with respect to FIG. 10A, a dummy placeholder bit was generated for each feedback-disabled TB.

In the example of FIG. 11, a dummy placeholder bit may be generated only for feedback-disabled TBs that are included in a bundle (e.g., one of the bundles B1, B2, B3 associated with the bundled multi-TB block 1110) that includes at least one feedback-enabled TB. For example, as depicted in FIG. 11, the set of feedback bits 1113 may include a dummy placeholder bit generated for feedback-disabled TB 7 and a dummy placeholder bit generated for feedback-disabled TB 8 but does not include a dummy placeholder bit for feedback-disabled TBs 3 or 4. Feedback-disabled TBs 7 and 8 are included in bundle B3, which includes at least one feedback-enabled TB (e.g., B3 includes two feedback-enabled TBs 5 and 6), and dummy placeholder bits may therefore be generated for feedback-disabled TBs 7 and 8. Feedback-disabled TBs 3 and 4 are included in bundle B2, which includes only feedback-disabled TBs. In some examples, no dummy placeholder bits are therefore generated for feedback-disabled TBs 3 and 4.

In one illustrative example, the set of feedback bits (e.g., 1113) used to subsequently generate a bundled multi-HARQ block (e.g., 1115a and/or 1115b) can include HARQ-ACK bits generated for each feedback-enabled TB, and dummy placeholder feedback bits generated for any feedback-disabled TBs that are included in a bundle with at least one feedback-enabled TB. The set of feedback bits (e.g., 1113) may omit generating any placeholder feedback bits for feedback-disabled TBs that are included in bundles with only feedback-disabled TBs (e.g., if each TB in a bundle is feedback-disabled, then no dummy placeholder feedback bits are generated for the TBs of that bundle).

In some aspects, a bundled multi-HARQ feedback block 1115a can be generated based on the set of feedback bits 1113 by calculating a combined (e.g., single) feedback bit for each bundle. For example, a combined feedback bit B1' can be calculated as the logical AND between HARQ-ACK bits 1' and 2' (e.g., which were determined for TBs 1 and 2 of bundle B1). A combined feedback bit B3' can be calculated as the logical AND between HARQ-ACK bits 5', 6' (e.g., which were determined for TBs 5 and 6 of bundle B3) and the two dummy placeholders included in the set of feedback bits 1113 (e.g., which were determined for the feedback-disabled TBs 7 and 8 of bundle B3, as described above).

In some aspects, when the set of feedback bits 1113 includes no HARQ-ACK bits or dummy placeholder bits for a given bundle, the bundled multi-HARQ feedback block 1115a can be generated to include a "hole" or empty uplink time slot/subframe for that bundle. For example, bundle B2 includes only feedback-disabled TBs 3 and 4, and the set of feedback bits 1113 is empty for bundle B2. As illustrated, the bundled multi-HARQ feedback block 1115a includes a "hole" or empty uplink time slot/subframe between the combined feedback bits B1' and B2' (e.g., the combined feedback bit B1' is transmitted in a first uplink time slot, nothing (e.g. a "hole") is transmitted in a second uplink time slot, and the combined feedback bit B2' is transmitted in a third uplink time slot).

In some examples, a bundled multi-HARQ feedback block 1115b can be generated without "holes" or empty uplink time slots/subframes for feedback-disabled bundles in the received multi-TB block 1110. For example, the combined feedback bits B1' and B3' can be transmitted back-to-back or in consecutive time slots, without reserving or transmitting a "hole" or empty time slot for bundle B2 (e.g., combined feedback bit B1' can be transmitted in a first uplink time slot and combined feedback bit B3' can be transmitted in a second uplink time slot, at which point transmission of the bundled multi-HARQ feedback blot 1115b is completed).

In some aspects, a base station may transmit multiple TBs over the same feedback-disabled HARQ process without a time gap between successive TB transmissions. For example, when transmitting over a feedback-disabled HARQ process, the base station does not need to wait to transmit the next TB until a HARQ feedback bit has been received for the most recently transmitted TB. In some cases, a UE that receives TBs from the base station (e.g., over one or more HARQ processes, as described above) may process the received TBs using HARQ-process-wise processing, in which a fixed or minimum amount of time is associated with processing a given TB on a given HARQ process. In some cases, a base station may transmit multiple TBs over a feedback-disabled HARQ process with a time gap (e.g., between successive transmitted TBs) that is shorter than the minimum HARQ-process-wise processing time for each TB at the UE. In one illustrative example, the systems and techniques can include a pre-determined minimum time gap (e.g., delay) between successive instances of PDSCHs on the same HARQ process when feedback is disabled for the HARQ process. For example, in an eMTC over NTN network, the pre-determined minimum time gap may be 4 milliseconds (ms). In some cases, a shorter or longer pre-determined minimum time gap can be used (e.g., shorter or longer than 4 ms).

In some aspects, NB-IoT may support a maximum of two HARQ processes. For example, NB-IoT may support a maximum of two HARQ processes when performing multi-TB scheduling (e.g., up to two HARQ processes can be scheduled per PDSCH and/or using a single DCI). In some examples, HARQ stalling (e.g., as described above) may occur in an NB-IoT over NTN network or other network with a relatively large RTT between a UE and base station (e.g., NTN node). For example, with only two HARQ processes per DCI/PDSCH, the base station may idle over multiple downlink time slots while waiting to receive HARQ-ACK bits for the TBs sent over the two HARQ processes.

In some cases, a base station might transmit more than the supported maximum of two HARQ processes. NB-IoT UEs may be low-complexity devices that do not include sufficient buffer space to store more than two HARQ processes. For example, NB-IoT UEs may include a soft buffer that cannot store more than two HARQ processes at the same time. For feedback-enabled HARQ processes, a UE may use the soft buffer to store log-likelihood ratios (LLRs) for the initial transmissions (e.g., TBs) received over one or more (or all) of the feedback-enabled HARQ processes in a multi-TB scheduled block. For example, the UE may store the LLRs in a soft buffer in case a TB needs to be retransmitted (e.g., in case the UE does not successfully receive or decode a given TB, the UE will transmit a HARQ-NACK causing the base station to retransmit the given TB). The retransmitted TB can then be combined with the corresponding LLR stored in the UE soft buffer.

In some aspects, a UE may not need to store LLRs for TBs received over feedback-disabled HARQ processes (e.g., except, in some cases, for transmission schemes such as blind retransmissions). In one illustrative example, the systems and techniques can increase the number of HARQ processes supported by NB-IoT to more than two, without increasing the soft-buffer or storage size associated with a UE that receives the HARQ processes over NB-IoT. For example, the maximum number of HARQ processes can be increased from two to four, while the soft-buffer storage size remains two HARQ processes. In some aspects, a maximum of four total HARQ processes can be transmitted, with a maximum of two feedback-enabled HARQ processes included in the four (e.g., because the two feedback-enabled HARQ processes will fill the UE's soft buffer storage).

In one illustrative example, a dedicated bit in the DCI scheduling NPDSCH can be used to indicate whether soft-buffer storage is required or not required for a given HARQ process scheduled by the DCI. In some examples, the dedicated bit can be used to indicate whether a given HARQ process is feedback-enabled or feedback-disabled, and a UE can infer whether soft-buffer storage is required or not required based on the feedback type of each HARQ process. For example, the dedicated bit can be set to a first value for feedback-enabled HARQ processes (e.g., indicating that soft-buffer storage is needed for the feedback-enabled HARQ processes) and can be set to a second value for feedback-disabled HARQ processes (e.g., indicating that soft-buffer storage is not needed for the feedback-disabled HARQ processes).

In some aspects, the dedicated bit can be used to signal (e.g., implicitly signal) a HARQ process ID number for one or more of the HARQ processes scheduled by the DCI. For example, an existing "HARQ process ID" field may currently be provided, occupying one bit. By combining the existing "HARQ process ID' field with the dedicated bit described above, the number of HARQ processes that may be scheduled by a single DCI can be increased from two to four.

The foregoing description may be applied to eMTC over NTN, NB-IoT over NTN, or both. In some aspects, in an NB-IoT over NTN network, a UE may utilize a pre-determined delay of $k_0'$ subframes from the end of a multi-TB block transmission before beginning the transmission of a multi-HARQ feedback block transmission (e.g., in response to the TBs of the multi-TB block). For example, HARQ-ACK transmission may begin at least $k_0'$ subframes after the last TB of the multi-TB block is received. In some cases, if a UE receives a multi-TB block that includes a feedback-enabled TB1 and a feedback-disabled TB2, the $k_0'$ delay may still be counted from the end of TB2.

Because TB2 is a feedback-disabled process, in one illustrative example, the $k_0'$ delay may instead be counted from the end of the last TB (e.g., in the multi-TB block received by a UE) for which HARQ feedback was enabled. In the example above, a UE may begin HARQ-ACK transmission based on utilizing the $k_0'$ delay from the end of TB1 rather than TB2 (e.g., because TB1 is the last feedback-enabled TB of the multi-TB block). In some examples, a UE may need to begin HARQ-ACK transmission at a time that is greater than or equal to the end of the multi-TB PDSCH+2 ms.

Figure 12:
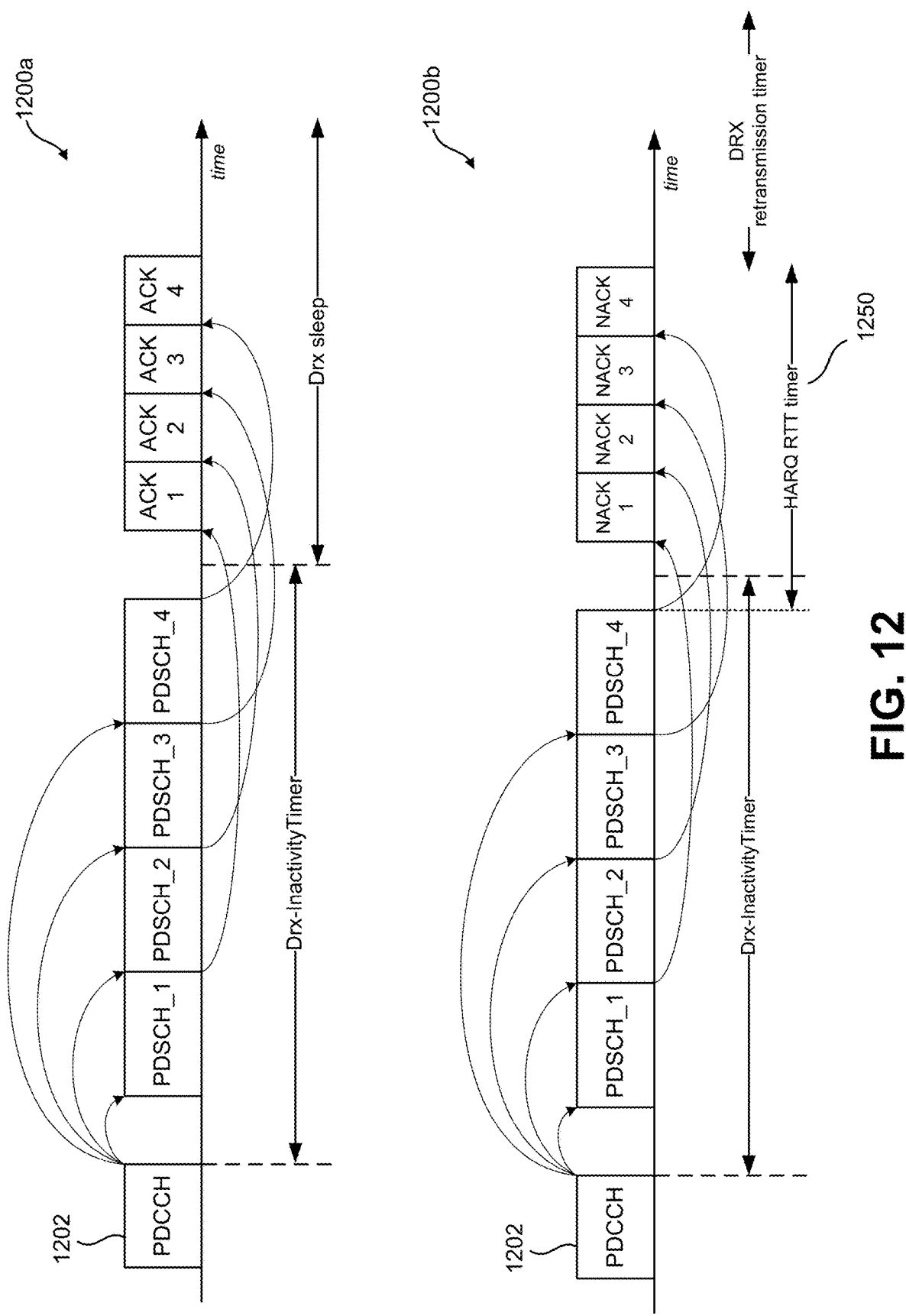
FIG. 12 is a diagram illustrating an example of a modified HARQ Round Trip Time (RTT) timer start for multi-TB scheduling, in accordance with some examples.

FIG. 12 illustrates an example of a modified HARQ RTT timer start for multi-TB scheduling, according to aspects of the present disclosure. For example, the diagram 1200*a* depicts an example in which a PDCCH 1202 is used to scheduled PDSCH_1, PDSCH_2, PDSCH_3, and PDSCH_4, for which the corresponding ACKs ACK1, ACK2, ACK3, and ACK4 are generated. For example, ACK1 can correspond to PDSCH_1; ACK2 can correspond to PDSCH_2; ACK3 can correspond to PDSCH_3; and ACK4 can correspond to PDSCH_4. The diagram 1200*b* depicts an example in which a PDCCH 1202 is used to schedule PDSCH_1, PDSCH_2, PDSCH_3, and PDSCH_4, for which the corresponding NACKs NACK1, NACK2, NACK3, and NACK4 are generated. For example, NACK1 can correspond to PDSCH_1; NACK2 can correspond to PDSCH_2; NACK3 can correspond to PDSCH_3; and NACK4 can correspond to PDSCH_4. In some examples, the PDCCH 1202 and/or one or more of the PDSCH_1-PDSCH_4 can be the same in diagram 1200*a* and diagram 1200*b*. In some aspects, one or more (or all) of the PDSCHs PDSCH_1-PDSCH_4 can include a downlink communication such as a TB associated with a HARQ process (e.g., as described previously above).

In some cases, a HARQ RTT timer 1250 can be started at the end of the last scheduled TB. For example, a HARQ RTT timer 1250 can be started from the end of PDSCH_4 (e.g., as depicted in diagram 1200*b*), based on PDSCH_4 including the last scheduled TB associated with the PDCCH 1202.

In one illustrative example, a HARQ RTT timer (e.g., such as HARQ RTT timer 1250) can be started from the last scheduled TB for which HARQ feedback is enabled. For example, with reference again to diagram 1200*b*, if the HARQ process associated with the PDSCH_4 is a HARQ feedback-disabled process (e.g., and the HARQ process associated with the PDSCH_3 is a HARQ feedback-enabled process), then the HARQ RTT timer 1250 can be started from the end of the PDSCH_3. In some aspects, the HARQ RTT timer 1250 can be started before the end of the last scheduled TB associated with the PDCCH 1202 (e.g., can be started before the end of the PDSCH_4) based on determining that the UE is in full duplex mode.

In some aspects, a HARQ RTT length (e.g., a HARQ RTT timer duration, such as a duration of HARQ RTT timer 1250) can be modified for multi-TB scheduling, according to one or more aspects of the present disclosure. A HARQ RTT timer formula (e.g., a HARQ RTT duration) can be given as follows (e.g., in subframes) for NB-IoT UEs:

$$\text{HARQ\_RTT\_Timer}_{NB\text{-}IoT} = k + 2(N+1) + \text{RTT}_{\textit{offset}} + \text{delta}_{PDCCH} \quad \text{Eq. (1)}$$

Here, k is the interval (e.g., in subframes) between the last subframe of the downlink transmission and the first subframe of the first HARQ feedback transmission. N is the transmission duration (e.g., a quantity of subframes) of the associated HARQ feedback. For example, k can represent the quantity of subframes of the interval between the last scheduled TB for which HARQ feedback is enabled and the first subframe of the first HARQ feedback transmission (e.g., in the example above, the quantity of subframes between PDSCH_3 and NACK1). In other examples, k can represent the quantity of subframes of the interval between the last scheduled TB and the first subframe of the first HARQ feedback transmission (e.g., the quantity of subframes between PDSCH_4 and NACK1).

In one illustrative example, the HARQ RTT timer duration, the duration of HARQ RTT timer 1250) can be modified and set equal to $k+(2-X)*(N+1)+\text{RTT}_{\textit{offset}}+\text{delta}_{PDCCH}$. Here, X is the quantity of TBs that are associated with a feedback-disabled HARQ process. For example, as the quantity of TBs associated with feedback-disabled HARQ processes increases, the number of subframes used for the HARQ RTT timer duration can decrease (e.g., based on starting the HARQ RTT timer 1250 from the last scheduled TB for which HARQ feedback is enabled, the length of the corresponding HARQ RTT timer 1250 can decrease relative to the HARQ RTT timer duration that starts from the end of the last scheduled TB).

In another aspect, a HARQ RTT timer formula (e.g., HARQ RTT duration, such as the duration of HARQ RTT timer 1250) can be given as follows (e.g., in subframes) for eMTC UEs using HARQ-ACK bundling:

$$\text{HARQ RTT Timer}_{eMTC\_Bundling} = 7 + kN + \text{RTT}_{\textit{offset}} \quad \text{Eq. (2)}$$

Here, N is a PUCCH repetition factor used for the uplink transmission(s) from the eMTC UE and k is the quantity of HARQ feedback bundles transmitted by the eMTC UE. In some aspects, k can be determined as $k=\text{ceiling}(N_{TB}/M)$, where $N_{TB}$ is the quantity of scheduled TBs as indicated in a PDCCH (e.g., such as PDCCH 1202) and M is the multi-TB HARQ-ACK bundling size.

In one illustrative example, the HARQ RTT timer duration can be modified for eMTC UEs with HARQ-ACK bundling and set equal to $7+(k-X)*N+\text{RTT}_{\textit{offset}}$, where X is the quantity of bundles for which HARQ feedback is disabled (e.g., X is the quantity of feedback-disabled TB-bundles). In some cases, as the quantity of HARQ feedback-disabled bundles increases, the quantity of subframes used for the HARQ RTT timer duration can decrease (e.g., the duration of HARQ RTT timer 1250 can become smaller).

In another aspect, a HARQ RTT timer formula (e.g., HARQ RTT duration, such as the duration of the HARQ RTT timer 1250) can be give as follows (e.g., in subframes) for eMTC UEs that are not using HARQ bundling:

$$\text{HARQ RTT Timer}_{eMTC\_No\_Bundling} = 7 + mN + \text{RTT}_{\textit{offset}} \quad \text{Eq. (3)}$$

Here, N is again the PUCCH repetition factor used for the uplink transmission(s), as in EQ. (2) above. m is the quantity of scheduled TBs as indicated in the PDCCH (e.g., PDCCH 1202). In some examples, m in Eq. (3) can be the same as or similar to $N_{TB}$ in Eq. (2).

In one illustrative example, the HARQ RTT timer duration can be modified for eMTC UEs without HARQ bundling and set equal to $7+(m-X)*N+\text{RTT}_{\textit{offset}}$, where X is the quantity of TBs for which HARQ feedback is disabled. In some cases, as the quantity of HARQ feedback-disabled TBs increases, the quantity of subframes used for the HARQ RTT timer duration can decrease (e.g., the duration of HARQ RTT timer 1250 can become smaller).

In some aspects, the systems and techniques can include a DCI override of RRC-configured feedback-enabled and/or feedback-disabled HARQ processes. For example, in some cases the designation of a HARQ process as feedback-enabled or feedback-disabled may be expected to be provided by RRC signal (e.g., following NR-NTN).

In one illustrative example, a DCI bit can be used to override a feedback-enabled (or feedback-disabled) configuration that is otherwise indicated by an RRC signal. For example, the DCI bit can be included in a DCI used to schedule a transmission on a given HARQ process (e.g., as described above). In some cases, the DCI override bit can be used to change or modify the RRC-indicated behavior for a given TB on the HARQ process with which the DCI override bit is associated (e.g., the HARQ process scheduled by a DCI that includes the DCI override bit). In some aspects, the DCI override bit can be utilized for single-TB scheduling.

In some examples, the DCI override bit can be implemented using a newly designated bit in the DCI. In some cases, the DCI override bit can be implemented using an existing bit in the DCI (e.g., by repurposing the existing bit as an override bit). For example, in the context of HARQ-ACK bundling with single-TB scheduling, a feedback-disabled TB may be overridden to a feedback-enabled TB by setting the 'HARQ ACK Bundling Flag' to be on (or '1') for the TB, while the flag would otherwise be set to off if feedback is disabled.

Figure 13:
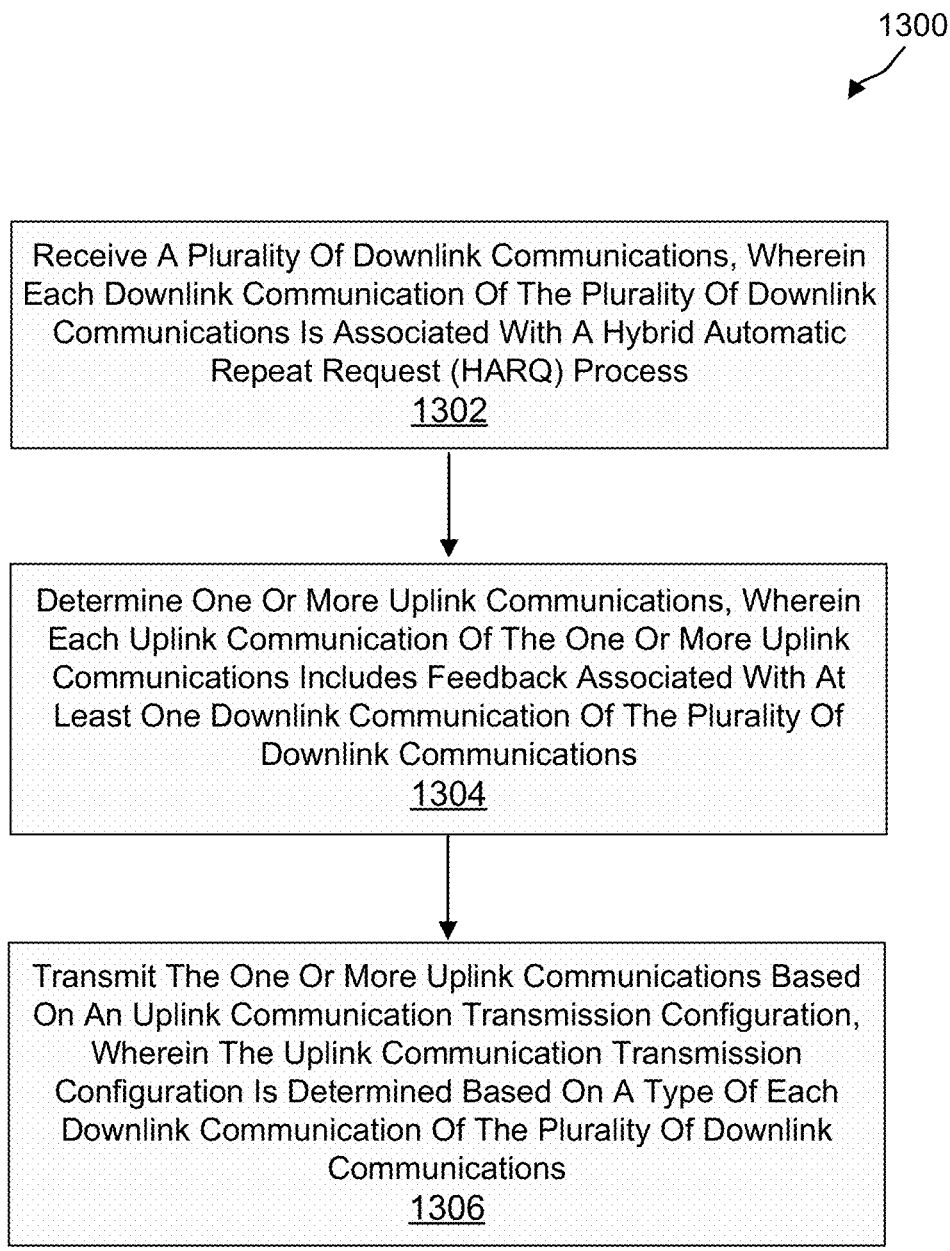
FIG. 13 is a flow diagram illustrating an example of a process implemented by an aircraft UE for performing mobile handovers, in accordance with some examples.

FIG. 13 is a flowchart illustrating an example of a process 1300 for wireless communications at a user equipment (UE). For example, the process 1300 can be performed using one or more techniques described herein (e.g., for scheduling feedback-less Hybrid Automatic Repeat Resource Request (HARQ) feedback). The process 1300 can be performed by a computing device or apparatus, such as a wireless communications device (e.g., a UE), or a component or system (e.g., a chipset) of the wireless communication device. The operations of the process 1300 may be implemented as software components that are executed and run on one or more processors (e.g., processor(s) 484 of FIG. 4, processor 1410 of FIG. 14, or other processor(s)). Further, the transmission and reception of signals by the wireless communications device in the process 1300 may be enabled, for example, by one or more antennas (e.g., antenna 487 of FIG. 4) and/or one or more transceivers (e.g., wireless transceiver(s) 478 of FIG. 4).

At block 1302, the process 1300 includes receiving a plurality of wireless downlink communications, wherein each downlink communication of the plurality of downlink communications is associated with a Hybrid Automatic Repeat Request (HARQ) process. For example, the plurality of wireless downlink communications can be received by a wireless communications device (or component thereof). In some examples, the plurality of downlink communications includes one or more feedback-enabled Transport Blocks (TBs). Each feedback-enabled TB can be associated with a HARQ feedback-enabled process. In some cases, the one or more feedback-enabled TBs are received according to a multi-TB scheduling based on a Downlink Control Information (DCI) associated with the multi-TB scheduling. For example, the feedback-enabled TBs associated with a HARQ feedback-enabled process can be the same as or similar to the example feedback-enabled TBs 1-8 included in the feedback-enabled multi-TB block 710 illustrated in FIG. 7A.

In some examples, the plurality of downlink communications can include one or more feedback-disabled TBs, wherein each feedback-disabled TB is associated with a HARQ feedback-disabled process and is received without using multi-TB scheduling.

In some examples, the plurality of downlink communications can include one or more feedback-disabled Transport Blocks (TBs), wherein each feedback-disabled TB is associated with a HARQ feedback-disabled process. In some cases, the one or more feedback-disabled TBs are received using a multi-TB scheduling based on a Downlink Control Information (DCI) associated with the multi-TB scheduling. For example, the feedback-disabled TBs associated with HARQ feedback-disabled processes can be the same as or similar to the example feedback-disabled TBs 1-8 included in the feedback-disabled multi-TB block 720 illustrated in FIG. 7B.

In some examples, the plurality of downlink communications includes one or more feedback-enabled TBs (e.g., associated with a HARQ feedback-enabled process, and further includes one or more feedback-disabled TBs (e.g., associated with a HARQ feedback-disabled process). The one or more feedback-enabled TBs and the one or more feedback-disabled TBs can be received according to a multi-TB scheduling based on a Downlink Control Information (DCI) associated with the multi-TB scheduling. For example, the plurality of downlink communications can be received in a multi-TB scheduled block such as the multi-TB scheduled block 810 illustrated in FIG. 8, the multi-TB scheduled block 910 illustrated in FIG. 9, etc.

In some aspects, the one or more feedback-enabled TBs and the one or more feedback-disabled TBs can be received as one or more TB bundles. Each feedback-enabled TB and each feedback-disabled TB can be included in only one TB bundle of the one or more TB bundles. For example, the feedback-enabled and feedback-disabled TBs can be included in one or more of the TB bundles B1, B2, and B3 illustrated in FIGS. 10 and 11. In some examples, the one or more TB bundles can include at least one of a feedback-enabled TB bundle (e.g., wherein each feedback-enabled TB bundle includes at least one feedback-enabled TB) and/or a feedback-disabled TB bundle (e.g., wherein each feedback-disabled TB bundle does not include any feedback-disabled TB). For example, a feedback-enabled TB bundle can be the same as or similar to the feedback-enabled TB bundles B1 and/or B3 illustrated in FIG. 10A. A feedback-disabled TB bundle can be the same as or similar to the feedback-disabled TB bundle B2 illustrated in FIG. 10A.

At block 1304, the process 1300 includes determining one or more uplink communications, wherein each uplink communication of the one or more uplink communications includes feedback associated with at least one downlink communication of the plurality of downlink communications. For example, the one or more uplink communications can be determined by the wireless communications device (or component thereof).

In some examples, the one or more uplink communications include a HARQ feedback determined for each feedback-enabled TB of the one or more feedback-enabled TBs. For example, the one or more uplink communications can include the HARQ-ACK bits 1'-8' illustrated in FIG. 7A as being determined for the feedback-enabled TBs 1-8. In some cases, a first uplink slot of the uplink communication transmission configuration is later than a last downlink slot associated with receiving the one or more feedback-enabled TBs using the multi-TB scheduling. For example, the uplink time slot associated with transmitted HARQ-ACK 1' can be later than the downlink time slot associated with receiving TB 8, in the context of the example of FIG. 7A.

In some examples, the one or more uplink communications do not include feedback associated with the one or more feedback-disabled TBs (e.g., no uplink communications are generated for the feedback-disabled TBs 1-8 included in the feedback-disabled TB 720 illustrated in FIG. 7B).

In some examples, when the plurality of downlink communications includes a single multi-TB block with both feedback-enabled and feedback-disabled TBs (e.g., such as the multi-TB scheduled block 810 illustrated in FIG. 8, the multi-TB scheduled block 910 illustrated in FIG. 9, etc.), the one or more uplink communications can include a respective HARQ feedback determined for each feedback-enabled TB of the one or more feedback-enabled TBs and a respective placeholder feedback determined for each feedback-disabled TB of the one or more feedback-disabled TBs. For example, the one or more uplink communications can be provided as a multi-HARQ feedback block such as the multi-HARQ feedback block 815a illustrated in FIG. 8.

In some examples, the one or more uplink communications include a HARQ feedback determined for each feedback-enabled TB and do not include feedback associated with the one or more feedback-disabled TBs. For example, the one or more uplink communications can be provided as a multi-HARQ feedback block such as the multi-HARQ feedback block 815b illustrated in FIG. 8. In some cases, at block 1304 the process 1300 can further include determining the uplink communication transmission configuration based on a relative order associated with receiving the one or more feedback-enabled TBs and the one or more feedback-disabled TBs. For example, the uplink communication transmission configuration can be determined by: each feedback-enabled TB included in the relative order, generating a HARQ feedback transmission time interval associated with a HARQ feedback determined for the feedback-enabled TB, and for each feedback-disabled TB included in the relative order, generating an empty uplink transmission time interval associated with the feedback-disabled TB.

In some cases, the HARQ feedback determined for each feedback-enabled TB of the one or more feedback-enabled TBs can be transmitted without transmitting anything for the feedback-disabled TBs. For example, the HARQ feedback can be provided as a multi-HARQ feedback block such as the multi-HARQ feedback block 815c illustrated in FIG. 8. The HARQ feedback can be transmitted in a same relative order associated with receiving the one or more feedback-enabled TBs, wherein the relative order does not include the one or more feedback-disabled TBs. In some cases, the HARQ feedback can be transmitted without reserving one or more uplink transmission time intervals for the one or more feedback-disabled TBs.

In some aspects, when the plurality of downlink communications are received as feedback-enabled and/or feedback-disabled TBs included in one or more TB bundles (e.g., such as the TB bundles B1, B2, and B3 illustrated in FIG. 10A), a respective HARQ feedback can be generated for each feedback-enabled TB included in a feedback-enabled TB bundle. In some cases, a respective placeholder feedback can be generated for each feedback-disabled TB included in the feedback-enabled TB bundle. In some aspects, a bundled HARQ feedback can be determined based on each HARQ feedback and each placeholder feedback, wherein the one or more uplink communications include the bundled HARQ feedback. For example, the bundled HARQ feedback can include the bundled HARQ feedback bits B1', B2', and/or B3', illustrated in FIG. 10A as being included in the bundled HARQ-feedback block 1015.

In some examples, the bundled HARQ feedback bits (e.g., B1', B2', B3' illustrated in FIG. 10A) can be determined by calculating a logical AND between each HARQ feedback and each placeholder feedback. In some cases, the placeholder feedback can include an acknowledgement (ACK) or a logical value of '1'.

At block 1306, the process 1300 includes transmitting the one or more uplink communications based on an uplink communication transmission configuration, wherein the uplink communication transmission configuration is determined based on a type of each downlink communication of the plurality of downlink communications. For example, the one or more uplink communications can be transmitted by the wireless communications device (or component thereof).

In some examples, when the plurality of downlink communications includes a single multi-TB block with both feedback-enabled and feedback-disabled TBs (e.g., such as the multi-TB scheduled block 810 illustrated in FIG. 8, the multi-TB scheduled block 910 illustrated in FIG. 9, etc.), the uplink communication transmission configuration can be determined based on a relative order associated with receiving the one or more feedback-enabled TBs and the one or more feedback-disabled TBs. In some examples, the HARQ feedback and the placeholder feedback are transmitted using a same relative order associated with receiving the one or more feedback-enabled TBs and the one or more feedback-disabled TBs.

In some examples, when TB bundling is enabled or performed (e.g., the multi-TB scheduled block is received using one or more TB bundles, such as the bundles B1, B2, and B3 illustrated in FIG. 10A as being associated with the multi-TB block 1010), the uplink communication transmission configuration can be determined based on a relative order associated with receiving the one or more TB bundles. For example, the uplink communication transmission configuration can be determined by: for each given feedback-enabled TB bundle included in the relative order, generating a HARQ feedback transmission time interval associated with the bundled HARQ feedback determined for the given feedback-enabled TB bundle, and, for each given feedback-disabled TB bundle included in the relative order, generating an empty uplink transmission time interval associated with the given feedback-disabled TB bundle.

In some cases, the bundled HARQ feedback can be transmitted in a same relative order associated with receiving the one or more TB bundles, wherein the relative order does not include the one or more feedback-disabled TB bundles. For example, the bundled HARQ feedback can be transmitted without reserving one or more uplink transmission time intervals for the one or more feedback-disabled TB bundles (e.g., such as in the multi-HARQ feedback block 1115b illustrated in FIG. 11).

In some examples, the processes described herein (e.g., process 1300 and/or other process described herein) may be performed by a computing device or apparatus (e.g., a UE, a network entity, etc.). In one example, the process 1300 may be performed by a wireless communication device, such as a UE (e.g., the wireless device 407 of FIG. 4, the UE 505 of FIGS. 5A-5C, the UE 630 of FIG. 6, a mobile device, and/or other UE or device). In another example, the process 1300 may be performed by a computing device with the computing system 1400 shown in FIG. 14. For instance, a wireless communication device (e.g., the wireless device 407 of FIG. 4, the UE 505 of FIGS. 5A-5C, the UE 630 of FIG. 6, a mobile device, and/or other UE or device) with the computing architecture shown in FIG. 14 may include the components of the UE and may implement the operations of FIG. 13.

In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, one or more network interfaces configured to communicate and/or receive the data, any combination thereof, and/or other component(s). The one or more network interfaces may be configured to communicate and/or receive wired and/or wireless data, including data according to the 3G, 4G, 5G, and/or other cellular standard, data according to the WiFi (802.11x)

standards, data according to the Bluetooth™ standard, data according to the Internet Protocol (IP) standard, and/or other types of data.

The components of the computing device may be implemented in circuitry. For example, the components may include and/or may be implemented using electronic circuits or other electronic hardware, which may include one or more programmable electronic circuits (e.g., microprocessors, graphics processing units (GPUs), digital signal processors (DSPs), central processing units (CPUs), and/or other suitable electronic circuits), and/or may include and/or be implemented using computer software, firmware, or any combination thereof, to perform the various operations described herein.

The process 1300 is illustrated as a logical flow diagram, the operation of which represent a sequence of operations that may be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations may be combined in any order and/or in parallel to implement the processes.

Additionally, the process 1300 and/or other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 14:
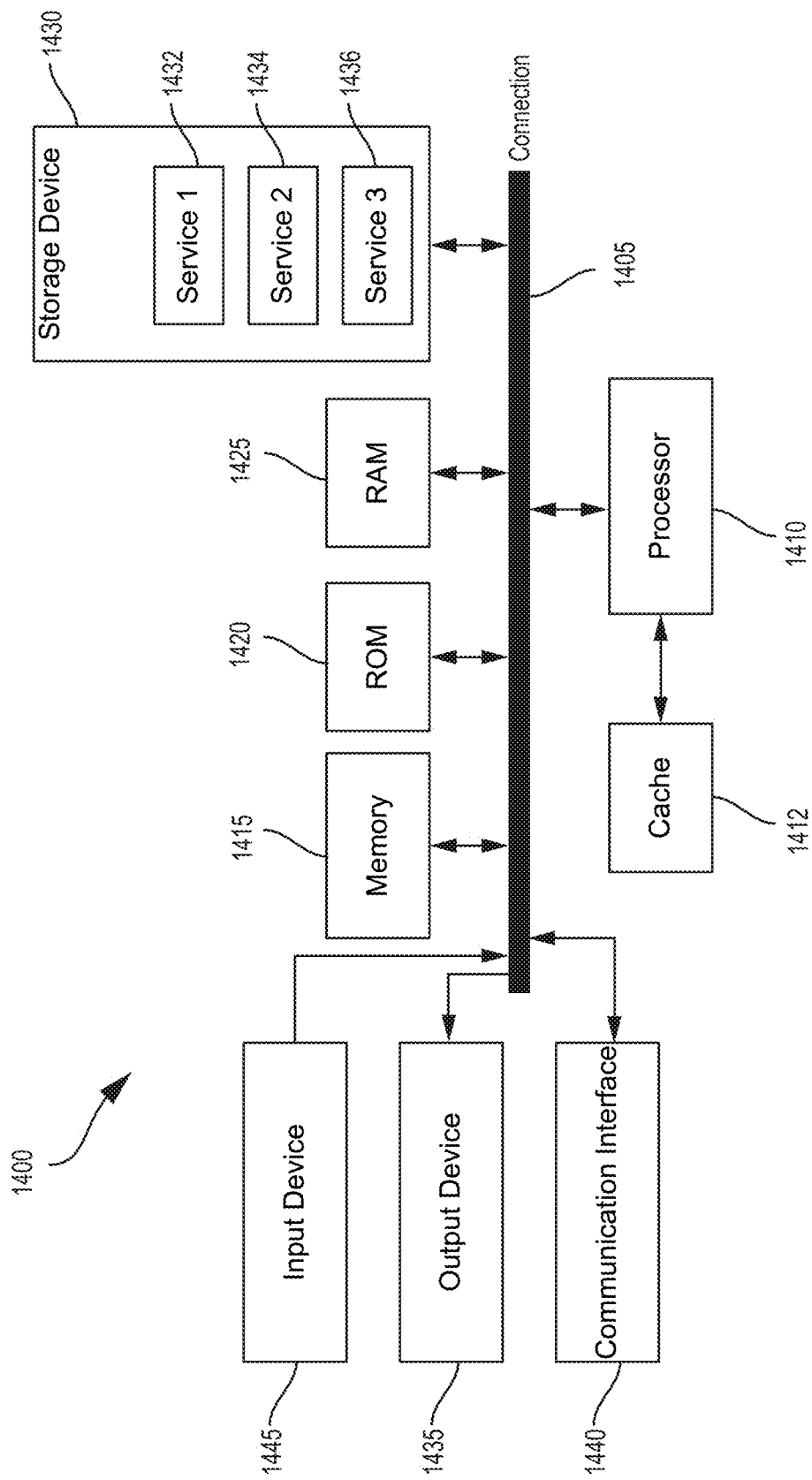
FIG. 14 is a block diagram illustrating an example of a computing system, in accordance with some examples.

FIG. 14 is a diagram illustrating an example of a system for implementing certain aspects of the present technology. In particular, FIG. 14 illustrates an example of computing system 1400, which may be for example any computing device making up internal computing system, a remote computing system, a camera, or any component thereof in which the components of the system are in communication with each other using connection 1405. Connection 1405 may be a physical connection using a bus, or a direct connection into processor 1410, such as in a chipset architecture. Connection 1405 may also be a virtual connection, networked connection, or logical connection.

In some aspects, computing system 1400 is a distributed system in which the functions described in this disclosure may be distributed within a datacenter, multiple data centers, a peer network, etc. In some aspects, one or more of the described system components represents many such components each performing some or all of the function for which the component is described. In some aspects, the components may be physical or virtual devices.

Example system 1400 includes at least one processing unit (CPU or processor) 1410 and connection 1405 that communicatively couples various system components including system memory 1415, such as read-only memory (ROM) 1420 and random access memory (RAM) 1425 to processor 1410. Computing system 1400 may include a cache 1412 of high-speed memory connected directly with, in close proximity to, or integrated as part of processor 1410.

Processor 1410 may include any general purpose processor and a hardware service or software service, such as services 1432, 1434, and 1436 stored in storage device 1430, configured to control processor 1410 as well as a special-purpose processor where software instructions are incorporated into the actual processor design. Processor 1410 may essentially be a completely self-contained computing system, containing multiple cores or processors, a bus, memory controller, cache, etc. A multi-core processor may be symmetric or asymmetric.

To enable user interaction, computing system 1400 includes an input device 1445, which may represent any number of input mechanisms, such as a microphone for speech, a touch-sensitive screen for gesture or graphical input, keyboard, mouse, motion input, speech, etc. Computing system 1400 may also include output device 1435, which may be one or more of a number of output mechanisms. In some instances, multimodal systems may enable a user to provide multiple types of input/output to communicate with computing system 1400.

Computing system 1400 may include communications interface 1440, which may generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple™ Lightning™ port/plug, an Ethernet port/plug, a fiber optic port/plug, a proprietary wired port/plug, 3G, 4G, 5G and/or other cellular data network wireless signal transfer, a Bluetooth™ wireless signal transfer, a Bluetooth™ low energy (BLE) wireless signal transfer, an IBEACON™ wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1440 may also include one or more Global Navigation Satellite System (GNSS) receivers or transceivers that are used to determine a location of the computing system 1400 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1430 may be a non-volatile and/or non-transitory and/or computer-readable memory device and may be a hard disk or other types of computer readable media which may store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (e.g., Level 1 (L1) cache, Level 2 (L2) cache, Level 3 (L3) cache, Level 4 (L4) cache, Level 5 (L5) cache, or other (L #) cache), resistive random-access memory (RRAM/ReRAM), phase change memory (PCM), spin transfer torque RAM (STT-RAM), another memory chip or cartridge, and/or a combination thereof.

The storage device 1430 may include software services, servers, services, etc., that when the code that defines such software is executed by the processor 1410, it causes the system to perform a function. In some aspects, a hardware service that performs a particular function may include the software component stored in a computer-readable medium in connection with the necessary hardware components, such as processor 1410, connection 1405, output device 1435, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data may be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Specific details are provided in the description above to provide a thorough understanding of the aspects and examples provided herein, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects may be utilized in any number of environments and applications beyond those described herein without departing from the broader scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Individual aspects may be described above as a process or method which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

Processes and methods according to the above-described examples may be implemented using computer-executable instructions that are stored or otherwise available from computer-readable media. Such instructions may include, for example, instructions and data which cause or otherwise configure a general purpose computer, special purpose computer, or a processing device to perform a certain function or group of functions. Portions of computer resources used may be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

In some aspects the computer-readable storage devices, mediums, and memories may include a cable or wireless signal containing a bitstream and the like. However, when mentioned, non-transitory computer-readable storage media expressly exclude media such as energy, carrier signals, electromagnetic waves, and signals per se.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof, in some cases depending in part on the particular application, in part on the desired design, in part on the corresponding technology, etc.

The various illustrative logical blocks, modules, and circuits described in connection with the aspects disclosed herein may be implemented or performed using hardware, software, firmware, middleware, microcode, hardware description languages, or any combination thereof, and may take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Examples of form factors include laptops, smart phones, mobile phones, tablet devices or other small form factor personal computers, personal digital assistants, rackmount devices, standalone devices, and so on. Functionality described herein also may be embodied in peripherals or add-in cards. Such functionality may also be implemented on a circuit board among different chips or different processes executing in a single device, by way of further example.

The instructions, media for conveying such instructions, computing resources for executing them, and other structures for supporting such computing resources are example means for providing the functions described in the disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that may be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

One of ordinary skill will appreciate that the less than ("<") and greater than (">") symbols or terminology used herein may be replaced with less than or equal to ("≤") and greater than or equal to ("≥") symbols, respectively, without departing from the scope of this description.

Where components are described as being "configured to" perform certain operations, such configuration may be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" or "communicatively coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, A and B and C, or any duplicate information or data (e.g., A and A, B and B, C and C, A and A and B, and so on), or any other ordering, duplication, or combination of A, B, and C. The language "at least one of" a set and/or "one or more" of a set does not limit the set to the items listed in the set. For example, claim language reciting "at least one of A and B" or "at least one of A or B" may mean A, B, or A and B, and may additionally include items not listed in the set of A and B.

Illustrative aspects of the disclosure include:

Aspect 1. A method for wireless communications at a user equipment (UE), comprising: receiving a plurality of downlink communications, wherein each downlink communication of the plurality of downlink communications is associated with a Hybrid Automatic Repeat Request (HARQ) process; determining one or more uplink communications, wherein each uplink communication of the one or more uplink communications includes feedback associated with at least one downlink communication of the plurality of downlink communications; and transmitting the one or more uplink communications based on an uplink communication transmission configuration, wherein the uplink communication transmission configuration is determined based on a type of each downlink communication of the plurality of downlink communications.

Aspect 2. The method of Aspect 1, wherein: the plurality of downlink communications includes one or more feedback-enabled Transport Blocks (TBs), wherein each feedback-enabled TB of the one or more feedback-enabled TBs is associated with a HARQ feedback-enabled process; and the one or more feedback-enabled TBs are received according to a multi-TB scheduling based on a Downlink Control Information (DCI) associated with the multi-TB scheduling.

Aspect 3. The method of Aspect 2, wherein: the one or more uplink communications include a HARQ feedback determined for each feedback-enabled TB of the one or more feedback-enabled TBs; and a first uplink slot of the uplink communication transmission configuration is later than a last downlink slot associated with receiving the one or more feedback-enabled TBs using the multi-TB scheduling.

Aspect 4. The method of any of Aspects 2 to 3, further comprising receiving one or more feedback-disabled TBs, wherein each feedback-disabled TB is associated with a HARQ feedback-disabled process and is received without using multi-TB scheduling.

Aspect 5. The method of any of Aspects 1 to 4, wherein: the plurality of downlink communications includes one or more feedback-disabled Transport Blocks (TBs), wherein each feedback-disabled TB is associated with a HARQ feedback-disabled process; and the one or more feedback-disabled TBs are received using a multi-TB scheduling based on a Downlink Control Information (DCI) associated with the multi-TB scheduling.

Aspect 6. The method of Aspect 5, wherein the one or more uplink communications do not include feedback associated with the one or more feedback-disabled TBs.

Aspect 7. The method of any of Aspects 1 to 5, wherein the plurality of downlink communications includes: one or more feedback-enabled Transport Blocks (TBs), wherein each feedback-enabled TB of the one or more feedback-enabled TBs is associated with a HARQ feedback-enabled process; and one or more feedback-disabled TBs, wherein each feedback-disabled TB of the one or more feedback-disabled TBs is associated with a HARQ feedback-disabled process; wherein the one or more feedback-enabled TBs and the one or more feedback-disabled TBs are received according to a multi-TB scheduling based on a Downlink Control Information (DCI) associated with the multi-TB scheduling.

Aspect 8. The method of Aspect 7, wherein the one or more uplink communications include: a respective HARQ feedback determined for each feedback-enabled TB of the one or more feedback-enabled TBs; and a respective placeholder feedback determined for each feedback-disabled TB of the one or more feedback-disabled TBs.

Aspect 9. The method of Aspect 8, further comprising: determining the uplink communication transmission configuration based on a relative order associated with receiving the one or more feedback-enabled TBs and the one or more feedback-disabled TBs; and transmitting the HARQ feedback and the placeholder feedback using a same relative order associated with receiving the one or more feedback-enabled TBs and the one or more feedback-disabled TBs.

Aspect 10. The method of any of Aspects 7 to 9, wherein the one or more uplink communications include a HARQ feedback determined for each feedback-enabled TB of the one or more feedback-enabled TBs and do not include feedback associated with the one or more feedback-disabled TBs.

Aspect 11. The method of Aspect 10, further comprising: determining the uplink communication transmission configuration based on a relative order associated with receiving the one or more feedback-enabled TBs and the one or more feedback-disabled TBs; wherein the uplink communication transmission configuration is determined by: for each feedback-enabled TB included in the relative order, generating a HARQ feedback transmission time interval associated with a HARQ feedback determined for the feedback-enabled TB; and for each feedback-disabled TB included in the relative order, generating an empty uplink transmission time interval associated with the feedback-disabled TB.

Aspect 12. The method of any of Aspects 10 to 11, wherein transmitting the one or more uplink communications includes: transmitting the HARQ feedback determined for each feedback-enabled TB of the one or more feedback-enabled TBs, wherein: the HARQ feedback is transmitted in a same relative order associated with receiving the one or more feedback-enabled TBs, wherein the relative order does not include the one or more feedback-disabled TBs; and the HARQ feedback is transmitted without reserving one or more uplink transmission time intervals for the one or more feedback-disabled TBs.

Aspect 13. The method of any of Aspects 7 to 12, wherein the one or more feedback-enabled TBs and the one or more feedback-disabled TBs are received as one or more TB bundles, wherein each feedback-enabled TB and each feedback-disabled TB is included in only one TB bundle of the one or more TB bundles; and the one or more TB bundles include at least one of: a feedback-enabled TB bundle, wherein each feedback-enabled TB bundle includes at least one feedback-enabled TB; and a feedback-disabled TB bundle, wherein each feedback-disabled TB bundle does not include any feedback-enabled TB.

Aspect 14. The method of Aspect 13, wherein determining the one or more uplink communications further includes, for each feedback-enabled TB bundle of the one or more TB bundles: generating a respective HARQ feedback for each feedback-enabled TB included in the feedback-enabled TB bundle; generating a respective placeholder feedback for each feedback-disabled TB included in the feedback-enabled TB bundle; and determining a bundled HARQ feedback based on each HARQ feedback and each placeholder feedback, wherein the one or more uplink communications include the bundled HARQ feedback.

Aspect 15. The method of Aspect 14, wherein determining the bundled HARQ feedback includes calculating a logical AND between each HARQ feedback and each placeholder feedback.

Aspect 16. The method of Aspect 15, wherein the placeholder feedback includes an acknowledgement (ACK) or a logical 1 value.

Aspect 17. The method of any of Aspects 14 to 16, further comprising: determining the uplink communication transmission configuration based on a relative order associated with receiving the one or more TB bundles; wherein the uplink communication transmission configuration is determined by: for each given feedback-enabled TB bundle included in the relative order, generating a HARQ feedback transmission time interval associated with the bundled HARQ feedback determined for the given feedback-enabled TB bundle; and for each given feedback-disabled TB bundle included in the relative order, generating an empty uplink transmission time interval associated with the given feedback-disabled TB bundle.

Aspect 18. The method of any of Aspects 14 to 17, wherein transmitting the one or more uplink communications includes: transmitting the bundled HARQ feedback determined for each feedback-enabled TB of the one or more TB bundles, wherein: the bundled HARQ feedback is transmitted in a same relative order associated with receiving the one or more TB bundles, wherein the relative order does not include the one or more feedback-disabled TB bundles; and the bundled HARQ feedback is transmitted without reserving one or more uplink transmission time intervals for the one or more feedback-disabled TB bundles.

Aspect 19. The method of any of Aspects 13 to 18, wherein the one or more TB bundles are determined using a specific TB-bundling configuration selected from a plurality of TB-bundling configurations.

Aspect 20. The method of Aspect 19, wherein the specific TB-bundling configuration is determined based on receiving a Radio Resource Control (RRC) downlink communication or a Media Access Control-Control Element (MAC-CE) downlink communication.

Aspect 21. The method of any of Aspects 1 to 20, wherein one or more of the plurality of downlink communications are received by an enhanced Machine Type Communication (eMTC) UE or one or more of the one or more uplink communications are transmitted by the eMTC UE.

Aspect 22. The method of Aspect 21, wherein the eMTC UE receives one or more of the plurality of downlink communications using a Non-Terrestrial Network (NTN) or the eMTC UE transmits the one or more uplink communications using an NTN.

Aspect 23. The method of any of Aspects 1 to 22, further comprising: receiving a first Physical Downlink Shared Channel (PDSCH) communication including at least a first downlink communication of the plurality of downlink communications, wherein the first downlink communication includes a Transport Block (TB) associated with a feedback-disabled HARQ process; and receiving a second PDSCH communication including at least an additional downlink communication, wherein the additional downlink communication includes an additional TB associated with the feedback-disabled HARQ process; wherein the first PDSCH communication and the second PDSCH communication are separated by a pre-defined time interval.

Aspect 24. The method of Aspect 23, wherein the UE is an eMTC UE, or a Band-Limited or Coverage Enhanced (BL/CE) UE, and the pre-defined time interval is four milliseconds.

Aspect 25. The method of any of Aspects 1 to 24, wherein one or more downlink communications of the plurality of downlink communications are received by a Narrowband-Internet of Things (NB-IoT) UE or one or more of the uplink communications are transmitted by an NB-IoT network.

Aspect 26. The method of Aspect 25, wherein the one or more downlink communications are associated with up to four HARQ processes, wherein: the up to four HARQ processes include a subset of up to two feedback-enabled HARQ processes; and one or more HARQ processes, of the up to four HARQ processes, not included in the subset are feedback-disabled HARQ processes.

Aspect 27. The method of Aspect 26, further comprising: storing a feedback-enabled TB associated with each feedback-enabled HARQ process included in the subset of up to two feedback-enabled HARQ processes in a soft buffer associated with the UE.

Aspect 28. The method of Aspect 27, further comprising: determining, based on a dedicated Downlink Control Information (DCI) bit associated with the up to four HARQ processes, whether soft-buffer storage is required for each HARQ process of the up to four HARQ processes; wherein a first value of the DCI bit indicates that soft-buffer storage is required for each feedback-enabled HARQ process included in the subset; or wherein a second value of the DCI bit indicates that soft-buffer storage is not required for the feedback-disabled HARQ processes not included in the subset.

Aspect 29. The method of any of Aspects 27 to 28, further comprising: determining, based on a dedicated DCI bit associated with the up to four HARQ processes, whether each HARQ process of the up to four HARQ processes is a feedback-enabled HARQ process or a feedback-disabled HARQ process; wherein a first value of the DCI bit is used for feedback-enabled HARQ processes and a second value of the DCI bit is used for feedback-disabled HARQ processes.

Aspect 30. The method of any of Aspects 28 to 29, further comprising using the dedicated DCI bit to implicitly or explicitly indicate a HARQ process ID number for each HARQ process of the up to four HARQ processes.

Aspect 31. The method of any of Aspects 1 to 30, wherein the plurality of downlink communications are received from a network entity, and wherein the one or more uplink communications are transmitted to the network entity.

Aspect 32. The method of Aspect 31, wherein the network entity is a base station.

Aspect 33. The method of Aspect 32, wherein the base station is one of a next generation node B (gNB) or an evolved node B (eNB).

Aspect 34. The method of any of Aspects 31 to 33, wherein the network entity is at least one of a central unit (CU), a distributed unit (DU), a radio unit (RU), a Near-Real Time (Near-RT) RAN Intelligent Controller (RIC), or a Non-Real Time (Non-RT) RIC of a base station.

Aspect 35. The method of any of Aspects 31 to 34, wherein the network entity is a Non-Terrestrial Network (NTN) entity.

Aspect 36. The method of Aspect 35, wherein the NTN entity is a satellite.

Aspect 37. A method of wireless communication at a user equipment (UE), comprising: receiving a first Physical Downlink Shared Channel (PDSCH) communication including at least a first downlink communication of a plurality of downlink communications, wherein the first downlink communication includes a Transport Block (TB) associated with a first feedback-disabled Hybrid Automatic Repeat Request (HARQ) process; and receiving a second PDSCH communication including at least an additional downlink communication, wherein the additional downlink communication includes an additional TB associated with the first feedback-disabled HARQ process; wherein the first PDSCH communication and the second PDSCH communication are separated by a pre-defined time interval.

Aspect 38. The method of Aspect 37, wherein the UE is an eMTC UE, or a Band-Limited or Coverage Enhanced (BL/CE) UE, and the pre-defined time interval is four milliseconds.

Aspect 39. A method of wireless communication at a Narrowband-Internet of Things (NB-IoT) user equipment (UE), comprising: receiving, at the Narrowband-Internet of Things (NB-IoT) UE, a plurality of downlink communications, wherein the plurality of downlink communications are associated with up to four HARQ processes, wherein: the up to four HARQ processes include a subset of up to two feedback-enabled HARQ processes; and one or more HARQ processes, of the up to four HARQ processes, not included in the subset are feedback-disabled HARQ processes.

Aspect 40. The method of Aspect 39, further comprising: storing a feedback-enabled TB associated with each feedback-enabled HARQ process included in the subset of up to two feedback-enabled HARQ processes in a soft buffer associated with the UE.

Aspect 41. The method of Aspect 40, further comprising: determining, based on a dedicated Downlink Control Information (DCI) bit associated with the up to four HARQ processes, whether soft-buffer storage is required for each HARQ process of the up to four HARQ processes; wherein a first value of the DCI bit indicates that soft-buffer storage is required for each feedback-enabled HARQ process included in the subset; or wherein a second value of the DCI bit indicates that soft-buffer storage is not required for the feedback-disabled HARQ processes not included in the subset.

Aspect 42. The method of any of Aspects 40 to 41, further comprising: determining, based on a dedicated DCI bit associated with the up to four HARQ processes, whether each HARQ process of the up to four HARQ processes is a feedback-enabled HARQ process or a feedback-disabled HARQ process; wherein a first value of the DCI bit is used for feedback-enabled HARQ processes and a second value of the DCI bit is used for feedback-disabled HARQ processes; and wherein HARQ processes associated with the first value of the DCI bit are stored in the soft buffer.

Aspect 43. The method of any of Aspects 41 to 42, further comprising using the dedicated DCI bit to implicitly indicate a HARQ process ID number for each HARQ process of the up to four HARQ processes.

Aspect 44. The method of any of Aspects 2 to 43, further comprising: determining a last scheduled TB for which HARQ feedback is enabled; and starting a HARQ Round Trip Time (RTT) timer from an end of the last scheduled TB for which HARQ feedback is enabled.

Aspect 45. The method of Aspect 44, further comprising: determining, by a Narrowband-Internet-of-Things (NB-IoT) UE, a HARQ RTT timer duration as $k+(2-X)*(N+1)+RTT_{offset}+delta_{PDCCH}$, wherein: k is determined as an interval between a last subframe associated with receiving the plurality of downlink communications and a first subframe associated with transmitting the one or more uplink communications; N is determined as a transmission duration associated with transmitting the one or more uplink communications, wherein the transmission duration includes a number of subframes; and X is determined as a number of feedback-disabled TBs.

Aspect 46. The method of any of Aspects 44 to 45, further comprising: determining, by an enhanced Machine Type Communication (eMTC) UE with HARQ-ACK bundling enabled, a HARQ RTT timer duration as $7+(k-X)*N+RTT_{offset}$, wherein: N is determined as a Physical Uplink Communication Channel (PUCCH) repetition factor; k is a number of HARQ feedback bundles associated with the HARQ-ACK bundling; and X is determined as a number of feedback-disabled bundles.

Aspect 47. The method of Aspect 46, wherein k is determined as ceiling($N_{TB}$/M), wherein: $N_{TB}$ is determined as a number of scheduled TBs indicated in a Physical Downlink Communication Channel (PDCCH) wireless communication; and M is determined as a multi-TB HARQ-ACK bundling size.

Aspect 48. The method of any of Aspects 44 to 47, further comprising: determining, by an enhanced Machine Type Communication (eMTC) UE with HARQ-ACK bundling disabled, a HARQ RTT timer duration as $7+(m-X)*N+RTT_{offset}$, wherein: N is determined as a Physical Uplink Communication Channel (PUCCH) repetition factor; m is determined as a number of scheduled TBs included in a Physical Downlink Communication Channel (PDCCH) wireless communication; and X is determined as a quantity of feedback-disabled TBs.

Aspect 49. The apparatus of any of Aspects 7 to 48, the multi-TB scheduling includes the one or more feedback-enabled TBs before the one or more feedback-disabled TBs; and a last transmission time interval associated with the one or more feedback-enabled TBs is earlier than a first transmission time interval associated with the one or more feedback-disabled TBs.

Aspect 50. The method of Aspect 49, wherein: the one or more uplink communications include a respective HARQ feedback determined for each feedback-enabled TB of the one or more feedback-enabled TBs; and at least a portion of the one or more uplink communications are transmitted after the last transmission time interval associated with the one or more feedback-enabled TBs.

Aspect 51. The method of Aspect 50, wherein the at least a portion of the one or more uplink communications are transmitted before a last transmission time interval associated with the one or more feedback-disabled TBs.

Aspect 52. The method of any of Aspects 1 to 51, wherein the plurality of downlink communications includes: at least one feedback-enabled Transport Block (TB) associated with a first HARQ process; and at least one feedback-disabled TB associated with a second HARQ process; wherein the at least one feedback-enabled TB and the at least one feedback-disabled TB are single-TB scheduled.

Aspect 53. The method of Aspect 52, further comprising: using a DCI override bit to configure the at least one feedback-enabled TB as a feedback-disabled TB; or using the DCI override bit to configure the at least one feedback-disabled TB as a feedback-enabled TB.

Aspect 54. The method of Aspect 53, further comprising: determining, based on a dedicated Downlink Control Information (DCI) bit associated with the up to four HARQ processes, whether soft-buffer storage is required for each HARQ process of the up to four HARQ processes; wherein a first value of the DCI bit indicates that soft-buffer storage is required for each feedback-enabled HARQ process included in the subset; or wherein a second value of the DCI bit indicates that soft-buffer storage is not required for the feedback-disabled HARQ processes not included in the subset.

Aspect 55. The method of any of Aspects 53 to 54, wherein the DCI override bit is a HARQ ACK Bundling Flag.

Aspect 56. An apparatus for wireless communications, comprising: at least one memory; and at least one processor coupled to at least one memory and configured to: receive a plurality of downlink communications, wherein each downlink communication of the plurality of downlink communications is associated with a Hybrid Automatic Repeat Request (HARQ) process; determine one or more uplink communications, wherein each uplink communication of the one or more uplink communications includes feedback associated with at least one downlink communication of the plurality of downlink communications; and transmit the one or more uplink communications based on an uplink communication transmission configuration, wherein the uplink communication transmission configuration is determined based on a type of each downlink communication of the plurality of downlink communications.

Aspect 57. Then apparatus of Aspect 56, wherein: the plurality of downlink communications includes one or more feedback-enabled Transport Blocks (TBs), wherein each feedback-enabled TB of the one or more feedback-enabled TBs is associated with a HARQ feedback-enabled process; and the one or more feedback-enabled TBs are received according to a multi-TB scheduling based on a Downlink Control Information (DCI) associated with the multi-TB scheduling.

Aspect 58. The apparatus of Aspect 57, wherein: the one or more uplink communications include a HARQ feedback determined for each feedback-enabled TB of the one or more feedback-enabled TBs; and a first uplink slot of the uplink communication transmission configuration is later than a last downlink slot associated with receiving the one or more feedback-enabled TBs using the multi-TB scheduling.

Aspect 59. The apparatus of any of Aspects 57 to 58, wherein the at least one processor is further configured to: receive one or more feedback-disabled TBs, wherein each feedback-disabled TB is associated with a HARQ feedback-disabled process and is received without using multi-TB scheduling.

Aspect 60. The apparatus of any of Aspects 56 to 59, wherein: the plurality of downlink communications includes one or more feedback-disabled Transport Blocks (TBs), wherein each feedback-disabled TB is associated with a HARQ feedback-disabled process; and the one or more feedback-disabled TBs are received using a multi-TB scheduling based on a Downlink Control Information (DCI) associated with the multi-TB scheduling.

Aspect 61. The apparatus of Aspect 60, wherein: the one or more uplink communications do not include feedback associated with the one or more feedback-disabled TBs.

Aspect 62. The apparatus of any of Aspects 56 to 61, wherein the plurality of downlink communications includes: one or more feedback-enabled Transport Blocks (TBs), wherein each feedback-enabled TB of the one or more feedback-enabled TBs is associated with a HARQ feedback-enabled process; and one or more feedback-disabled TBs, wherein each feedback-disabled TB of the one or more feedback-disabled TBs is associated with a HARQ feedback-disabled process; wherein the one or more feedback-enabled TBs and the one or more feedback-disabled TBs are received according to a multi-TB scheduling based on a Downlink Control Information (DCI) associated with the multi-TB scheduling.

Aspect 63. The apparatus of Aspect 62, wherein the one or more uplink communications include: a respective HARQ feedback determined for each feedback-enabled TB of the one or more feedback-enabled TBs; and a respective placeholder feedback determined for each feedback-disabled TB of the one or more feedback-disabled TBs.

Aspect 64. The apparatus of Aspect 63, wherein the at least one processor is further configured to: determine the uplink communication transmission configuration based on a relative order associated with receiving the one or more feedback-enabled TBs and the one or more feedback-disabled TBs; and transmit the HARQ feedback and the placeholder feedback using a same relative order associated with receiving the one or more feedback-enabled TBs and the one or more feedback-disabled TBs.

Aspect 65. The apparatus of any of Aspects 62 to 64, wherein the one or more uplink communications include a HARQ feedback determined for each feedback-enabled TB of the one or more feedback-enabled TBs and do not include feedback associated with the one or more feedback-disabled TBs.

Aspect 66. The apparatus of Aspect 65, wherein the at least one processor is further configured to: determine the uplink communication transmission configuration based on a relative order associated with receiving the one or more feedback-enabled TBs and the one or more feedback-disabled TBs; wherein the uplink communication transmission configuration is determined by: for each feedback-enabled TB included in the relative order, generating a HARQ feedback transmission time interval associated with a HARQ feedback determined for the feedback-enabled TB; and for each feedback-disabled TB included in the relative order, generating an empty uplink transmission time interval associated with the feedback-disabled TB.

Aspect 67. The apparatus of any of Aspects 65 to 66, wherein transmitting the one or more uplink communications includes: transmitting the HARQ feedback determined for each feedback-enabled TB of the one or more feedback-enabled TBs, wherein: the HARQ feedback is transmitted in a same relative order associated with receiving the one or more feedback-enabled TBs, wherein the relative order does not include the one or more feedback-disabled TBs; and the HARQ feedback is transmitted without reserving one or more uplink transmission time intervals for the one or more feedback-disabled TBs.

Aspect 68. The apparatus of any of Aspects 62 to 67, wherein: the one or more feedback-enabled TBs and the one or more feedback-disabled TBs are received as one or more TB bundles, wherein each feedback-enabled TB and each feedback-disabled TB is included in only one TB bundle of the one or more TB bundles; and the one or more TB bundles include at least one of: a feedback-enabled TB bundle, wherein each feedback-enabled TB bundle includes at least one feedback-enabled TB; and a feedback-disabled TB bundle, wherein each feedback-disabled TB bundle does not include any feedback-enabled TB.

Aspect 69. The apparatus of Aspect 68, wherein to determine the one or more uplink communications, the at least one processor is further configured to, for each feedback-enabled TB bundle of the one or more TB bundles: generate a respective HARQ feedback for each feedback-enabled TB included in the feedback-enabled TB bundle; generate a respective placeholder feedback for each feedback-disabled TB included in the feedback-enabled TB bundle; and determine a bundled HARQ feedback based on each HARQ feedback and each placeholder feedback, wherein the one or more uplink communications include the bundled HARQ feedback.

Aspect 70. The apparatus of Aspect 69, wherein to determine the bundled HARQ feedback, the at least one processor is configured to calculate a logical AND between each HARQ feedback and each placeholder feedback.

Aspect 71. The apparatus of Aspect 70, wherein the placeholder feedback includes an acknowledgement (ACK) or a logical 1 value.

Aspect 72. The apparatus of any of Aspects 68 to 71, wherein the at least one processor is further configured to: determine the uplink communication transmission configuration based on a relative order associated with receiving the one or more TB bundles; wherein the uplink communication transmission configuration is determined by: for each given feedback-enabled TB bundle included in the relative order, generating a HARQ feedback transmission time interval associated with the bundled HARQ feedback determined for the given feedback-enabled TB bundle; and for each given feedback-disabled TB bundle included in the relative order, generating an empty uplink transmission time interval associated with the given feedback-disabled TB bundle.

Aspect 73. The apparatus of any of Aspects 68 to 72, wherein to transmit the one or more uplink communications, the at least one processor is configured to: transmit the bundled HARQ feedback determined for each feedback-enabled TB of the one or more TB bundles, wherein: the bundled HARQ feedback is transmitted in a same relative order associated with receiving the one or more TB bundles, wherein the relative order does not include the one or more feedback-disabled TB bundles; and the bundled HARQ feedback is transmitted without reserving one or more uplink transmission time intervals for the one or more feedback-disabled TB bundles.

Aspect 74. The apparatus of any of Aspects 67 to 73, wherein to determine the one or more TB bundles, the at least one processor is configured to determine a specific TB-bundling configuration selected from a plurality of TB-bundling configurations.

Aspect 75. The apparatus of Aspect 74, wherein the at least one processor is configured to determine the specific TB-bundling configuration based on receiving a Radio Resource Control (RRC) downlink communication or a Media Access Control-Control Element (MAC-CE) downlink communication.

Aspect 76. The apparatus of any of Aspects 56 to 75, wherein one or more of the plurality of downlink communications are received by an enhanced Machine Type Communication (eMTC) UE or one or more of the one or more uplink communications are transmitted by the eMTC UE.

Aspect 77. The apparatus of Aspect 76, wherein the eMTC UE receives one or more of the plurality of downlink communications using a Non-Terrestrial Network (NTN) or the eMTC UE transmits the one or more uplink communications using an NTN.

Aspect 78. The apparatus of any of Aspects 56 to 77, wherein the at least one processor is further configured to: receive a first Physical Downlink Shared Channel (PDSCH) communication including at least a first downlink communication of the plurality of downlink communications, wherein the first downlink communication includes a Transport Block (TB) associated with a feedback-disabled HARQ process; and receive a second PDSCH communication including at least an additional downlink communication, wherein the additional downlink communication includes an additional TB associated with the feedback-disabled HARQ process; wherein the first PDSCH communication and the second PDSCH communication are separated by a pre-defined time interval.

Aspect 79. The apparatus of Aspect 78, wherein the UE is an eMTC UE, or a Band-Limited or Coverage Enhanced (BL/CE) UE, and the pre-defined time interval is four milliseconds.

Aspect 80. The apparatus of any of Aspects 56 to 79, wherein one or more downlink communications of the plurality of downlink communications are received by a Narrowband-Internet of Things (NB-IoT) UE or one or more of the uplink communications are transmitted by an NB-IoT network.

Aspect 81. The apparatus of Aspect 80, wherein the one or more downlink communications are associated with up to four HARQ processes, wherein: the up to four HARQ processes include a subset of up to two feedback-enabled HARQ processes; and one or more HARQ processes, of the up to four HARQ processes, not included in the subset are feedback-disabled HARQ processes.

Aspect 82. The apparatus of Aspect 81, wherein the at least one processor is further configured to store a feedback-enabled TB associated with each feedback-enabled HARQ process included in the subset of up to two feedback-enabled HARQ processes in a soft buffer associated with the UE.

Aspect 83. The apparatus of Aspect 82, wherein the at least one processor is further configured to: determine, based on a dedicated Downlink Control Information (DCI) bit associated with the up to four HARQ processes, whether soft-buffer storage is required for each HARQ process of the up to four HARQ processes; wherein a first value of the DCI bit indicates that soft-buffer storage is required for each feedback-enabled HARQ process included in the subset; or wherein a second value of the DCI bit indicates that soft-buffer storage is not required for the feedback-disabled HARQ processes not included in the subset.

Aspect 84. The apparatus of any of Aspects 82 to 83, wherein the at least one processor is further configured to: determine, based on a dedicated DCI bit associated with the up to four HARQ processes, whether each HARQ process of the up to four HARQ processes is a feedback-enabled HARQ process or a feedback-disabled HARQ process; wherein a first value of the DCI bit is used for feedback-enabled HARQ processes and a second value of the DCI bit is used for feedback-disabled HARQ processes.

Aspect 85. The apparatus of any of Aspects 83 to 84, wherein the at least one processor is further configured to use the dedicated DCI bit to implicitly or explicitly indicate a HARQ process ID number for each HARQ process of the up to four HARQ processes.

Aspect 86. The apparatus of any of Aspects 56 to 85, wherein the plurality of downlink communications are received from a network entity, and wherein the one or more uplink communications are transmitted to the network entity.

Aspect 87. The apparatus of Aspect 86, wherein the network entity is a base station.

Aspect 88. The apparatus of Aspect 87, wherein the base station is one of a next generation node B (gNB) or an evolved node B (eNB).

Aspect 89. The apparatus of any of Aspects 86 to 88, wherein the network entity is at least one of a central unit (CU), a distributed unit (DU), a radio unit (RU), a Near-Real Time (Near-RT) RAN Intelligent Controller (RIC), or a Non-Real Time (Non-RT) RIC of a base station.

Aspect 90. The apparatus of any of Aspects 86 to 89, wherein the network entity is a Non-Terrestrial Network (NTN) entity.

Aspect 91. The apparatus of Aspect 90, wherein the NTN entity is a satellite.

Aspect 92. An apparatus for wireless communications, comprising: at least one memory; and at least one processor coupled to at least one memory and configured to: receive a first Physical Downlink Shared Channel (PDSCH) communication including at least a first downlink communication of a plurality of downlink communications, wherein the first downlink communication includes a Transport Block (TB) associated with a first feedback-disabled Hybrid Automatic Repeat Request (HARQ) process; and receive a second PDSCH communication including at least an additional downlink communication, wherein the additional downlink communication includes an additional TB associated with the first feedback-disabled HARQ process; wherein the first PDSCH communication and the second PDSCH communication are separated by a pre-defined time interval.

Aspect 93. The apparatus of Aspect 92, wherein the apparatus is an eMTC apparatus, or a Band-Limited or Coverage Enhanced (BL/CE) apparatus, and the pre-defined time interval is four milliseconds.

Aspect 94. An apparatus (e.g., a Narrowband-Internet of Things (NB-IoT) UE) for wireless communications, comprising: at least one memory; and at least one processor coupled to at least one memory and configured to: receive a plurality of downlink communications, wherein the plurality of downlink communications are associated with up to four HARQ processes, wherein: the up to four HARQ processes include a subset of up to two feedback-enabled HARQ processes; and one or more HARQ processes, of the up to four HARQ processes, not included in the subset are feedback-disabled HARQ processes.

Aspect 95. The apparatus of Aspect 94, wherein the at least one processor is further configured to: store a feedback-enabled TB associated with each feedback-enabled HARQ process included in the subset of up to two feedback-enabled HARQ processes in a soft buffer associated with the UE.

Aspect 96. The apparatus of Aspect 95, wherein the at least one processor is further configured to: determine, based on a dedicated Downlink Control Information (DCI) bit associated with the up to four HARQ processes, whether soft-buffer storage is required for each HARQ process of the up to four HARQ processes; wherein a first value of the DCI bit indicates that soft-buffer storage is required for each feedback-enabled HARQ process included in the subset; or wherein a second value of the DCI bit indicates that soft-buffer storage is not required for the feedback-disabled HARQ processes not included in the subset.

Aspect 97. The apparatus of any of Aspects 95 to 96, wherein the at least one processor is further configured to: determine, based on a dedicated DCI bit associated with the up to four HARQ processes, whether each HARQ process of the up to four HARQ processes is a feedback-enabled HARQ process or a feedback-disabled HARQ process; wherein a first value of the DCI bit is used for feedback-enabled HARQ processes and a second value of the DCI bit is used for feedback-disabled HARQ processes; and wherein HARQ processes associated with the first value of the DCI bit are stored in the soft buffer.

Aspect 98. The apparatus of any of Aspects 96 to 97, wherein the at least one processor is further configured to use the dedicated DCI bit to implicitly indicate a HARQ process ID number for each HARQ process of the up to four HARQ processes.

Aspect 99. The apparatus of any of Aspects 57 to 98, wherein the at least one processor is further configured to: determine a last scheduled TB for which HARQ feedback is enabled; and start a HARQ Round Trip Time (RTT) timer from an end of the last scheduled TB for which HARQ feedback is enabled.

Aspect 100. The apparatus of Aspect 99, wherein the at least one processor is further configured to: determine, by a Narrowband-Internet-of-Things (NB-IoT) UE, a HARQ RTT timer duration as $k+(2-X)*(N+1)+RTT_{offset}+delta_{PDCCH}$, wherein: k is determined as an interval between a last subframe associated with receiving the plurality of downlink communications and a first subframe associated with transmitting the one or more uplink communications; N is determined as a transmission duration associated with transmitting the one or more uplink communications, wherein the transmission duration includes a number of subframes; and X is determined as a number of feedback-disabled TBs.

Aspect 101. The apparatus of any of Aspects 99 to 100, wherein the at least one processor is further configured to: determine, by an enhanced Machine Type Communication (eMTC) UE with HARQ-ACK bundling enabled, a HARQ RTT timer duration as $7+(k-X)*N+RTT_{offset}$, wherein: N is determined as a Physical Uplink Communication Channel (PUCCH) repetition factor; k is a number of HARQ feedback bundles associated with the HARQ-ACK bundling; and X is determined as a number of feedback-disabled bundles.

Aspect 102. The apparatus of Aspect 101, wherein the at least one processor is further configured to determine k as ceiling($N_{TB}/M$), wherein: $N_{TB}$ is determined as a number of scheduled TBs indicated in a Physical Downlink Communication Channel (PDCCH) wireless communication; and M is determined as a multi-TB HARQ-ACK bundling size.

Aspect 103. The apparatus of any of Aspects 99 to 102, wherein the at least one processor is further configured to: determine, by an enhanced Machine Type Communication (eMTC) UE with HARQ-ACK bundling disabled, a HARQ RTT timer duration as $7+(m-X)*N+RTT_{offset}$, wherein: N is determined as a Physical Uplink Communication Channel (PUCCH) repetition factor; m is determined as a number of scheduled TBs included in a Physical Downlink Communication Channel (PDCCH) wireless communication; and X is determined as a quantity of feedback-disabled TBs.

Aspect 104. The apparatus of any of Aspects 62 to 103, wherein: the multi-TB scheduling includes the one or more feedback-enabled TBs before the one or more feedback-disabled TBs; and a last transmission time interval associated with the one or more feedback-enabled TBs is earlier than a first transmission time interval associated with the one or more feedback-disabled TBs.

Aspect 105. The apparatus of Aspect 104, wherein: the one or more uplink communications include a respective HARQ feedback determined for each feedback-enabled TB of the one or more feedback-enabled TBs; and at least a portion of the one or more uplink communications are transmitted after the last transmission time interval associated with the one or more feedback-enabled TBs.

Aspect 106. The apparatus of Aspect 105, wherein the at least one processor is further configured to transmit at least a portion of the one or more uplink communications before a last transmission time interval associated with the one or more feedback-disabled TBs.

Aspect 107. The apparatus of any of Aspects 56 to 106, wherein the plurality of downlink communications includes: at least one feedback-enabled Transport Block (TB) associated with a first HARQ process; and at least one feedback-disabled TB associated with a second HARQ process; wherein the at least one feedback-enabled TB and the at least one feedback-disabled TB are single-TB scheduled.

Aspect 108. The apparatus of Aspect 107, wherein the at least one processor is further configured to: use a DCI override bit to configure the at least one feedback-enabled TB as a feedback-disabled TB; or use the DCI override bit to configure the at least one feedback-disabled TB as a feedback-enabled TB.

Aspect 109. The apparatus of Aspect 108, wherein the at least one processor is further configured to use the DCI override bit to change a Radio Resource Control (RRC) indicated feedback behavior for the at least one feedback-enabled TB or the at least one feedback-disabled TB, respectively.

Aspect 110. The apparatus of any of Aspects 53 to 109, wherein the DCI override bit is a HARQ ACK Bundling Flag.

Aspect 111. The method of Aspect 7, wherein: the multi-TB scheduling includes the one or more feedback-disabled TBs before the one or more feedback-disabled TBs; and a last transmission time interval associated with the one or more feedback-disabled TBs is earlier than a first transmission time interval associated with the one or more feedback-enabled TBs.

Aspect 112. The apparatus of Aspect 62, wherein: the multi-TB scheduling includes the one or more feedback-disabled TBs before the one or more feedback-disabled TBs; and a last transmission time interval associated with the one or more feedback-disabled TBs is earlier than a first transmission time interval associated with the one or more feedback-enabled TBs.

Aspect 113. The apparatus of Aspect 56, wherein the apparatus is configured as a user equipment (UE), and further comprising: at least one transceiver configured to receive the plurality of downlink communications and transmit the one or more uplink communications.

Aspect 114. The apparatus of Aspect 92, wherein the apparatus is configured as a user equipment (UE), and further comprising: at least one transceiver configured to receive the first PDSCH communication and the second PDSCH communication.

Aspect 115. The apparatus of Aspect 94, wherein the apparatus is configured as a user equipment (UE), and further comprising: at least one transceiver configured to receive the plurality of downlink communications.

Aspect 116. A method for wireless communications at a network entity, comprising: transmitting a plurality of downlink communications, wherein each downlink communication of the plurality of downlink communications is associated with a Hybrid Automatic Repeat Request (HARQ) process; and receiving one or more uplink communications based on an uplink communication transmission configuration, wherein each uplink communication of the one or more uplink communications includes feedback associated with at least one downlink communication of the plurality of downlink communications, and wherein the uplink communication transmission configuration is based on a type of each downlink communication of the plurality of downlink communications.

Aspect 117. The method of Aspect 116, further comprising operations according to any of Aspects 2 to 36 and/or Aspects 44 to 55.

Aspect 118. The method of Aspect 116, wherein the network entity is a base station.

Aspect 119. The method of Aspect 118, wherein the base station is one of a next generation node B (gNB) or an evolved node B (eNB).

Aspect 120. The method of Aspect 116, wherein the network entity is at least one of a central unit (CU), a distributed unit (DU), a radio unit (RU), a Near-Real Time (Near-RT) RAN Intelligent Controller (RIC), or a Non-Real Time (Non-RT) RIC of a base station.

Aspect 121. The method of Aspect 116, wherein the network entity is a Non-Terrestrial Network (NTN) entity.

Aspect 122. A method of wireless communication at a network entity, comprising: transmitting, for reception by a user equipment (UE), a first Physical Downlink Shared Channel (PDSCH) communication including at least a first downlink communication of a plurality of downlink communications, wherein the first downlink communication includes a Transport Block (TB) associated with a first feedback-disabled Hybrid Automatic Repeat Request (HARQ) process; and transmitting a second PDSCH communication including at least an additional downlink communication, wherein the additional downlink communication includes an additional TB associated with the first feedback-disabled HARQ process; wherein the first PDSCH communication and the second PDSCH communication are separated by a pre-defined time interval.

Aspect 123. The method of Aspect 122, wherein the UE is an eMTC UE, or a Band-Limited or Coverage Enhanced (BL/CE) UE, and the pre-defined time interval is four milliseconds.

Aspect 124. A method of wireless communication at a network entity, comprising: transmitting a plurality of downlink communications to a Narrowband-Internet of Things (NB-IoT) user equipment (UE), wherein the plurality of downlink communications are associated with up to four HARQ processes, wherein: the up to four HARQ processes include a subset of up to two feedback-enabled HARQ processes; and one or more HARQ processes, of the up to four HARQ processes, not included in the subset are feedback-disabled HARQ processes.

Aspect 125. The method of Aspect 124, further comprising: storing a feedback-enabled TB associated with each feedback-enabled HARQ process included in the subset of up to two feedback-enabled HARQ processes in a soft buffer associated with the UE.

Aspect 126. The method of Aspect 125, further comprising: determining, based on a dedicated Downlink Control Information (DCI) bit associated with the up to four HARQ processes, whether soft-buffer storage is required for each HARQ process of the up to four HARQ processes; wherein a first value of the DCI bit indicates that soft-buffer storage is required for each feedback-enabled HARQ process included in the subset; or wherein a second value of the DCI bit indicates that soft-buffer storage is not required for the feedback-disabled HARQ processes not included in the subset.

Aspect 127. The method of Aspect 125, further comprising: determining, based on a dedicated DCI bit associated with the up to four HARQ processes, whether each HARQ process of the up to four HARQ processes is a feedback-enabled HARQ process or a feedback-disabled HARQ process; wherein a first value of the DCI bit is used for feedback-enabled HARQ processes and a second value of the DCI bit is used for feedback-disabled HARQ processes; and wherein HARQ processes associated with the first value of the DCI bit are stored in the soft buffer.

Aspect 128. The method of Aspect 126 or 127, further comprising using the dedicated DCI bit to implicitly indicate a HARQ process ID number for each HARQ process of the up to four HARQ processes.

Aspect 129. The method of Aspect 124, wherein the network entity is a base station.

Aspect 130. The method of Aspect 129, wherein the base station is one of a next generation node B (gNB) or an evolved node B (eNB).

Aspect 131. The method of Aspect 124, wherein the network entity is at least one of a central unit (CU), a distributed unit (DU), a radio unit (RU), a Near-Real Time (Near-RT) RAN Intelligent Controller (RIC), or a Non-Real Time (Non-RT) RIC of a base station.

Aspect 132. The method of Aspect 124, wherein the network entity is a Non-Terrestrial Network (NTN) entity.

Aspect 133. An apparatus for wireless communications, comprising: at least one memory; and at least one processor coupled to at least one memory and configured to: output a plurality of downlink communications for transmission, wherein each downlink communication of the plurality of downlink communications is associated with a Hybrid Automatic Repeat Request (HARQ) process; and receive one or more uplink communications based on an uplink communication transmission configuration, wherein each uplink communication of the one or more uplink communications includes feedback associated with at least one downlink communication of the plurality of downlink communications, and wherein the uplink communication transmission configuration is based on a type of each downlink communication of the plurality of downlink communications.

Aspect 134. The apparatus of Aspect 133, further comprising operations according to any of Aspects 2 to 36 and/or Aspects 44 to 55.

Aspect 135. The apparatus of Aspect 133, wherein the apparatus is implemented as a network entity, and further comprising: at least one transceiver configured to transmit the plurality of downlink communications and receive one or more uplink communications.

Aspect 136. The apparatus of Aspect 135, wherein the network entity is a base station, the base station including one of a next generation node B (gNB) or an evolved node B (eNB).

Aspect 137. The apparatus of Aspect 135, wherein the network entity is at least one of a central unit (CU), a distributed unit (DU), a radio unit (RU), a Near-Real Time (Near-RT) RAN Intelligent Controller (RIC), or a Non-Real Time (Non-RT) RIC of a base station.

Aspect 138. The apparatus of Aspect 135, wherein the network entity is a Non-Terrestrial Network (NTN) entity.

Aspect 139. An apparatus for wireless communication, comprising: at least one memory; and at least one processor coupled to at least one memory and configured to: output, for transmission to a user equipment (UE), a first Physical Downlink Shared Channel (PDSCH) communication including at least a first downlink communication of a plurality of downlink communications, wherein the first downlink communication includes a Transport Block (TB) associated with a first feedback-disabled Hybrid Automatic Repeat Request (HARQ) process; and output for transmission a second PDSCH communication including at least an additional downlink communication, wherein the additional downlink communication includes an additional TB associated with the first feedback-disabled HARQ process; wherein the first PDSCH communication and the second PDSCH communication are separated by a pre-defined time interval.

Aspect 140. The apparatus of Aspect 139, wherein the UE is an eMTC UE, or a Band-Limited or Coverage Enhanced (BL/CE) UE, and the pre-defined time interval is four milliseconds.

Aspect 141. The apparatus of Aspect 139, wherein the apparatus is implemented as a network entity, and further comprising: at least one transceiver configured to transmit the first PDSCH communication and the second PDSCH communication.

Aspect 142. The method of Aspect 141, wherein the network entity is a base station.

Aspect 143. The method of Aspect 142, wherein the base station is one of a next generation node B (gNB) or an evolved node B (eNB).

Aspect 144. The method of Aspect 141, wherein the network entity is at least one of a central unit (CU), a distributed unit (DU), a radio unit (RU), a Near-Real Time (Near-RT) RAN Intelligent Controller (RIC), or a Non-Real Time (Non-RT) RIC of a base station.

Aspect 145. The method of Aspect 141, wherein the network entity is a Non-Terrestrial Network (NTN) entity.

Aspect 146. An apparatus for wireless communication, comprising: at least one memory; and at least one processor coupled to at least one memory and configured to: output a plurality of downlink communications for transmission to a Narrowband-Internet of Things (NB-IoT) user equipment (UE), wherein the plurality of downlink communications are associated with up to four HARQ processes, wherein: the up to four HARQ processes include a subset of up to two feedback-enabled HARQ processes; and one or more HARQ processes, of the up to four HARQ processes, not included in the subset are feedback-disabled HARQ processes.

Aspect 147. The method of Aspect 146, further comprising: storing a feedback-enabled TB associated with each feedback-enabled HARQ process included in the subset of up to two feedback-enabled HARQ processes in a soft buffer associated with the UE.

Aspect 148. The method of Aspect 147, further comprising: determining, based on a dedicated Downlink Control Information (DCI) bit associated with the up to four HARQ processes, whether soft-buffer storage is required for each HARQ process of the up to four HARQ processes; wherein a first value of the DCI bit indicates that soft-buffer storage is required for each feedback-enabled HARQ process included in the subset; or wherein a second value of the DCI bit indicates that soft-buffer storage is not required for the feedback-disabled HARQ processes not included in the subset.

Aspect 149. The method of Aspect 147, further comprising: determining, based on a dedicated DCI bit associated with the up to four HARQ processes, whether each HARQ process of the up to four HARQ processes is a feedback-enabled HARQ process or a feedback-disabled HARQ process; wherein a first value of the DCI bit is used for feedback-enabled HARQ processes and a second value of the DCI bit is used for feedback-disabled HARQ processes; and wherein HARQ processes associated with the first value of the DCI bit are stored in the soft buffer.

Aspect 150. The method of Aspect 148 or 149, further comprising using the dedicated DCI bit to implicitly indicate a HARQ process ID number for each HARQ process of the up to four HARQ processes.

Aspect 151. The apparatus of Aspect 146, wherein the apparatus is implemented as a network entity, and further comprising: at least one transceiver configured to transmit the plurality of downlink communications.

Aspect 152. The method of Aspect 151, wherein the network entity is a base station.

Aspect 153. The method of Aspect 152, wherein the base station is one of a next generation node B (gNB) or an evolved node B (eNB).

Aspect 154. The method of Aspect 151, wherein the network entity is at least one of a central unit (CU), a distributed unit (DU), a radio unit (RU), a Near-Real Time (Near-RT) RAN Intelligent Controller (RIC), or a Non-Real Time (Non-RT) RIC of a base station.

Aspect 155. The method of Aspect 151, wherein the network entity is a Non-Terrestrial Network (NTN) entity.

What is claimed is:

1. An apparatus for wireless communications, comprising:
    at least one memory; and
    at least one processor coupled to at least one memory and configured to:
    receive a plurality of downlink communications, wherein each downlink communication of the plurality of downlink communications is associated with a Hybrid Automatic Repeat Request (HARQ) process;

determine one or more uplink communications, wherein each uplink communication of the one or more uplink communications includes feedback associated with at least one downlink communication of the plurality of downlink communications; and transmit the one or more uplink communications based on an uplink communication transmission configuration, wherein the uplink communication transmission configuration is determined based on a type of each downlink communication of the plurality of downlink communications, wherein the plurality of downlink communications includes:

one or more feedback-enabled Transport Blocks (TBs), wherein each feedback-enabled TB of the one or more feedback-enabled TBs is associated with a HARQ feedback-enabled process; and one or more feedback-disabled TBs, wherein each feedback-disabled TB of the one or more feedback-disabled TBs is associated with a HARQ feedback-disabled process;

wherein the one or more feedback-enabled TBs and the one or more feedback-disabled TBs are received according to a multi-TB scheduling based on a Downlink Control Information (DCI) associated with the multi-TB scheduling.

2. The apparatus of claim 1, wherein the plurality of downlink communications includes:

at least one feedback-enabled Transport Block (TB) associated with a first HARQ process; and at least one feedback-disabled TB associated with a second HARQ process;

wherein the at least one feedback-enabled TB and the at least one feedback-disabled TB are single-TB scheduled.

3. The apparatus of claim 2, wherein the at least one processor is further configured to:

use a DCI override bit to configure the at least one feedback-enabled TB as a feedback-disabled TB; or use the DCI override bit to configure the at least one feedback-disabled TB as a feedback-enabled TB.

4. The apparatus of claim 3, wherein the at least one processor is further configured to use the DCI override bit to change a Radio Resource Control (RRC) indicated feedback behavior for the at least one feedback-enabled TB or the at least one feedback-disabled TB, respectively.

5. The apparatus of claim 4, wherein the DCI override bit is a HARQ ACK Bundling Flag.

6. The apparatus of claim 1, wherein:

the plurality of downlink communications includes one or more feedback-enabled Transport Blocks (TBs), wherein each feedback-enabled TB of the one or more feedback-enabled TBs is associated with a HARQ feedback-enabled process; and the one or more feedback-enabled TBs are received according to a multi-TB scheduling based on a Downlink Control Information (DCI) associated with the multi-TB scheduling.

7. The apparatus of claim 6, wherein:

the one or more uplink communications include a HARQ feedback determined for each feedback-enabled TB of the one or more feedback-enabled TBs; and a first uplink slot of the uplink communication transmission configuration is later than a last downlink slot associated with receiving the one or more feedback-enabled TBs using the multi-TB scheduling.

8. The apparatus of claim 1, wherein:

the plurality of downlink communications includes one or more feedback-disabled Transport Blocks (TBs), wherein each feedback-disabled TB is associated with a HARQ feedback-disabled process;

the one or more feedback-disabled TBs are received using a multi-TB scheduling based on a Downlink Control Information (DCI) associated with the multi-TB scheduling; and the one or more uplink communications do not include feedback associated with the one or more feedback-disabled TBs.

9. The apparatus of claim 1, wherein:

the multi-TB scheduling includes the one or more feedback-enabled TBs before the one or more feedback-disabled TBs; and a last transmission time interval associated with the one or more feedback-enabled TBs is earlier than a first transmission time interval associated with the one or more feedback-disabled TBs.

10. The apparatus of claim 9, wherein:

the one or more uplink communications include a respective HARQ feedback determined for each feedback-enabled TB of the one or more feedback-enabled TBs; and at least a portion of the one or more uplink communications are transmitted after the last transmission time interval associated with the one or more feedback-enabled TBs.

11. The apparatus of claim 1, wherein the one or more uplink communications include:

a respective HARQ feedback determined for each feedback-enabled TB of the one or more feedback-enabled TBs; and a respective placeholder feedback determined for each feedback-disabled TB of the one or more feedback-disabled TBs.

12. The apparatus of claim 11, wherein the at least one processor is further configured to:

determine the uplink communication transmission configuration based on a relative order associated with receiving the one or more feedback-enabled TBs and the one or more feedback-disabled TBs; and transmit the HARQ feedback and the placeholder feedback using a same relative order associated with receiving the one or more feedback-enabled TBs and the one or more feedback-disabled TBs.

13. The apparatus of claim 1, wherein the one or more uplink communications include a HARQ feedback determined for each feedback-enabled TB of the one or more feedback-enabled TBs and do not include feedback associated with the one or more feedback-disabled TBs, and wherein the at least one processor is further configured to:

determine the uplink communication transmission configuration based on a relative order associated with receiving the one or more feedback-enabled TBs and the one or more feedback-disabled TBs;

wherein the uplink communication transmission configuration is determined by:

for each feedback-enabled TB included in the relative order, generating a HARQ feedback transmission time interval associated with a HARQ feedback determined for the feedback-enabled TB; and for each feedback-disabled TB included in the relative order, generating an empty uplink transmission time interval associated with the feedback-disabled TB.

14. The apparatus of claim 1, wherein:
the one or more feedback-enabled TBs and the one or more feedback-disabled TBs are received as one or more TB bundles, wherein each feedback-enabled TB and each feedback-disabled TB is included in only one TB bundle of the one or more TB bundles; and
the one or more TB bundles include at least one of:
a feedback-enabled TB bundle, wherein each feedback-enabled TB bundle includes at least one feedback-enabled TB; and
a feedback-disabled TB bundle, wherein each feedback-disabled TB bundle does not include any feedback-enabled TB.

15. The apparatus of claim 14, wherein to determine the one or more uplink communications, the at least one processor is further configured to, for each feedback-enabled TB bundle of the one or more TB bundles:
generate a respective HARQ feedback for each feedback-enabled TB included in the feedback-enabled TB bundle;
generate a respective placeholder feedback for each feedback-disabled TB included in the feedback-enabled TB bundle; and
determine a bundled HARQ feedback based on each HARQ feedback and each placeholder feedback, wherein the one or more uplink communications include the bundled HARQ feedback.

16. The apparatus of claim 15, wherein:
to determine the bundled HARQ feedback, the at least one processor is configured to calculate a logical AND between each HARQ feedback and each placeholder feedback; and
the placeholder feedback includes an acknowledgement (ACK) or a logical 1 value.

17. The apparatus of claim 1, wherein one or more of the plurality of downlink communications are received by an enhanced Machine Type Communication (eMTC) apparatus or one or more of the one or more uplink communications are transmitted by the eMTC apparatus.

18. The apparatus of claim 1, wherein the at least one processor is further configured to:
receive a first Physical Downlink Shared Channel (PDSCH) communication including at least a first downlink communication of the plurality of downlink communications, wherein the first downlink communication includes a Transport Block (TB) associated with a feedback-disabled HARQ process; and
receive a second PDSCH communication including at least an additional downlink communication, wherein the additional downlink communication includes an additional TB associated with the feedback-disabled HARQ process;
wherein the first PDSCH communication and the second PDSCH communication are separated by a pre-defined time interval.

19. The apparatus of claim 18, wherein the apparatus is an enhanced Machine Type Communication (eMTC) apparatus, or a Band-Limited or Coverage Enhanced (BL/CE) apparatus, and the pre-defined time interval is four milliseconds.

20. The apparatus of claim 19, wherein the one or more downlink communications are associated with up to four HARQ processes, wherein:
the up to four HARQ processes include a subset of up to two feedback-enabled HARQ processes; and
one or more HARQ processes, of the up to four HARQ processes, not included in the subset are feedback-disabled HARQ processes.

21. The apparatus of claim 20, wherein the at least one processor is further configured to:
store a feedback-enabled TB associated with each feedback-enabled HARQ process included in the subset of up to two feedback-enabled HARQ processes in a soft buffer associated with the apparatus.

22. The apparatus of claim 20, wherein the at least one processor is further configured to:
determine, based on a dedicated Downlink Control Information (DCI) bit associated with the up to four HARQ processes, whether soft-buffer storage is required for each HARQ process of the up to four HARQ processes;
wherein a first value of the DCI bit indicates that soft-buffer storage is required for each feedback-enabled HARQ process included in the subset; or
wherein a second value of the DCI bit indicates that soft-buffer storage is not required for the feedback-disabled HARQ processes not included in the subset.

23. The apparatus of claim 22, wherein the at least one processor is further configured to:
determine, based on a dedicated DCI bit associated with the up to four HARQ processes, whether each HARQ process of the up to four HARQ processes is a feedback-enabled HARQ process or a feedback-disabled HARQ process;
wherein a first value of the DCI bit is used for feedback-enabled HARQ processes and a second value of the DCI bit is used for feedback-disabled HARQ processes.

24. The apparatus of claim 22, wherein the at least one processor is further configured to use the dedicated DCI bit to implicitly or explicitly indicate a HARQ process ID number for each HARQ process of the up to four HARQ processes.

25. An apparatus of a network entity for wireless communications, comprising:
at least one memory; and
at least one processor coupled to at least one memory and configured to:
output a plurality of downlink communications for transmission, wherein each downlink communication of the plurality of downlink communications is associated with a Hybrid Automatic Repeat Request (HARQ) process; and
receive one or more uplink communications based on an uplink communication transmission configuration, wherein each uplink communication of the one or more uplink communications includes feedback associated with at least one downlink communication of the plurality of downlink communications, and wherein the uplink communication transmission configuration is based on a type of each downlink communication of the plurality of downlink communications, wherein the plurality of downlink communications includes:
one or more feedback-enabled Transport Blocks (TBs), wherein each feedback-enabled TB of the one or more feedback-enabled TBs is associated with a HARQ feedback-enabled process; and
one or more feedback-disabled TBs, wherein each feedback-disabled TB of the one or more feedback-disabled TBs is associated with a HARQ feedback-disabled process;
wherein the one or more feedback-enabled TBs and the one or more feedback-disabled TBs are output according to a multi-TB scheduling based on a Downlink Control Information (DCI) associated with the multi-TB scheduling.

26. An apparatus for wireless communication, comprising:
at least one memory; and
at least one processor coupled to at least one memory and configured to:
output a plurality of downlink communications for transmission to a Narrowband-Internet of Things (NB-IoT) user equipment (UE), wherein the plurality of downlink communications are associated with up to four Hybrid Automatic Repeat Request (HARQ) processes, wherein:
the up to four HARQ processes include a subset of up to two feedback-enabled HARQ processes; and
one or more HARQ processes, of the up to four HARQ processes, not included in the subset are feedback-disabled HARQ processes; and
store a feedback-enabled Transport Block (TB) associated with each feedback-enabled HARQ process included in the subset of up to two feedback-enabled HARQ processes in a soft buffer associated with the UE.

27. The apparatus of claim 26, wherein the at least one processor is further configured to:
determine, based on a dedicated Downlink Control Information (DCI) bit associated with the up to four HARQ processes, whether soft-buffer storage is required for each HARQ process of the up to four HARQ processes;
wherein a first value of the DCI bit indicates that soft-buffer storage is required for each feedback-enabled HARQ process included in the subset; or
wherein a second value of the DCI bit indicates that soft-buffer storage is not required for the feedback-disabled HARQ processes not included in the subset.

28. The apparatus of claim 27, wherein the at least one processor is configured to use the dedicated DCI bit to implicitly indicate a HARQ process ID number for each HARQ process of the up to four HARQ processes.

29. The apparatus of claim 26, wherein the at least one processor is further configured to:
determine, based on a dedicated Downlink Control Information (DCI) bit associated with the up to four HARQ processes, whether each HARQ process of the up to four HARQ processes is a feedback-enabled HARQ process or a feedback-disabled HARQ process;
wherein a first value of the DCI bit is used for feedback-enabled HARQ processes and a second value of the DCI bit is used for feedback-disabled HARQ processes; and
wherein HARQ processes associated with the first value of the DCI bit are stored in the soft buffer.

* * * * *